United States Patent
Lynne et al.

(10) Patent No.: US 12,556,592 B2
(45) Date of Patent: Feb. 17, 2026

(54) USER INTERFACES FOR DISPLAYING, TRANSMITTING, AND RECEIVING COMMUNICATIONS DURING A COMMUNICATION SESSION

(71) Applicant: Apple Inc., Cupertino, CA (US)

(72) Inventors: Brandon A. Lynne, Palo Alto, CA (US); Joshua D. Deitel, San Francisco, CA (US); Vincenzo O. Giuliani, Thousand Oaks, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/733,672

(22) Filed: Jun. 4, 2024

(65) Prior Publication Data

US 2024/0406224 A1    Dec. 5, 2024

Related U.S. Application Data

(60) Provisional application No. 63/655,516, filed on Jun. 3, 2024, provisional application No. 63/506,130, filed on Jun. 4, 2023.

(51) Int. Cl.
    *H04L 65/1069*     (2022.01)
    *G06F 3/0482*     (2013.01)
    *H04L 65/1093*     (2022.01)

(52) U.S. Cl.
    CPC ........ *H04L 65/1069* (2013.01); *G06F 3/0482* (2013.01); *H04L 65/1093* (2013.01)

(58) Field of Classification Search
    CPC ............. H04L 65/1069; H04L 65/1093; G06F 3/0482
    See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |

(Continued)

FOREIGN PATENT DOCUMENTS

| | | |
|---|---|---|
| EP | 3952317 A1 | 2/2022 |
| EP | 4138400 A1 | 2/2023 |

(Continued)

OTHER PUBLICATIONS

International Search Report received for PCT Patent Application No. PCT/US2024/031779 mailed on Sep. 4, 2024, 4 pages.

(Continued)

*Primary Examiner* — Minh Chau Nguyen
(74) *Attorney, Agent, or Firm* — Kubota & Basol LLP

(57) ABSTRACT

Some embodiments described in this disclosure are directed to one or more electronic devices that display a plurality of user interfaces corresponding initiating a communication session and joining a communication session. Some embodiments described in this disclosure are directed to transmitting content during a communication session. Some embodiments described in this disclosure are directed towards receiving content during the communication session.

49 Claims, 34 Drawing Sheets

(56) References Cited

U.S. PATENT DOCUMENTS

| | | |
|---|---|---|
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,846,564 B1 * | 12/2017 | Toksoz ................ H04R 3/12 |
| 9,933,937 B2 | 4/2018 | Lemay et al. |
| 11,080,004 B2 | 8/2021 | Carrigan et al. |
| 11,082,742 B2 * | 8/2021 | Hernejärvi ......... H04N 21/4532 |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2010/0111491 A1 | 5/2010 | Kamoto |
| 2013/0246522 A1 | 9/2013 | Bilinski et al. |
| 2017/0093943 A1 | 3/2017 | Alsina et al. |
| 2018/0181360 A1 | 6/2018 | Cansino et al. |
| 2018/0310042 A1 | 10/2018 | Mayalil et al. |
| 2019/0124159 A1 | 4/2019 | Alsina et al. |
| 2019/0215650 A1 | 7/2019 | Marino et al. |
| 2019/0306553 A1 | 10/2019 | Iyer et al. |
| 2020/0348830 A1 * | 11/2020 | Bates ..................... H04R 3/12 |
| 2021/0127245 A1 | 4/2021 | Park et al. |
| 2021/0136509 A1 * | 5/2021 | Harris .................... H04R 5/04 |
| 2023/0098814 A1 * | 3/2023 | Carrigan ............... G06F 3/165 |
| | | 715/716 |
| 2024/0073474 A1 | 2/2024 | Lynch |
| 2024/0205628 A1 * | 6/2024 | Sharifi ................. H04S 7/302 |
| 2025/0130697 A1 | 4/2025 | Won |

FOREIGN PATENT DOCUMENTS

| | | |
|---|---|---|
| WO | 2013169849 A2 | 11/2013 |
| WO | 2013/190503 A1 | 12/2013 |
| WO | 2014105276 A1 | 7/2014 |

OTHER PUBLICATIONS

International Search Report received for PCT Patent Application No. PCT/US2024/032444 mailed on Nov. 20, 2024, 7 pages.

IOS 4.2 Software Update for iPad, Apple Support, Nov. 22, 2010 [online]. Retrieved from <https://support.apple.com/kb/dl1060?locale=en_US>, [retrieved on Jul. 26, 2023], 2 pages.

International Search Report received for PCT Patent Application No. PCT/US2023/071071, mailed on Oct. 5, 2023, 5 pages.

Non-Final Office Action received for U.S. Appl. No. 18/359,820, mailed on Dec. 17, 2024, 16 pages.

* cited by examiner

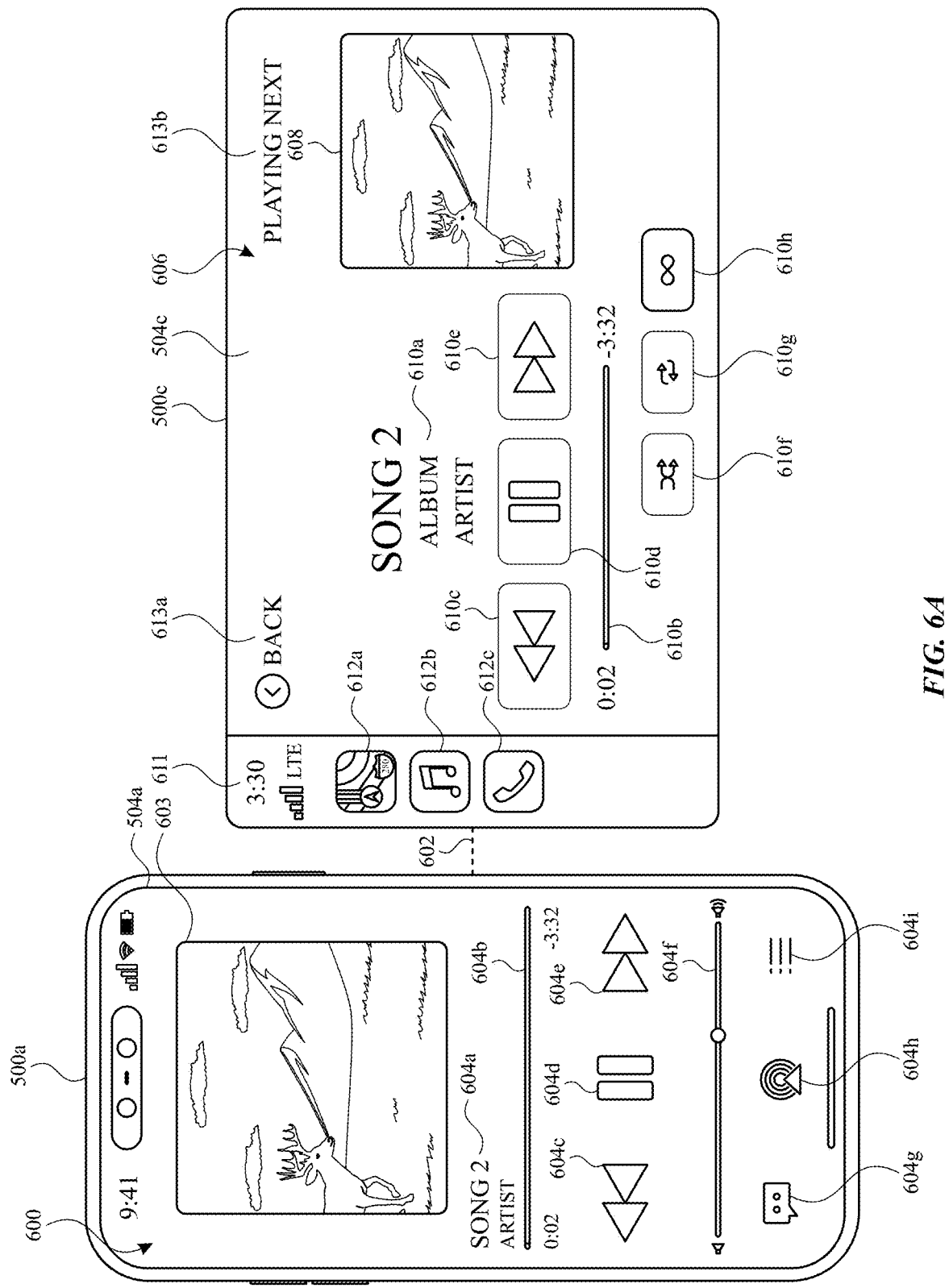

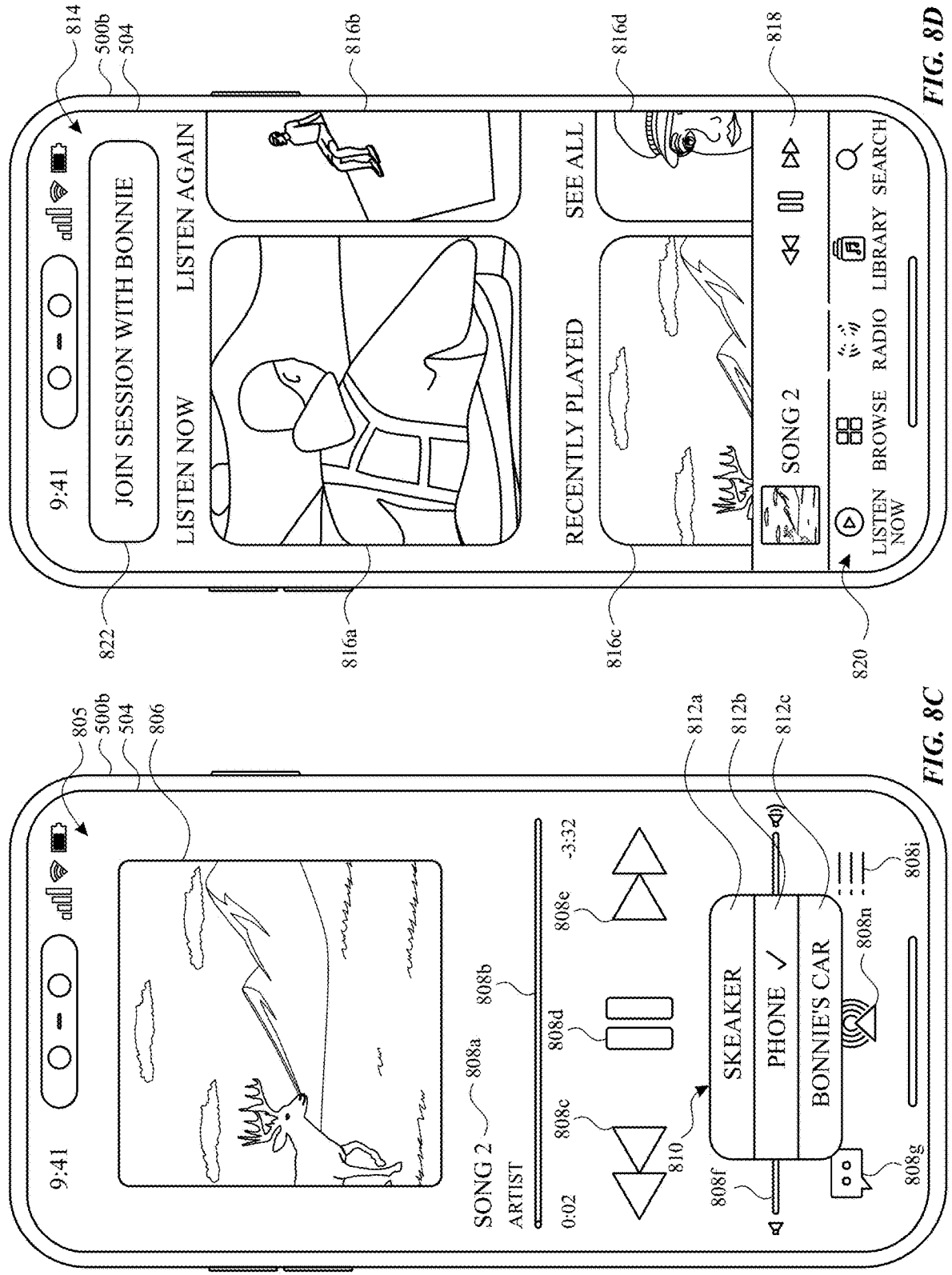

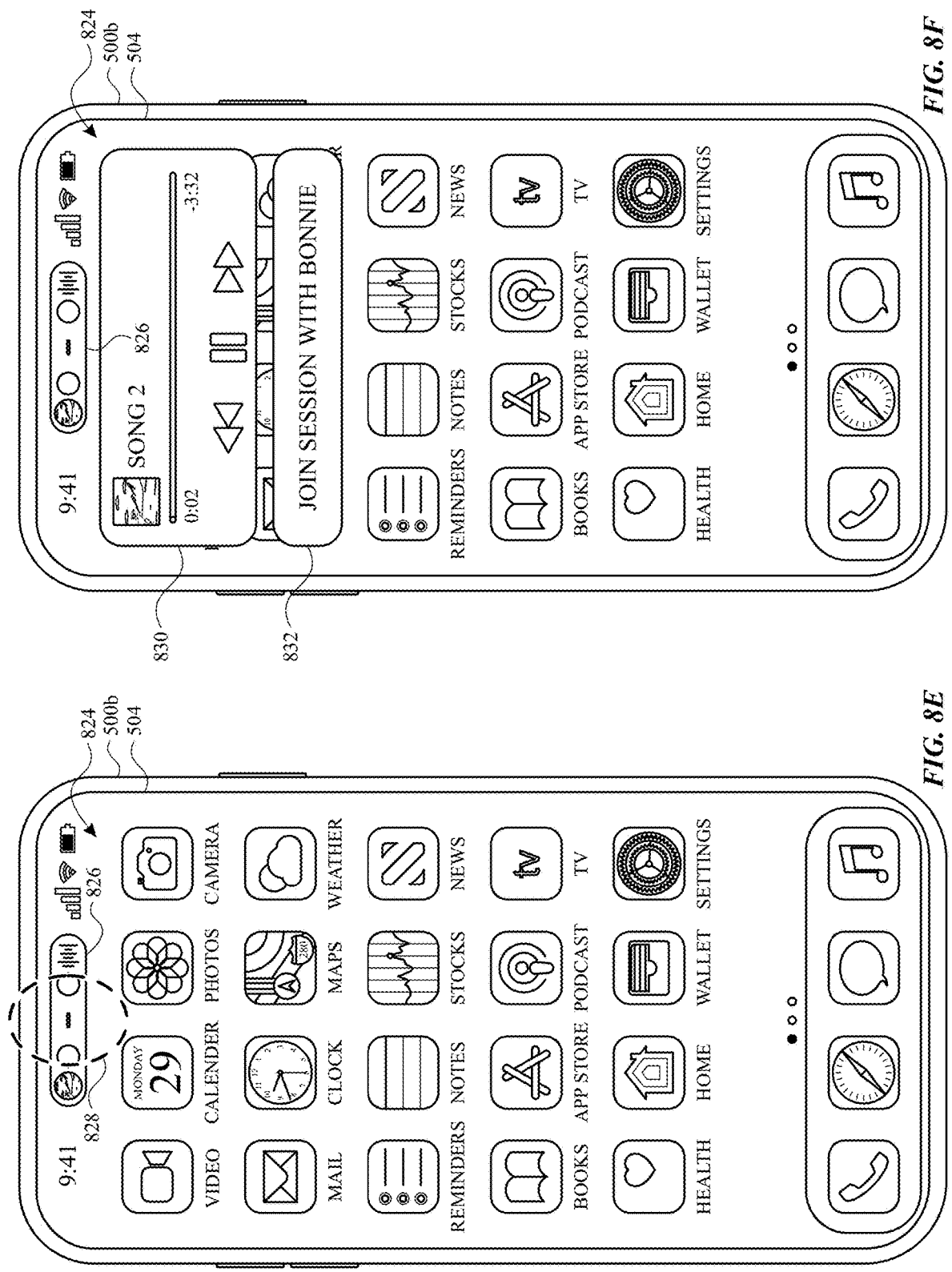

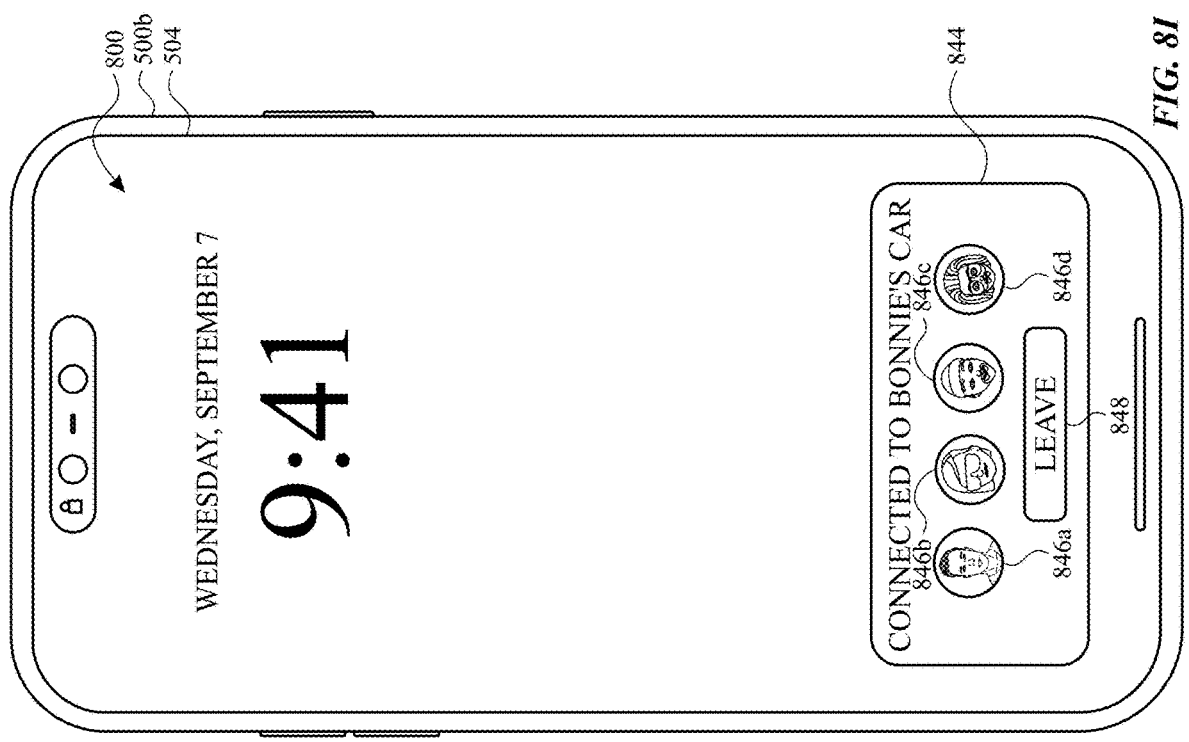

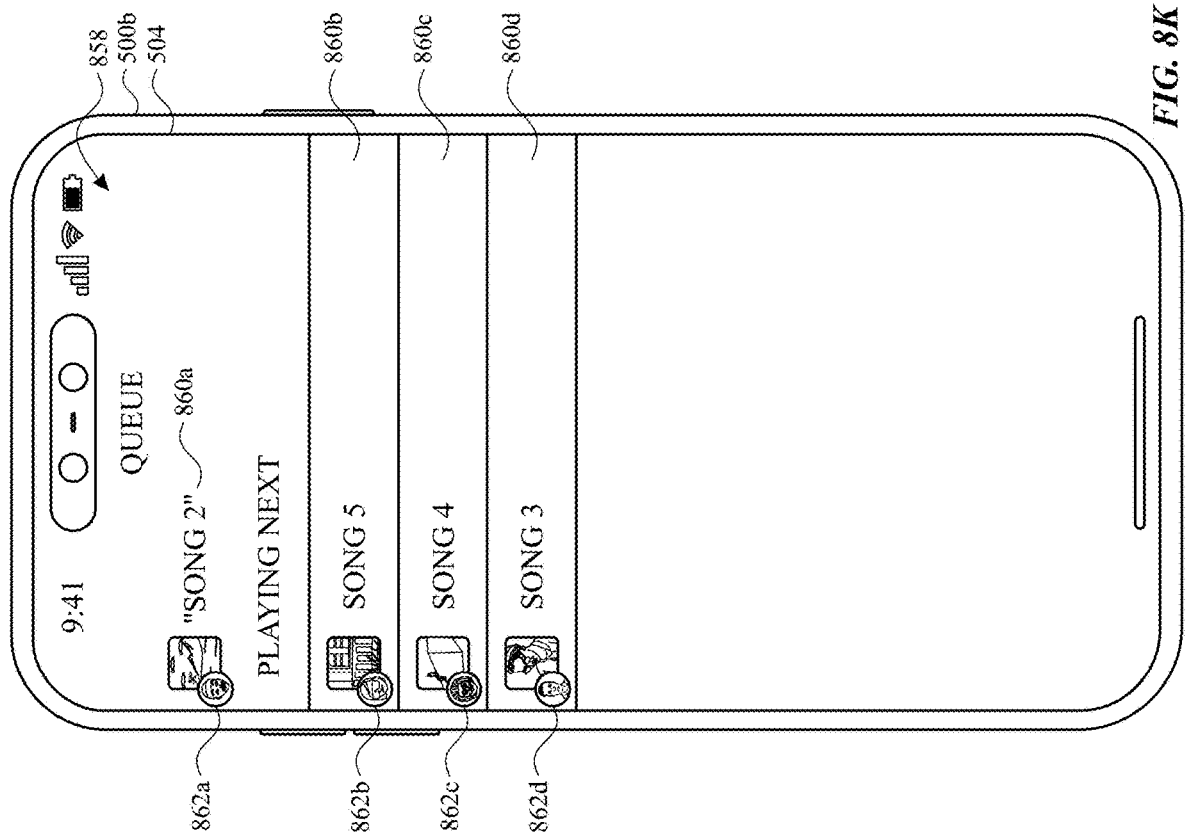
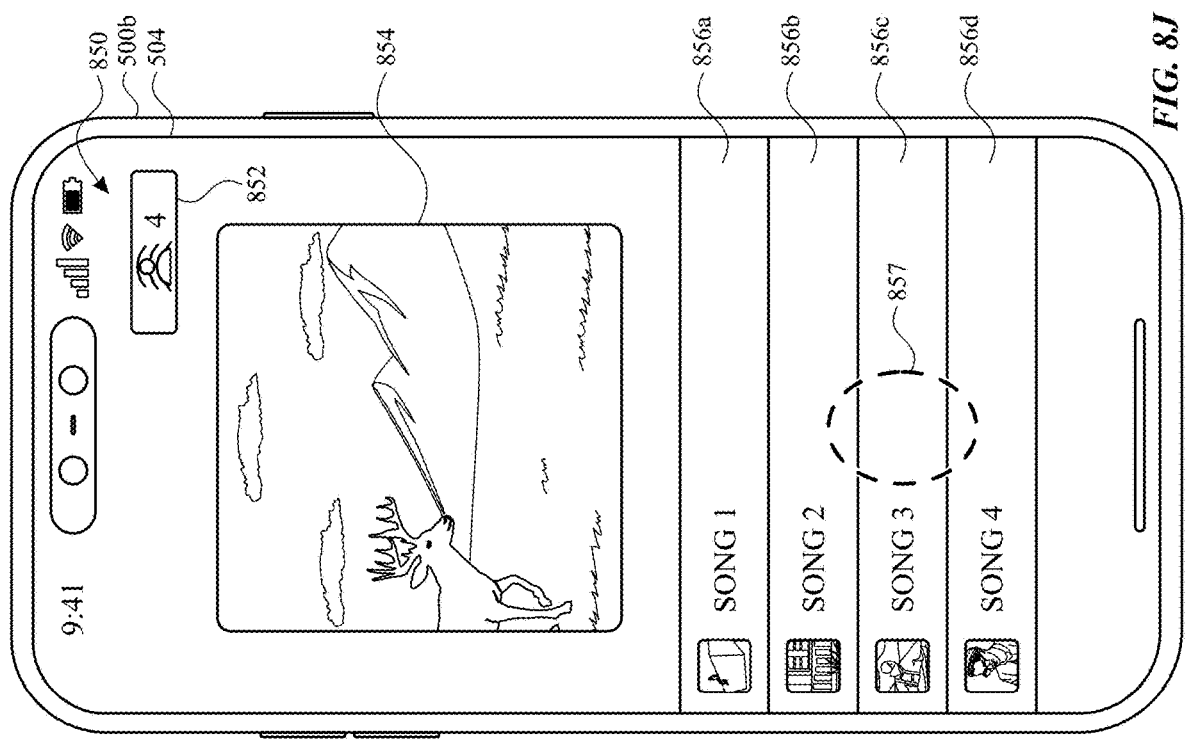
FIG. 8J
FIG. 8K

USER INTERFACES FOR DISPLAYING, TRANSMITTING, AND RECEIVING COMMUNICATIONS DURING A COMMUNICATION SESSION

CROSS-REFERENCE TO RELATED APPLICATIONS

This application claims the benefit of U.S. Provisional Application No. 63/506,130, filed Jun. 4, 2023, and U.S. Provisional Application No. 63/655,516, filed Jun. 3, 2024, the contents of which are herein incorporated by reference in their entireties for all purposes.

FIELD OF THE DISCLOSURE

This disclosure relates generally to displaying, transmitting, and receiving communications during a communication session with an electronic device.

BACKGROUND OF THE DISCLOSURE

User interaction with electronic devices has increased significantly in recent years. These devices can be devices such as computers, tablet computers, televisions, multimedia devices, or mobile devices. In some circumstances, users may wish to use such devices to send and/or receive communications. Enhancing the user's interactions with the device improves the user's experience with the device and decreases user interaction time, which is particularly important where input devices are battery-operated.

SUMMARY OF THE DISCLOSURE

Some embodiments described in this disclosure are directed to one or more electronic devices that display a plurality of user interfaces corresponding initiating a communication session. Some embodiments described in this disclosure are directed to transmitting content during a communication session. Some embodiments described in this disclosure are directed towards receiving content during the communication session. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
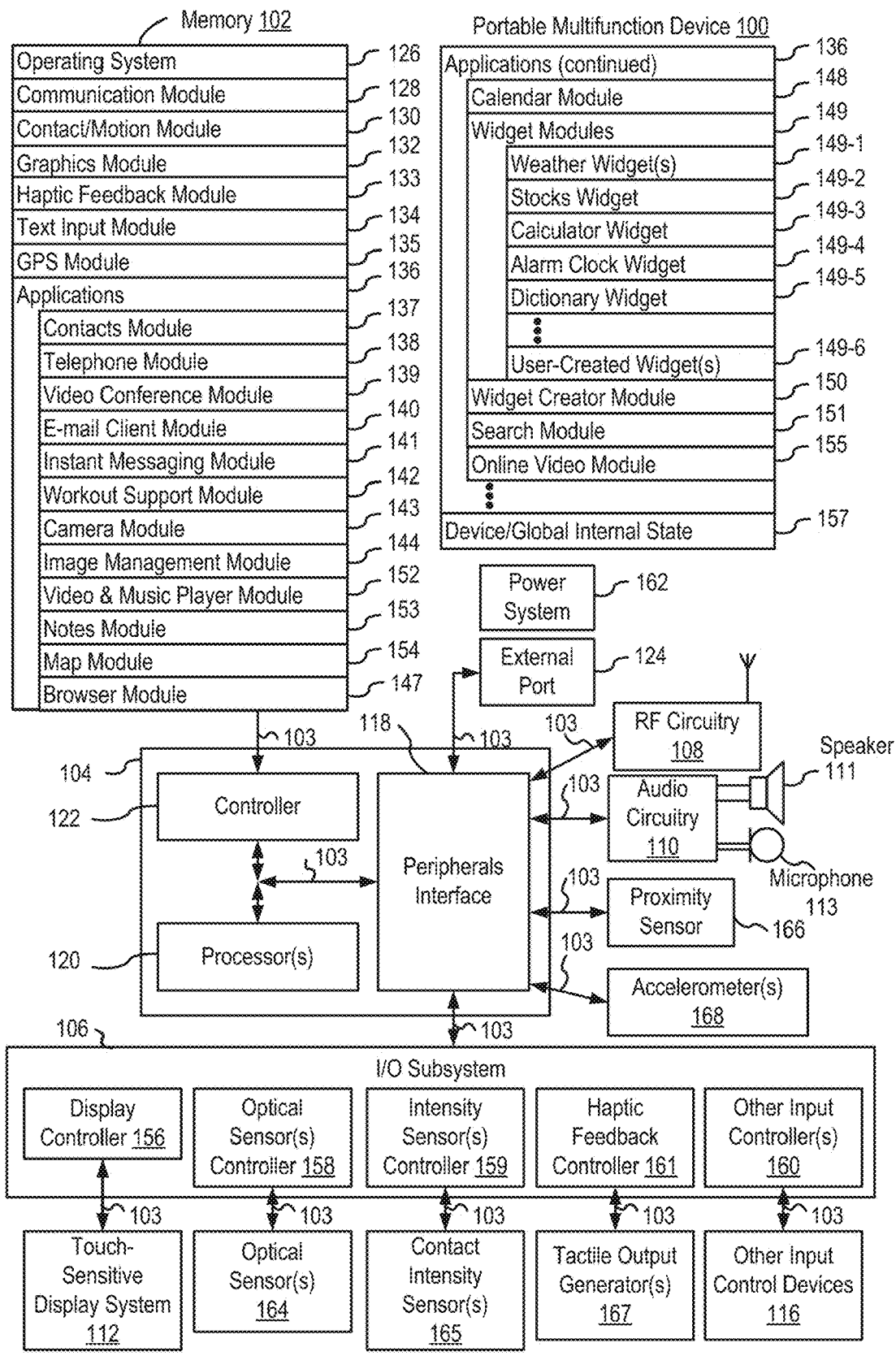
FIG. 1A is a block diagram illustrating a portable multifunction device with a touch-sensitive display in accordance with some embodiments.

In the following description of embodiments, reference is made to the accompanying drawings which form a part hereof, and in which it is shown by way of illustration specific embodiments that are optionally practiced. It is to be understood that other embodiments are optionally used, and structural changes are optionally made without departing from the scope of the disclosed embodiments.

There is a need for electronic devices join a communication session with each other. There is also a need for electronic devices to transmit content while in a communication session. In some embodiments, a first electronic device detects a second electronic device within a threshold distance of the first electronic device. In some embodiments, in accordance with a determination that one or more criteria are satisfied, the first electronic device initiates a communication session with the second electronic device. In some embodiments, while in the communication session, the second electronic device can control playback of content. Such techniques allow enables users of the first and the second electronic device to easily share and play content, thereby reducing the need for additional inputs to share and play content which enables the users of both electronic devices to use the electronic devices more efficiently.

In some embodiments, a first electronic device receives an indication that a communication session between the first electronic device and a second electronic device can be initiated. In some embodiments, the first electronic device transmits a request to initiate the communication session in response to receiving the indication. In some embodiments, the first electronic device initiates the communication session, which allows the first electronic device to transmit indications of content to be played at the second electronic device. Allowing content to be transmitted and played between devices enables the user of the first electronic device to easily share and play content, thereby reducing the need for additional inputs to share and play content which enables the users of both electronic devices to use the electronic devices more efficiently.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display)

technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's car (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
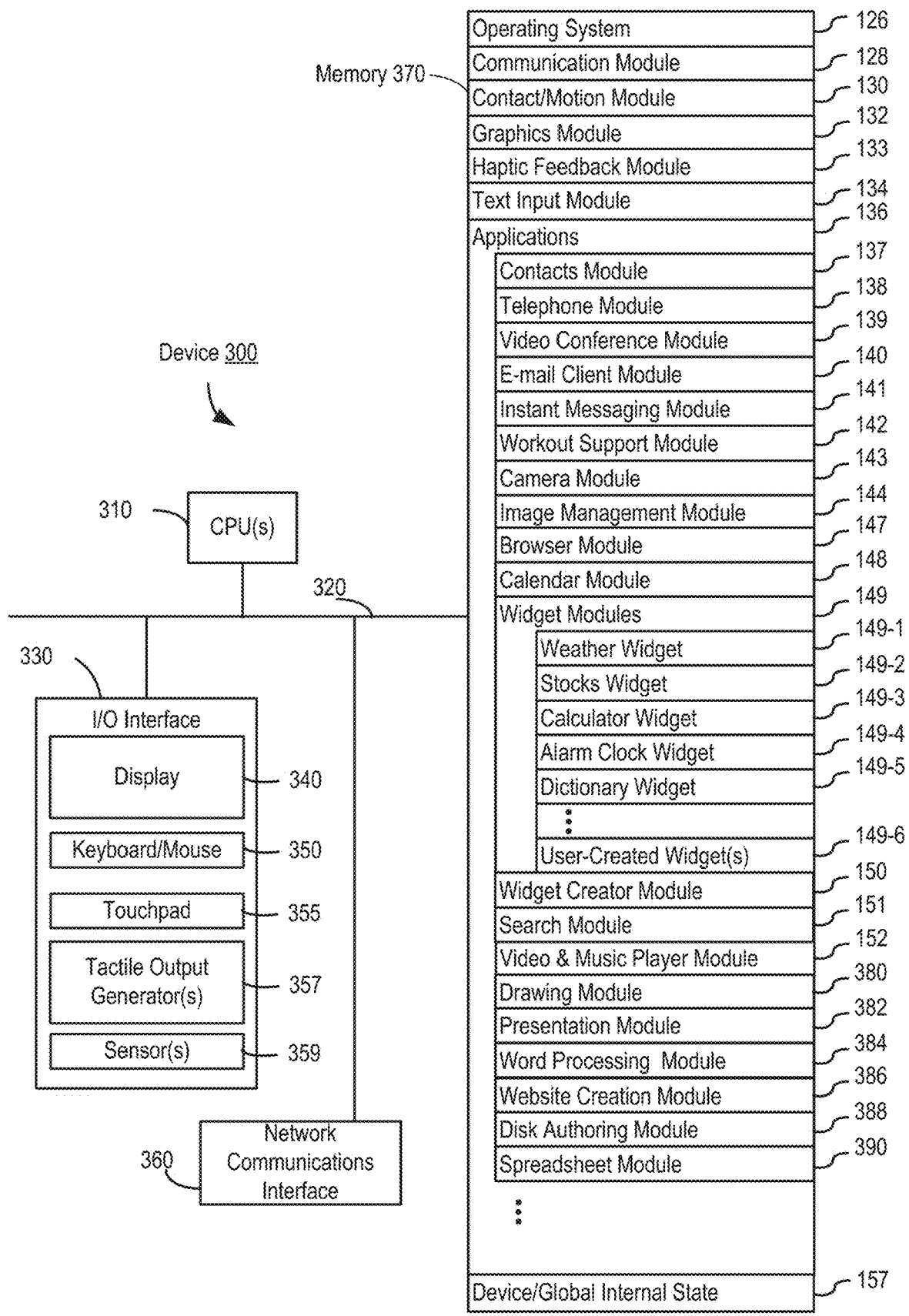
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module and music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
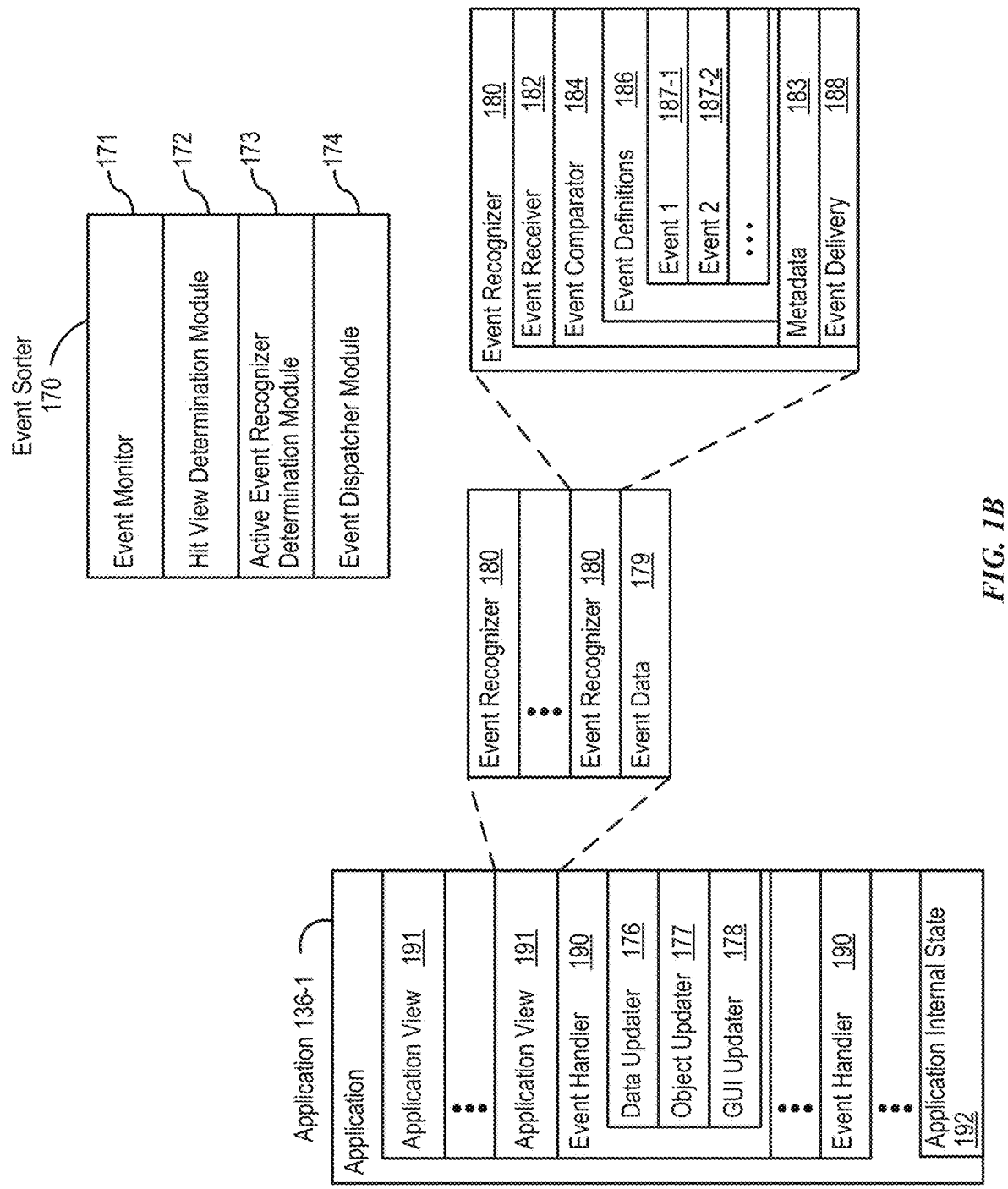
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (arc) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
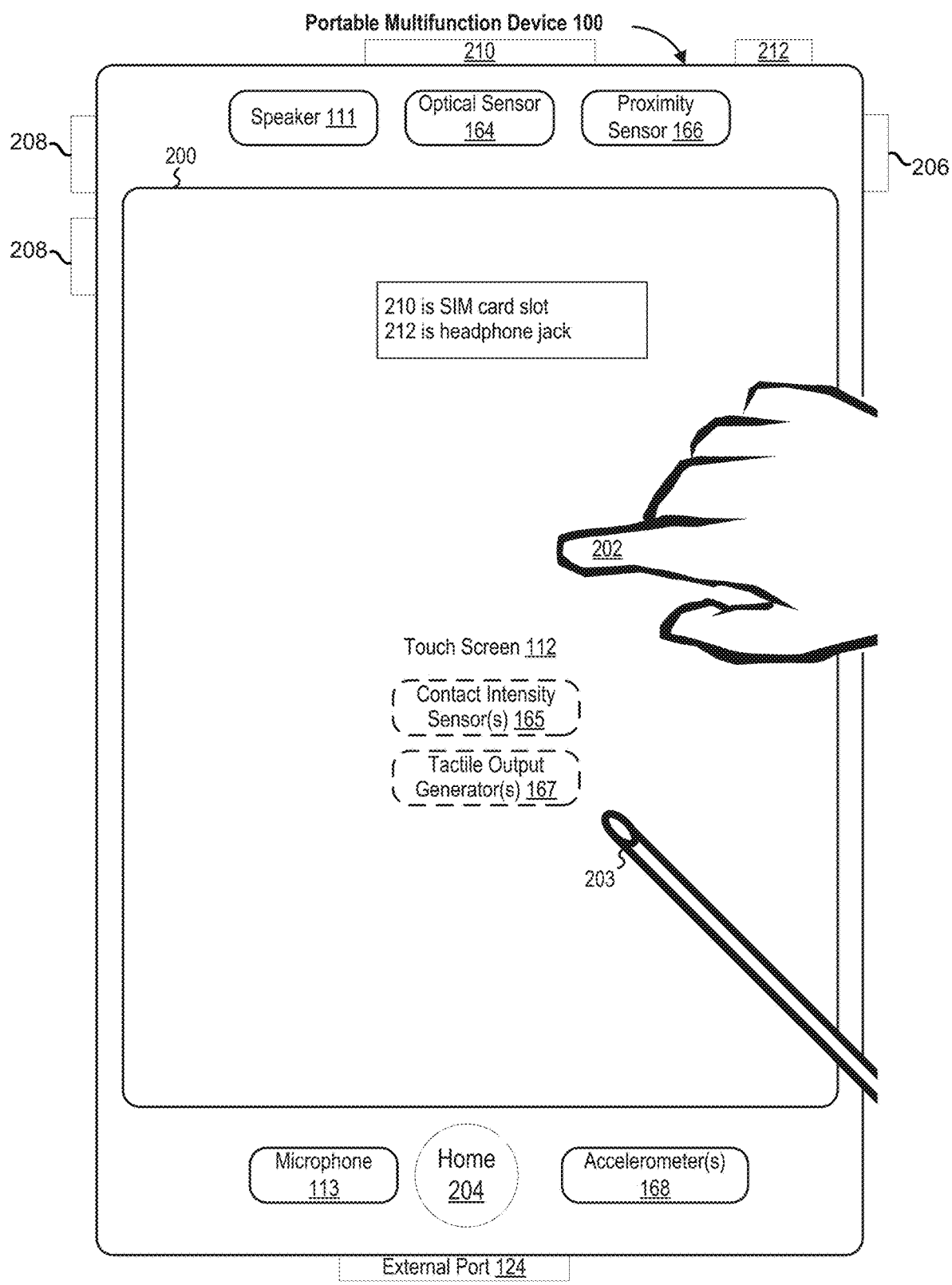
FIG. 2 illustrates a portable multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
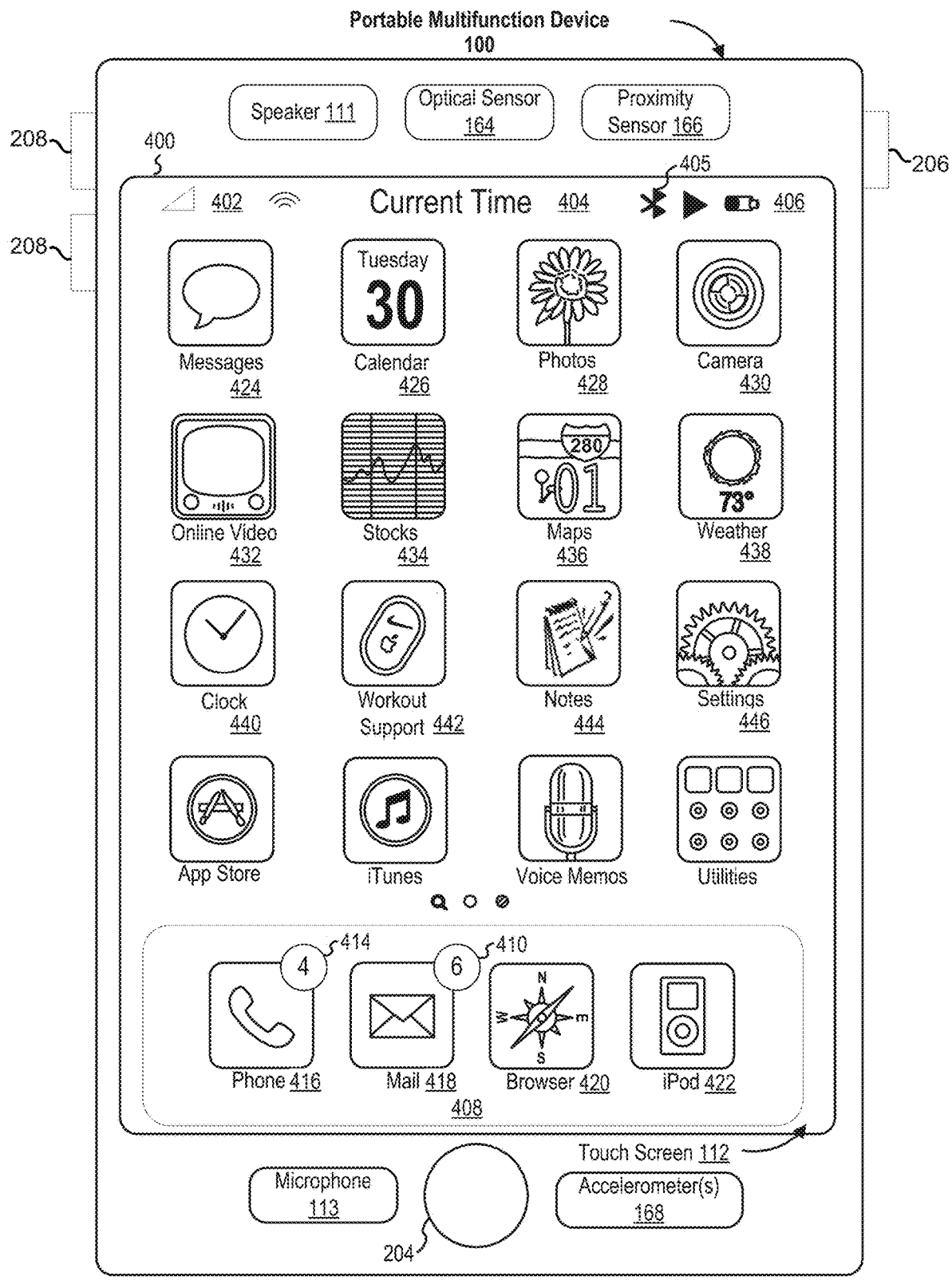
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
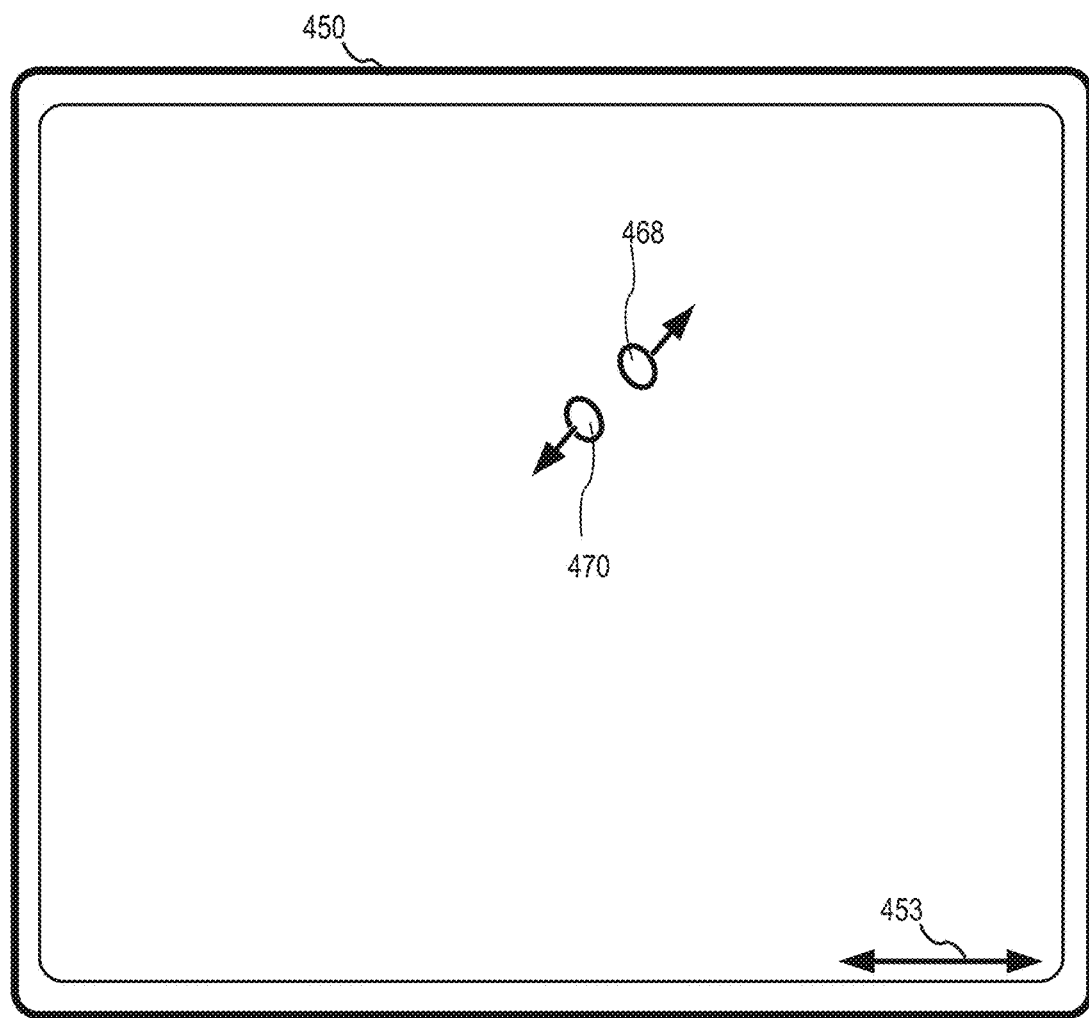
FIG. 4B illustrates an exemplary user interface for a multifunction device with a touch-sensitive surface that is separate from the display in accordance with some embodiments.
Figure 4B:
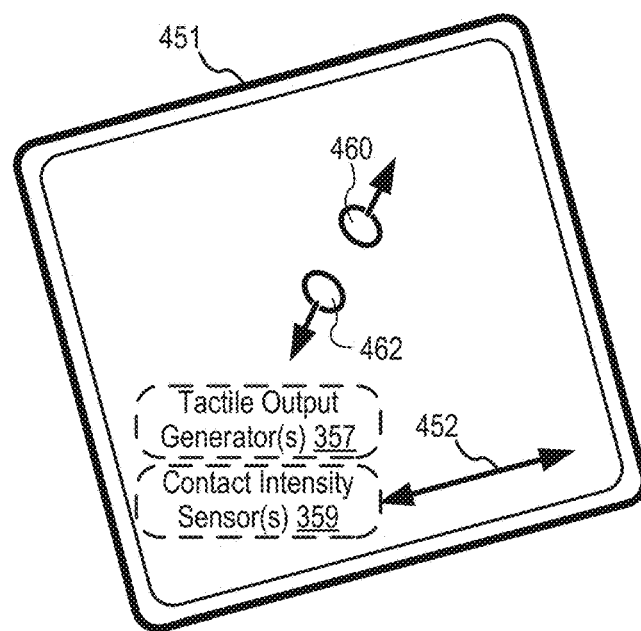

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For case of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
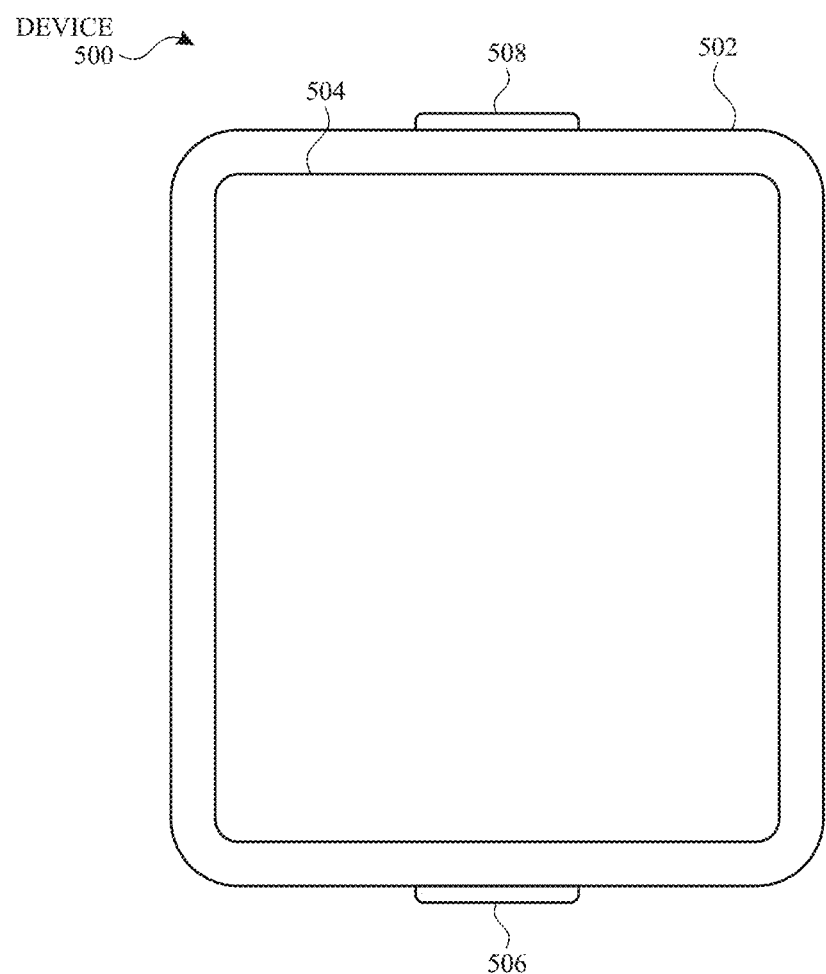
FIG. 5A illustrates a personal electronic device in accordance with some embodiments.
Figure 5B:
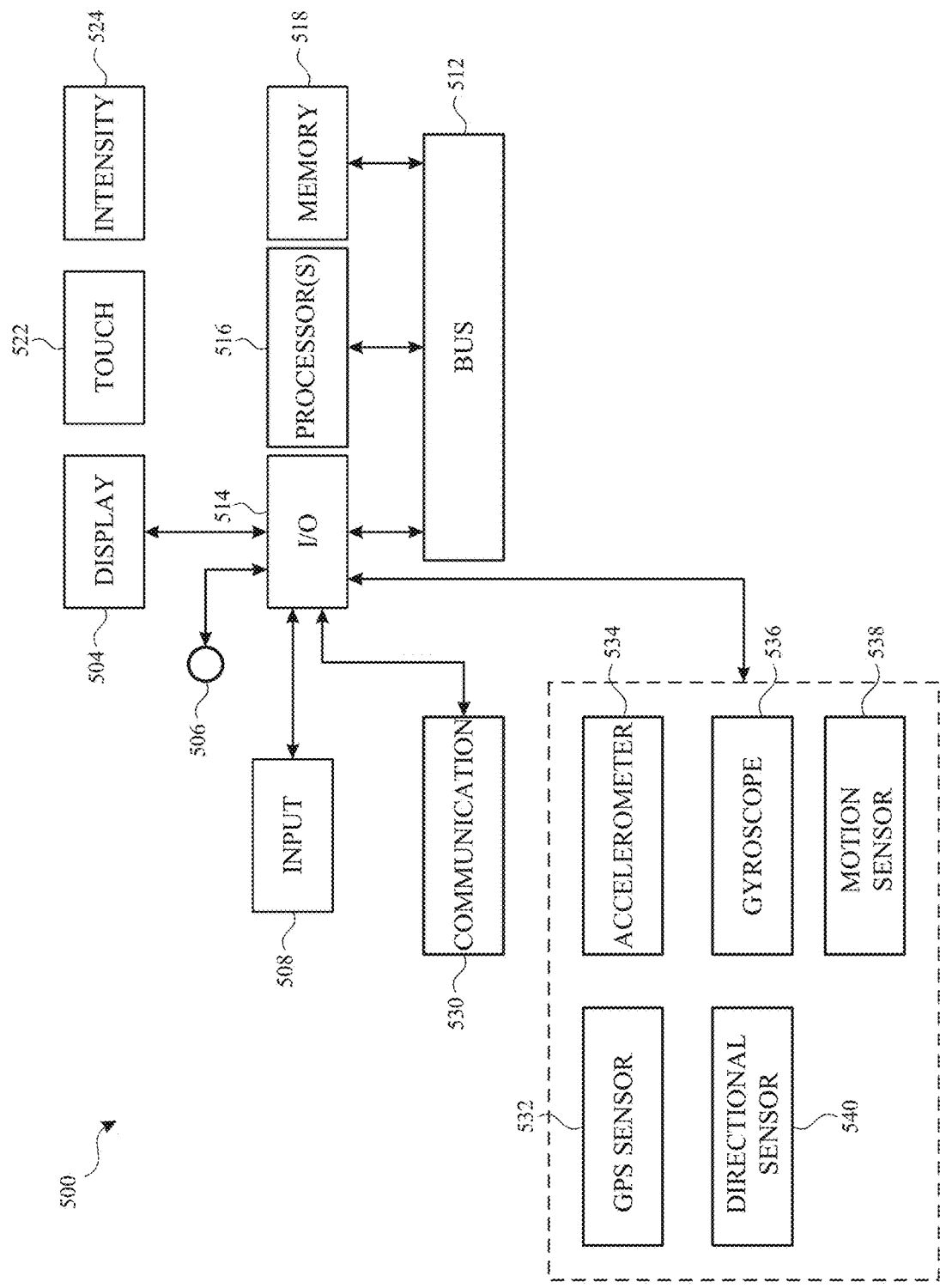
FIG. 5B is a block diagram illustrating a personal electronic device in accordance with some embodiments.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700 and/or 900). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIGS. 5, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
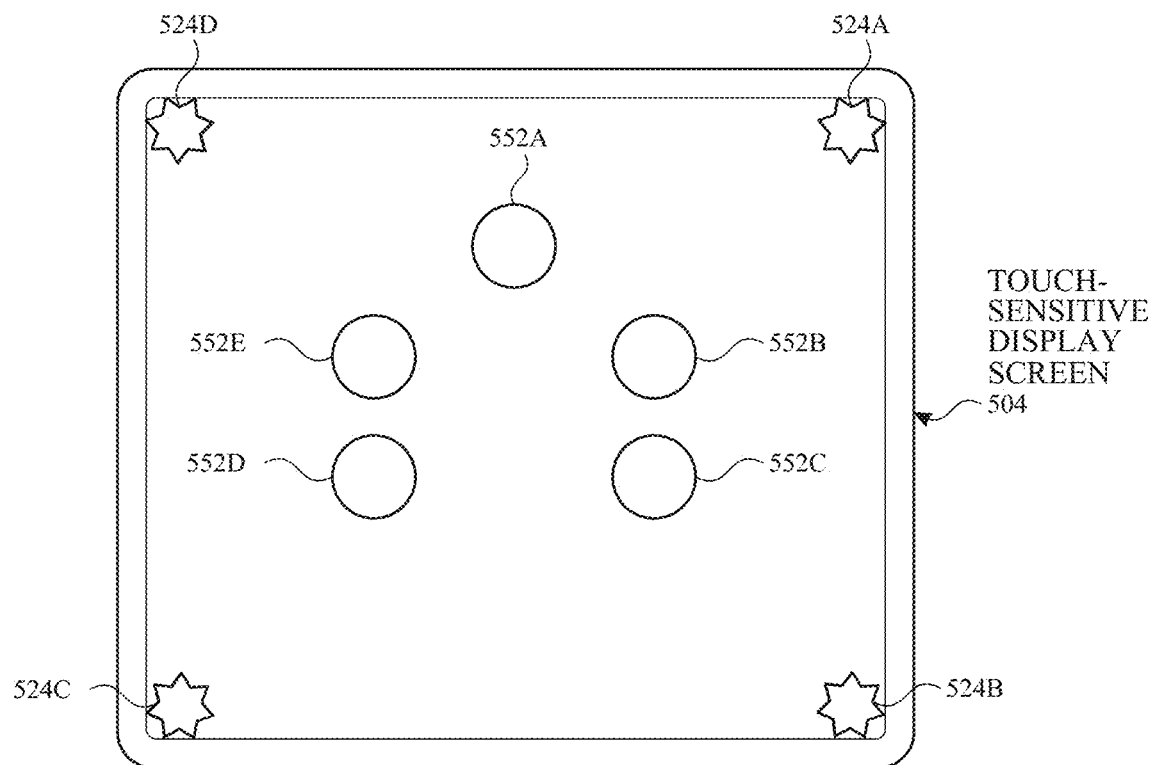
FIGS. 5C-5D illustrate exemplary components of a personal electronic device having a touch-sensitive display and intensity sensors in accordance with some embodiments.
Figure 5C:
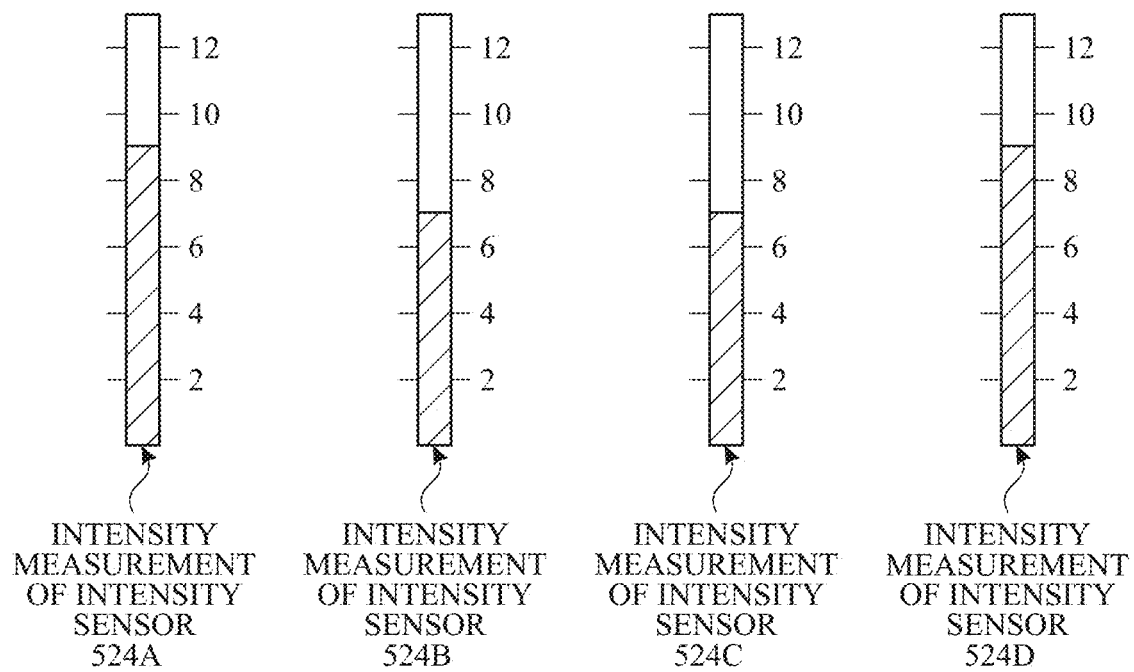
Figure 5D:
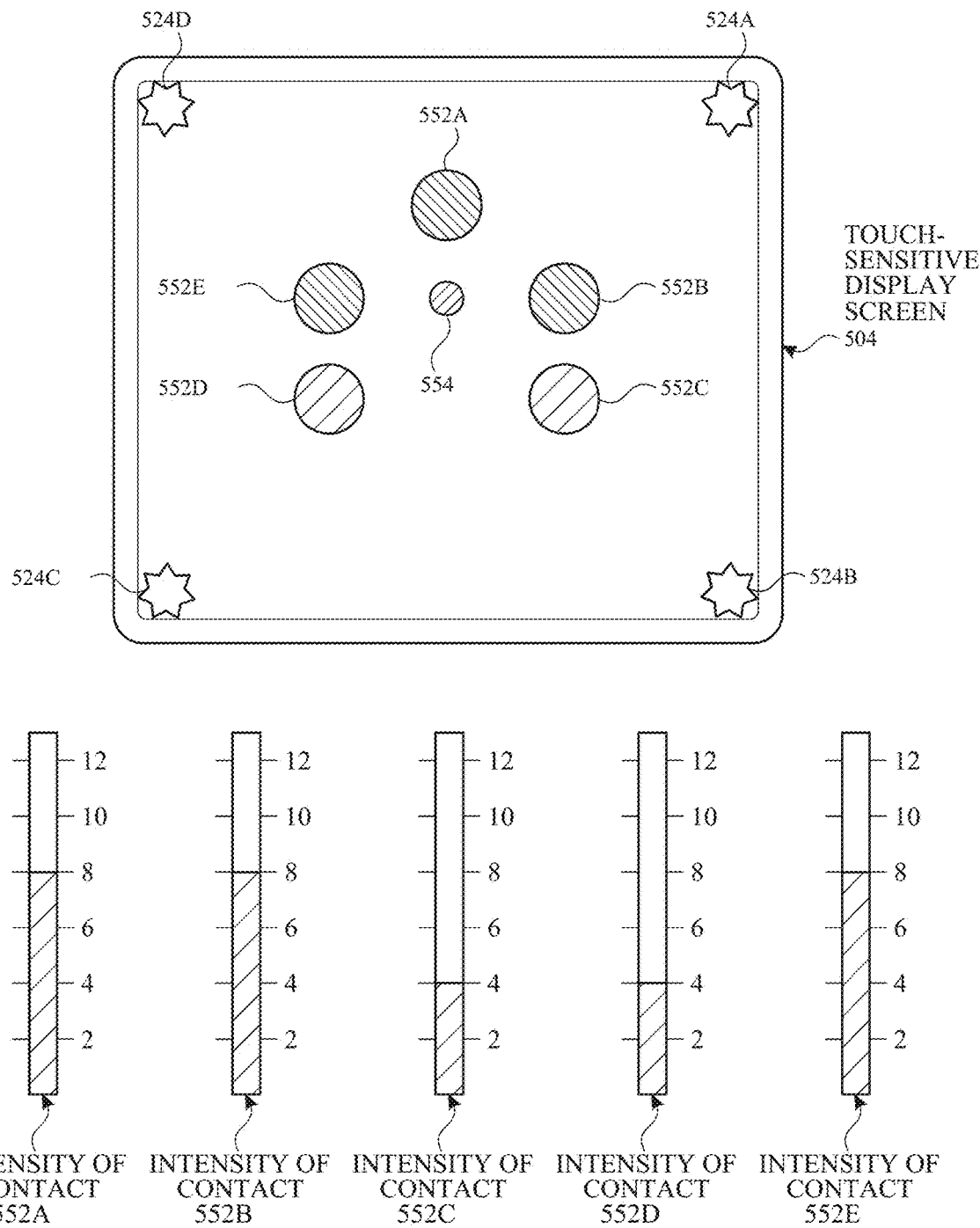

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
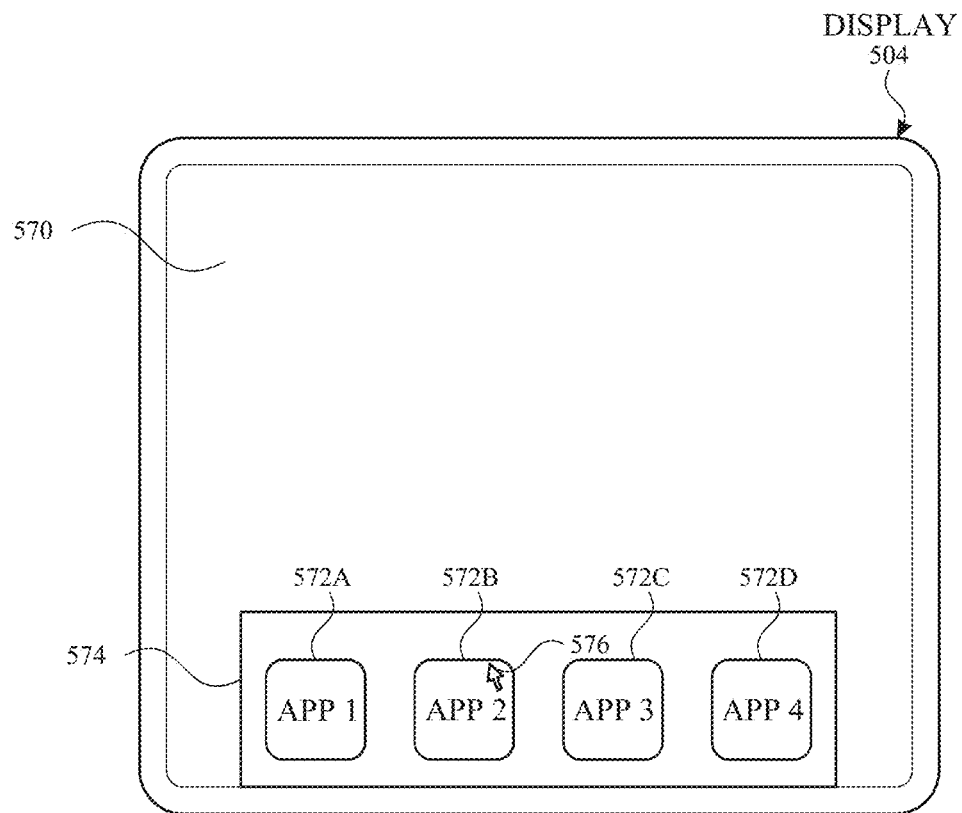
FIGS. 5E-5H illustrate exemplary components and user interfaces of a personal electronic device in accordance with some embodiments.
Figure 5E:
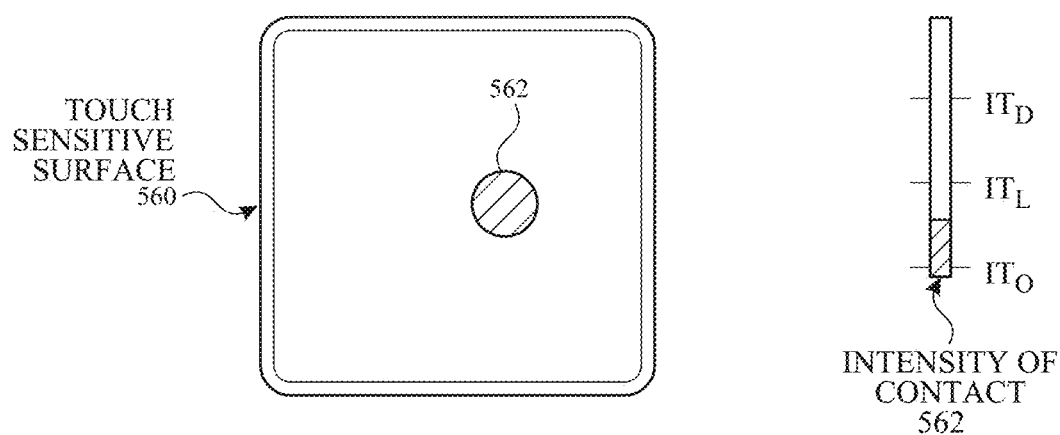
Figure 5F:
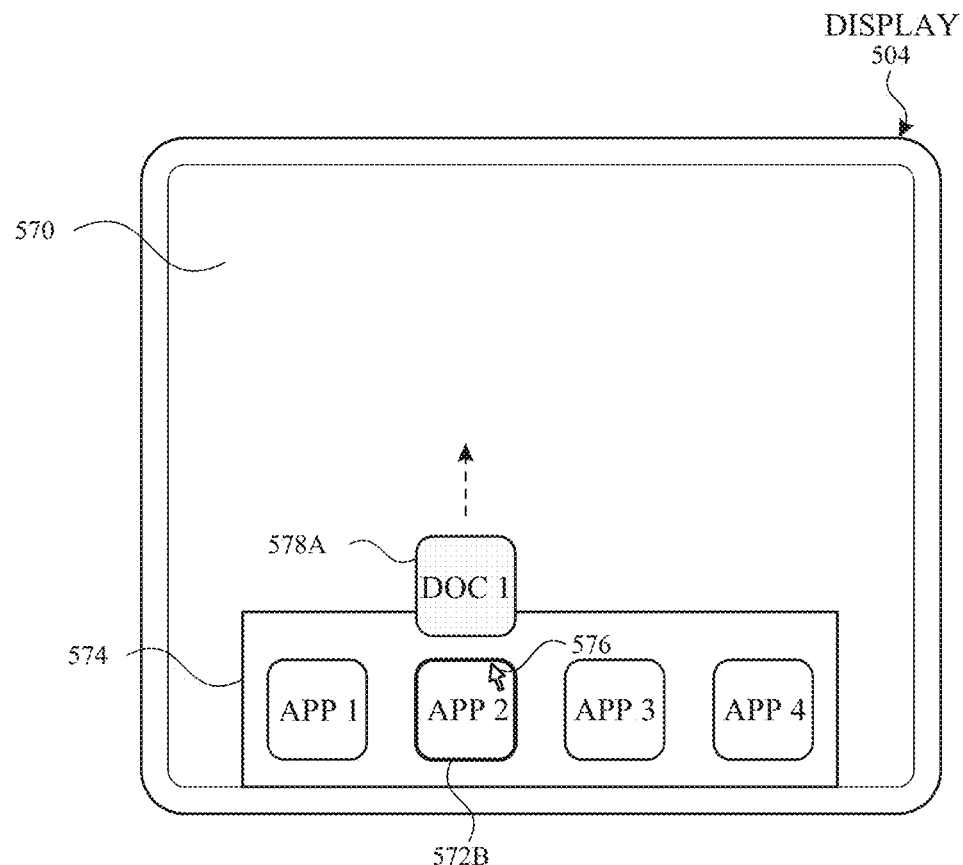
Figure 5F:
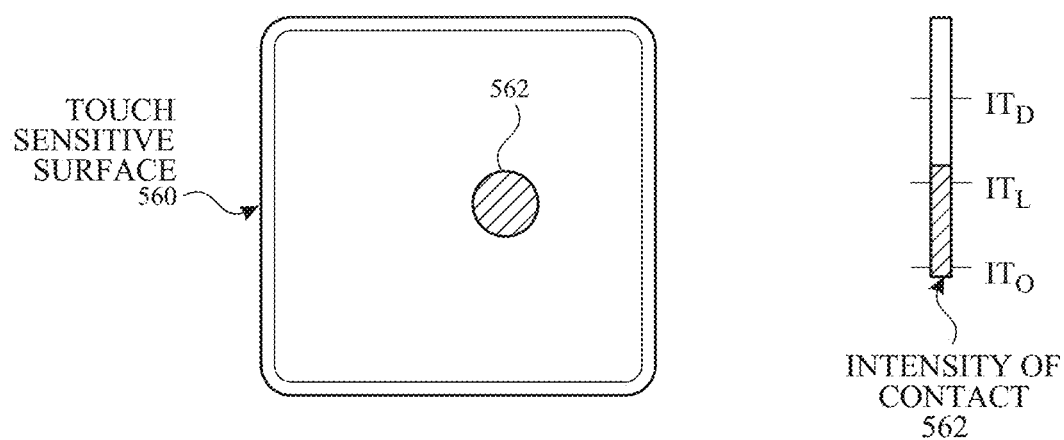
Figure 5G:
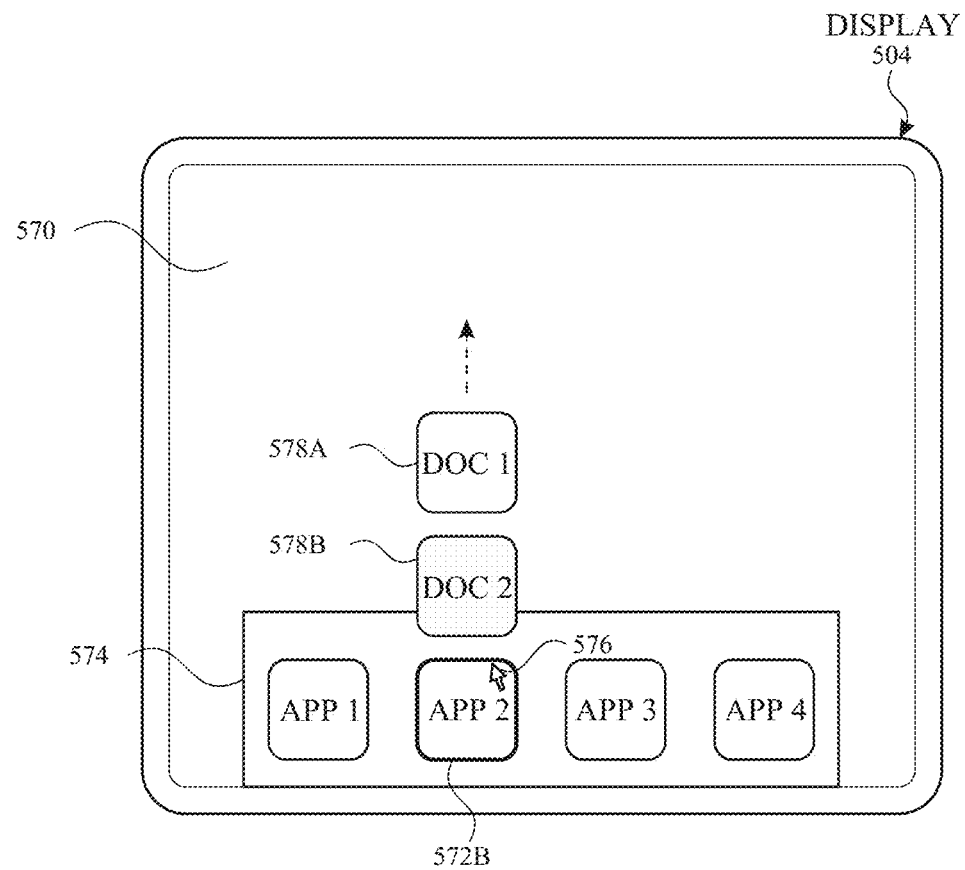
Figure 5G:
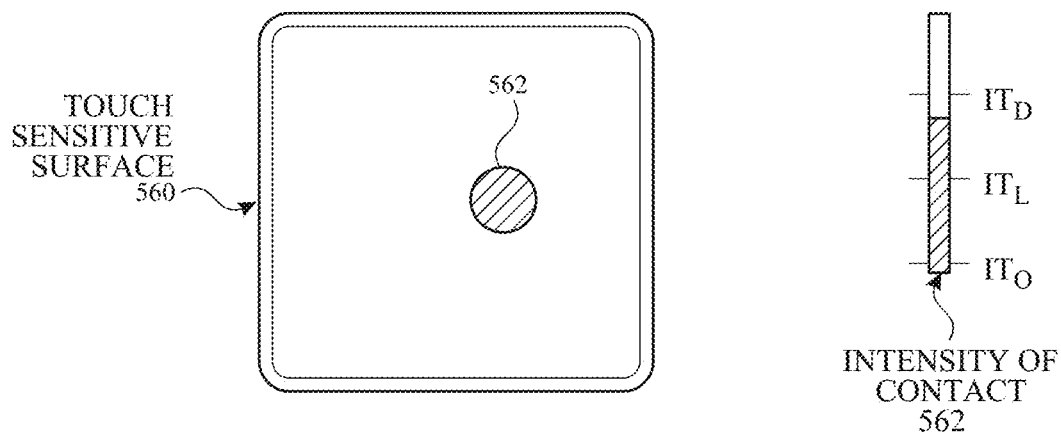
Figure 5H:
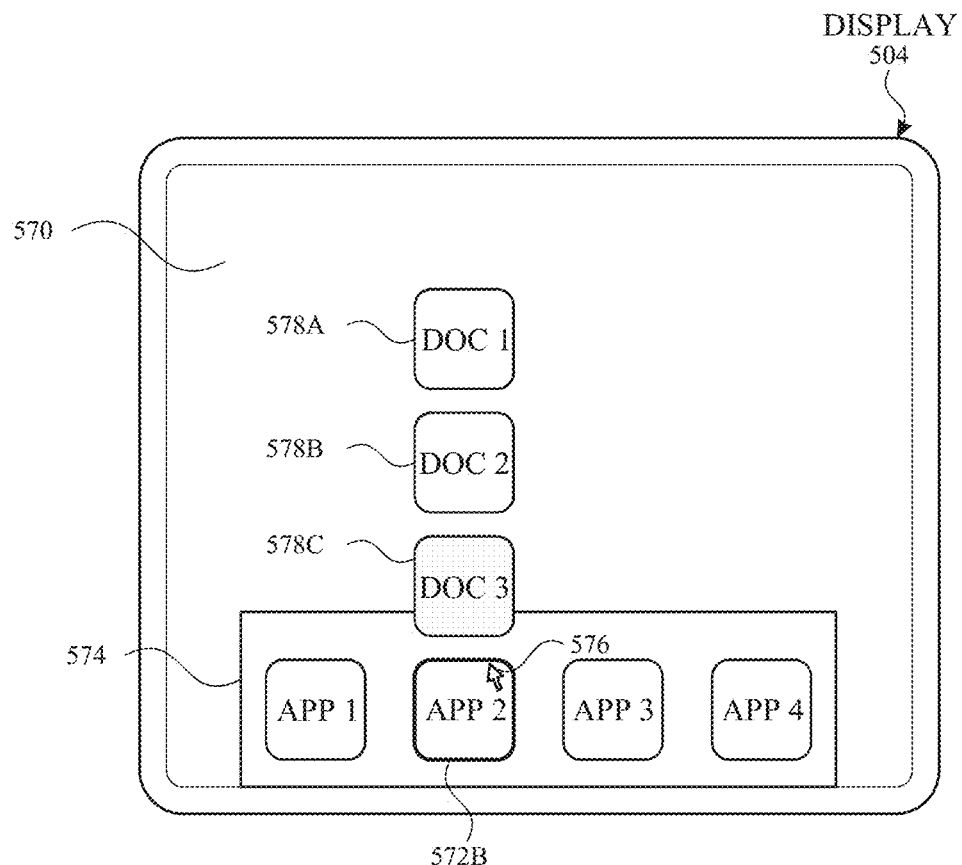
Figure 5H:
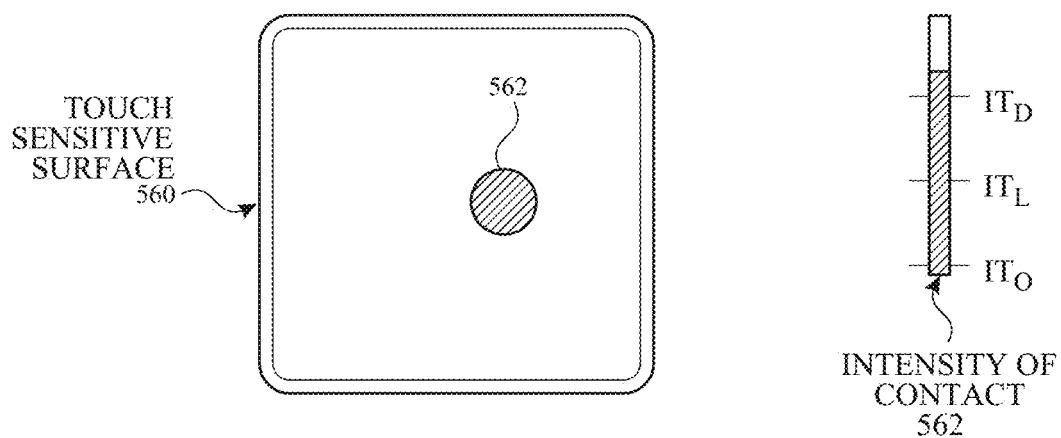

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as device 100, device 300, or device 500.

User Interfaces and Associated Processes
Initiating a Communication Session and Playing Content Users interact with electronic devices in many different manners. In some embodiments, an electronic device is connected to one or more output devices, such as a display generation component and/or a speaker. In some embodiments, in response to detecting another electronic device is within a threshold distance of the electronic device, the electronic device initiates a communication session with the other electronic device. This communication session allows the other electronic device to control playback of content by the electronic device using the one or more output devices. The embodiments described below provide ways in which the electronic device initiates a communication session with the other electronic device. Allowing another electronic device to join a communication session with the electronic device to control the playback of content items enable users of the electronic devices to easily share and play content, thereby reducing the need for additional inputs to share and play content which enables the users of both electronic devices to use the electronic devices more efficiently. It is understood that people use devices. When a person uses a device, that person is optionally referred to as a user of the device.

When people get together, they sometimes like to share content (e.g., music) and spend time watching, listening (or experiencing) the content together. For example, on a road trip, passengers in a vehicle may want to listen to music or podcasts together. Currently, one device (e.g., a mobile device, such as a smartphone, tablet, or wearable device) in the vehicle controls the content being played to everyone over the vehicle speakers. In some cases, the electronic device can connect to the vehicle speakers (e.g., via Bluetooth, a vehicle infotainment system as described above, or some other mobile app or standard that enables a car radio or head unit to be a display and controller for another device (e.g., a smartphone, wearable, or other electronic device)). If multiple people want to add content or change the playing content, they must use either the car stereo or the one device connected to the car speakers.

An example embodiment allows multiple devices to connect and share content to a communication session so that multiple people can share and change content playing from one device (e.g., the device connected to the car speakers, or other speakers such as Bluetooth speakers, TV speakers, and/or smart speakers). For example, other devices can connect to the electronic device that controls the content being played using the speakers to also control the content being played using the speakers, using the electronic device as a "hub" for controlling the speakers. In some embodiments, the other devices are not directly connected to the car speakers and/or other speakers that are playing content, but rather utilize the connection of the "hub" device to those speakers to cause playback of content through those speakers (including in scenarios where the connection protocol between the "hub" device and the speakers is one that can only support a connection between the speakers and a single device). Similar communication sessions can be set up to be used at a gathering of people (e.g., a house party or beach party) where one device is connected to a smart speaker, a TV, or some other communal device (e.g., a smart speaker, a smart TV, a set-top box, a tablet, a wearable device (e.g., watch, headset, moveable electronic platform) and other devices connect to a communication session to share and edit playing content.

Figure 6B:
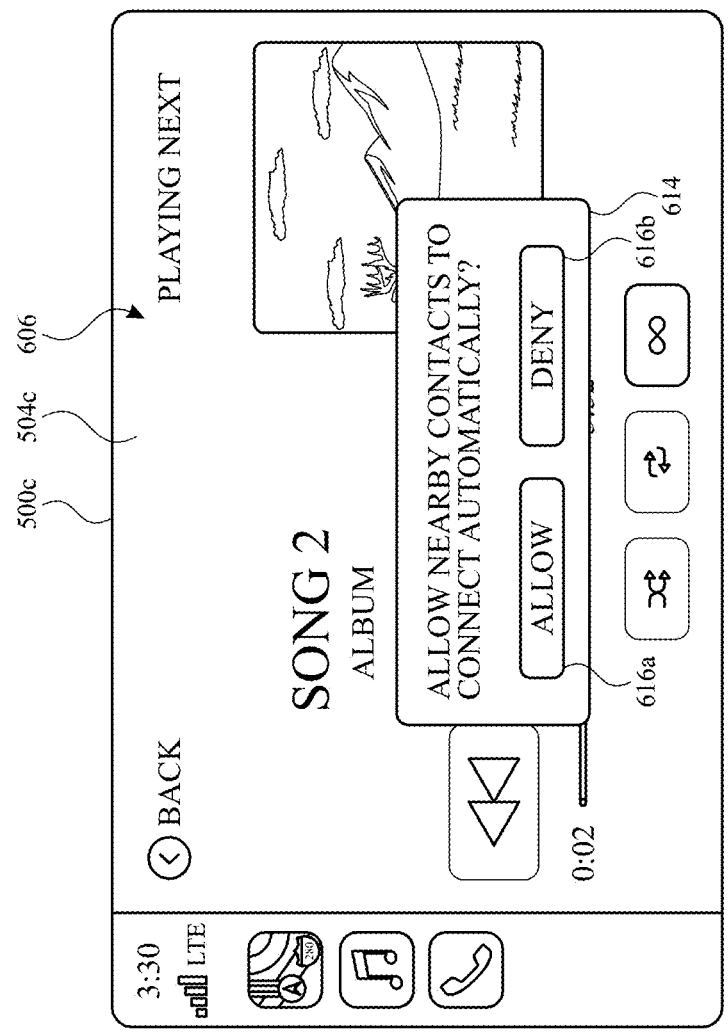
FIGS. 6A-6N illustrate examples in which an electronic device initiates a communication session with another electronic device in accordance with some embodiments of the disclosure.
Figure 6C:
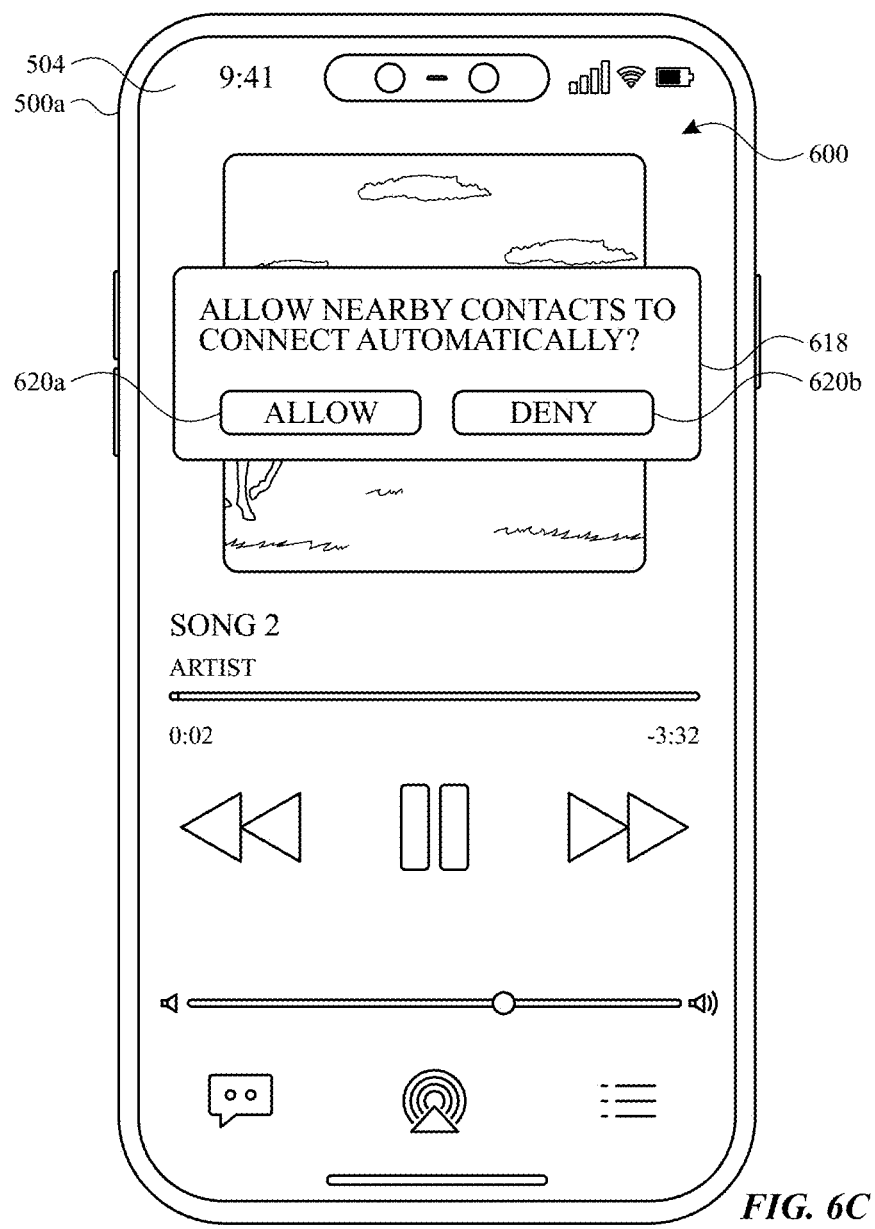
Figure 6D:
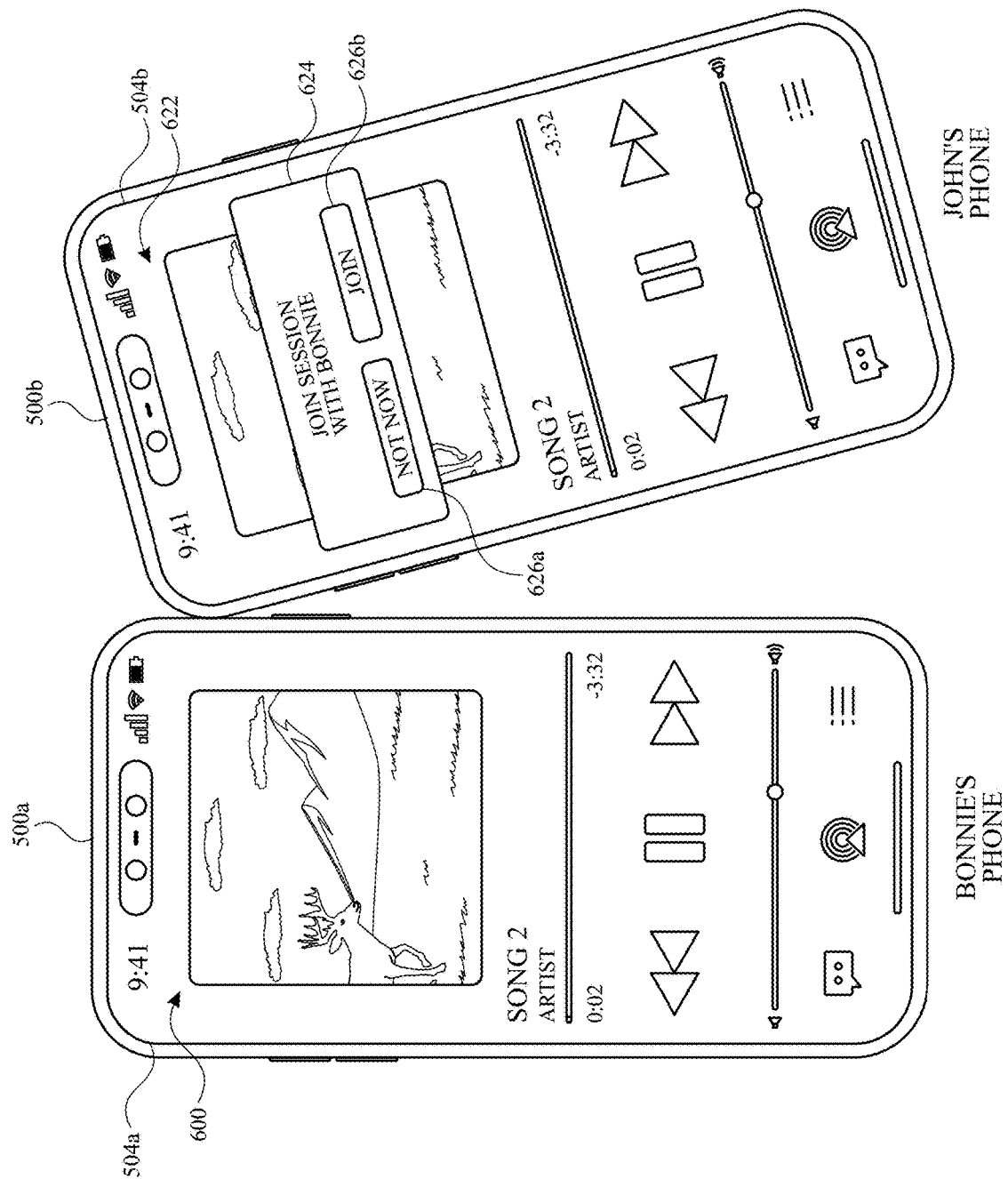
Figure 6E:
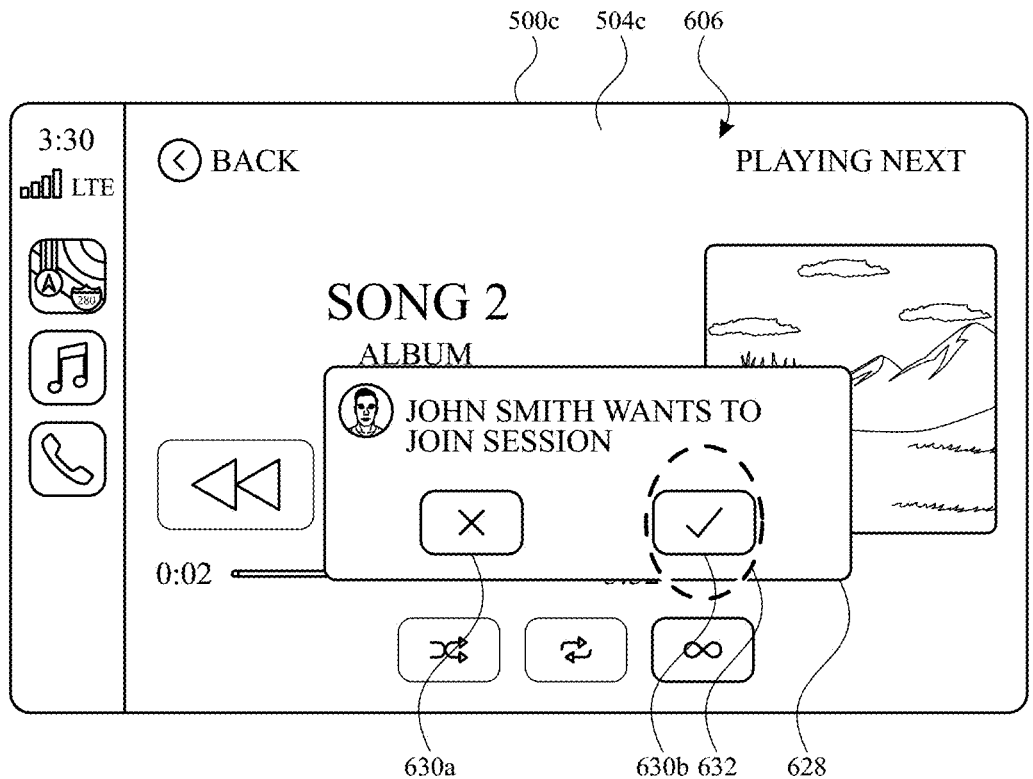
Figure 6F:
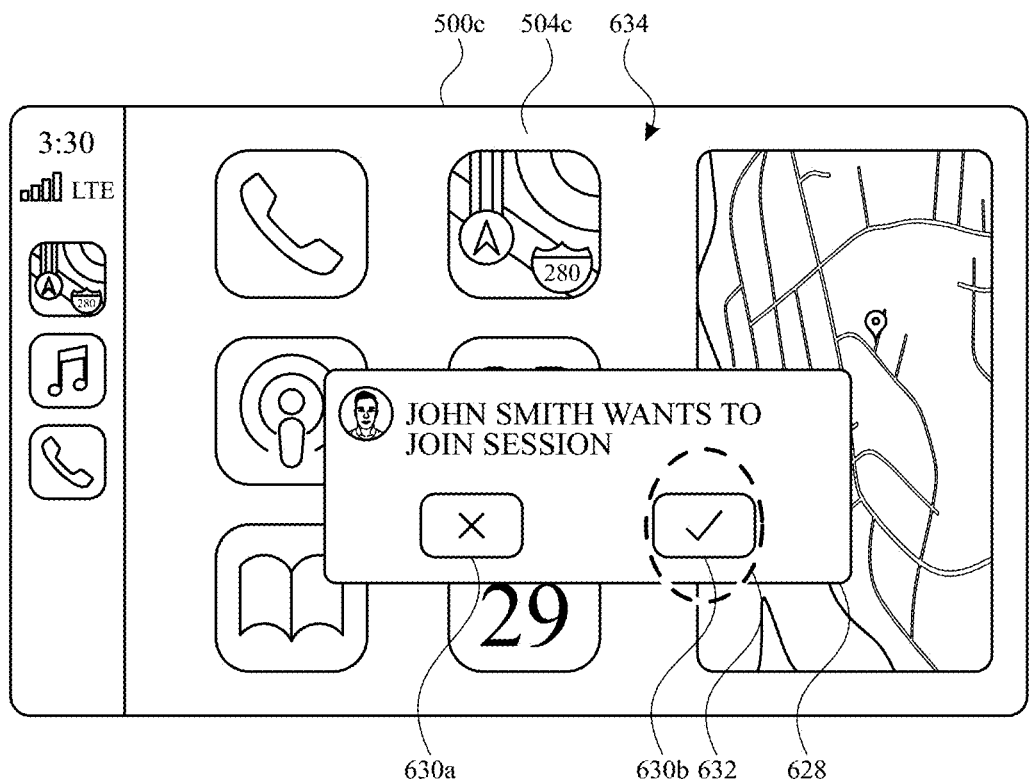
Figure 6G:
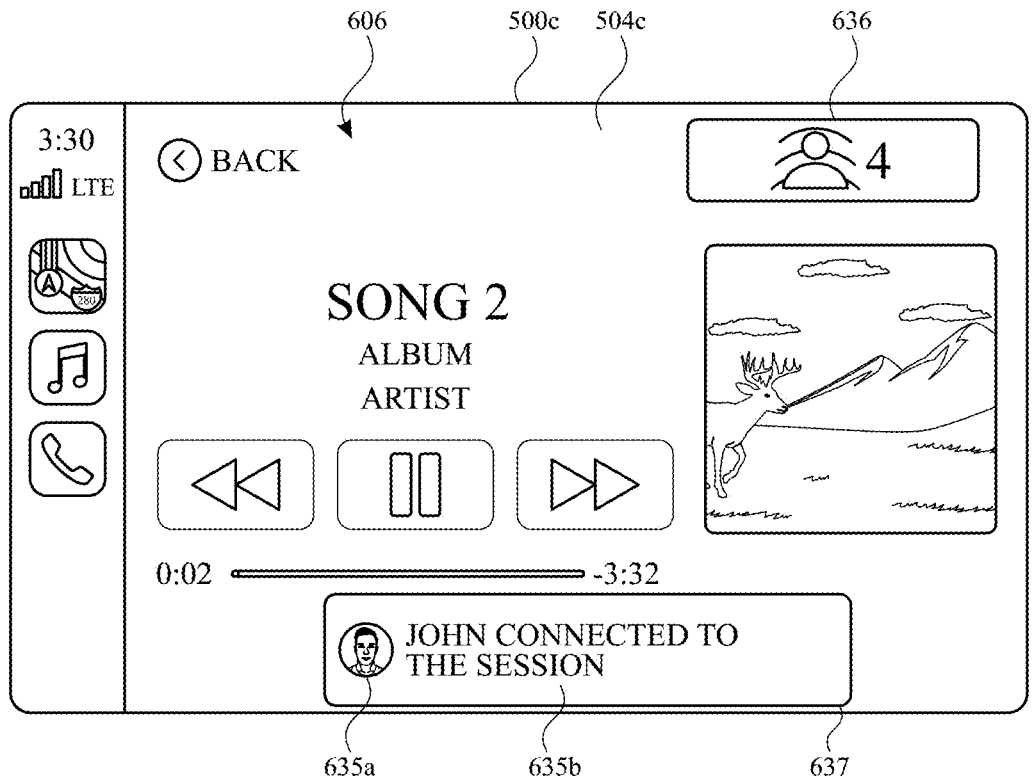
Figure 6H:
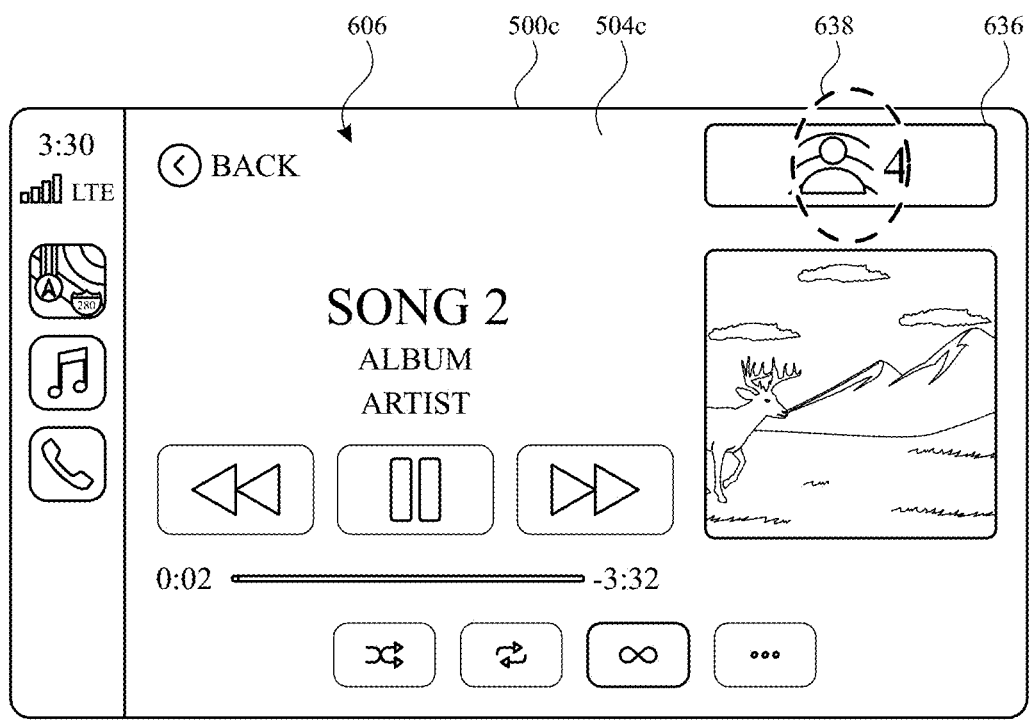
Figure 6I:
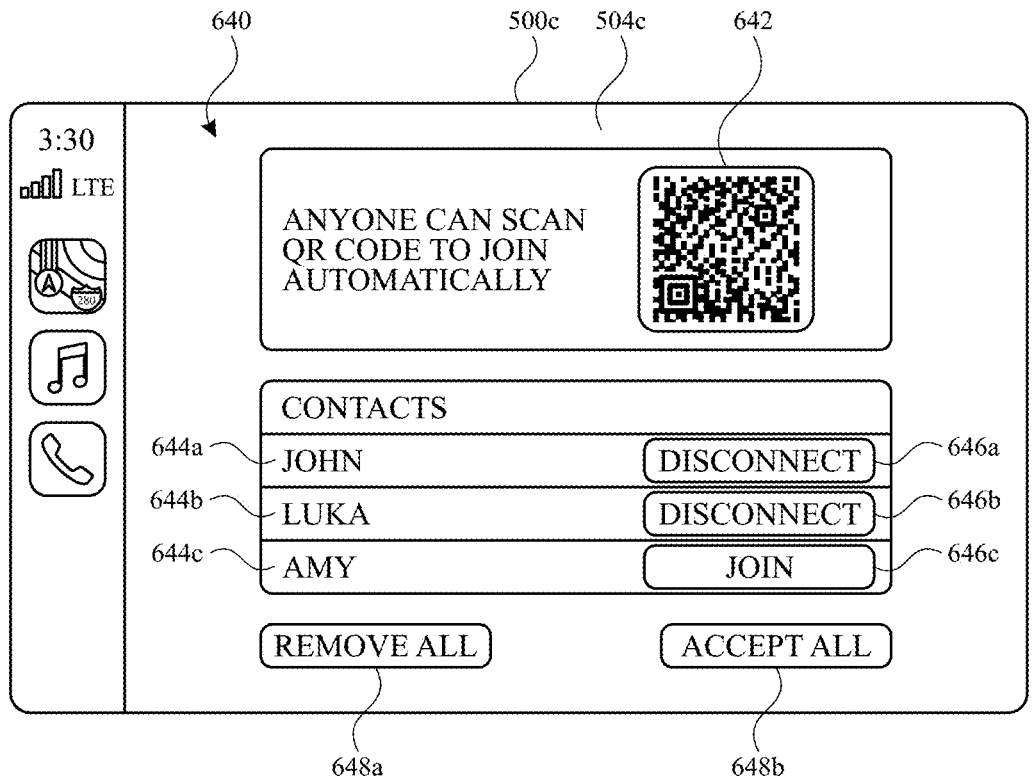
Figure 6J:
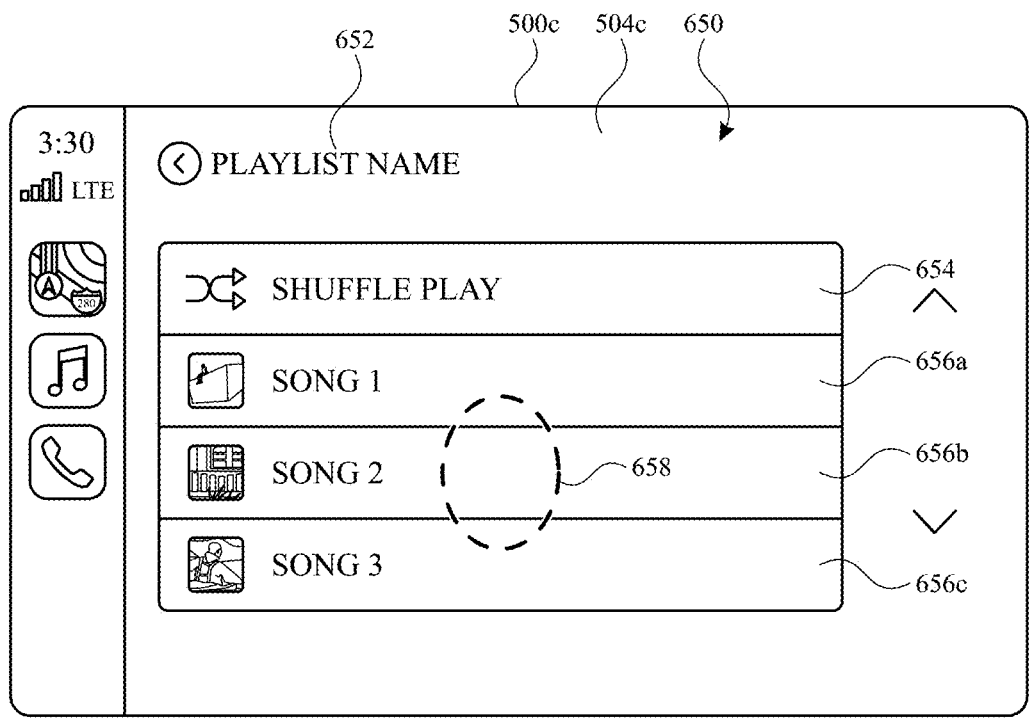
Figure 6K:
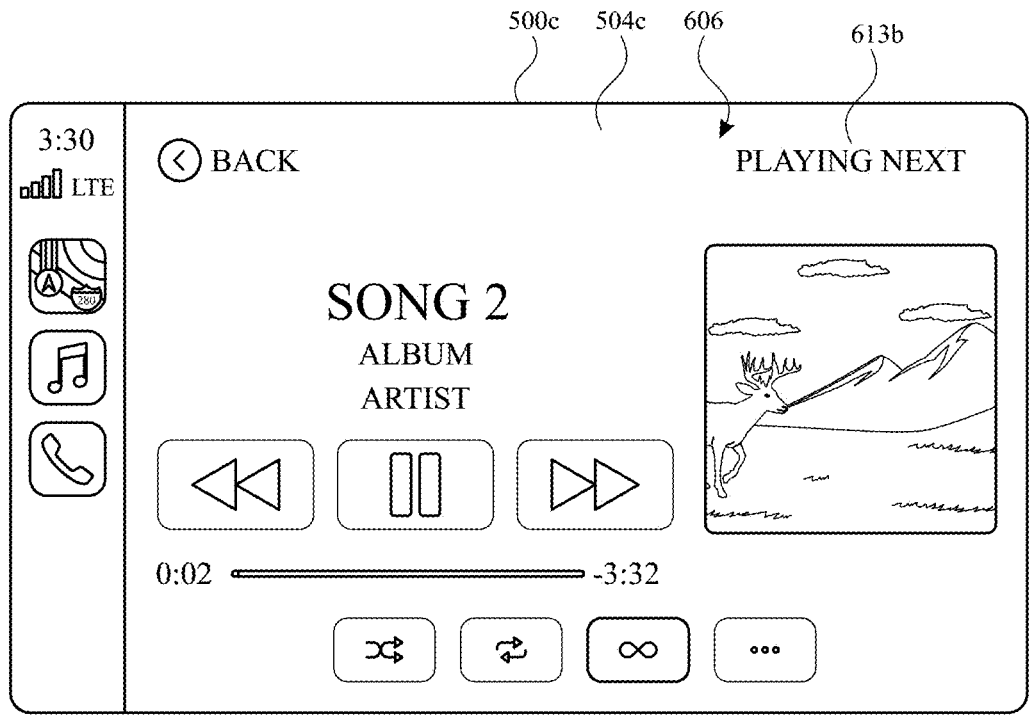
Figure 6L:
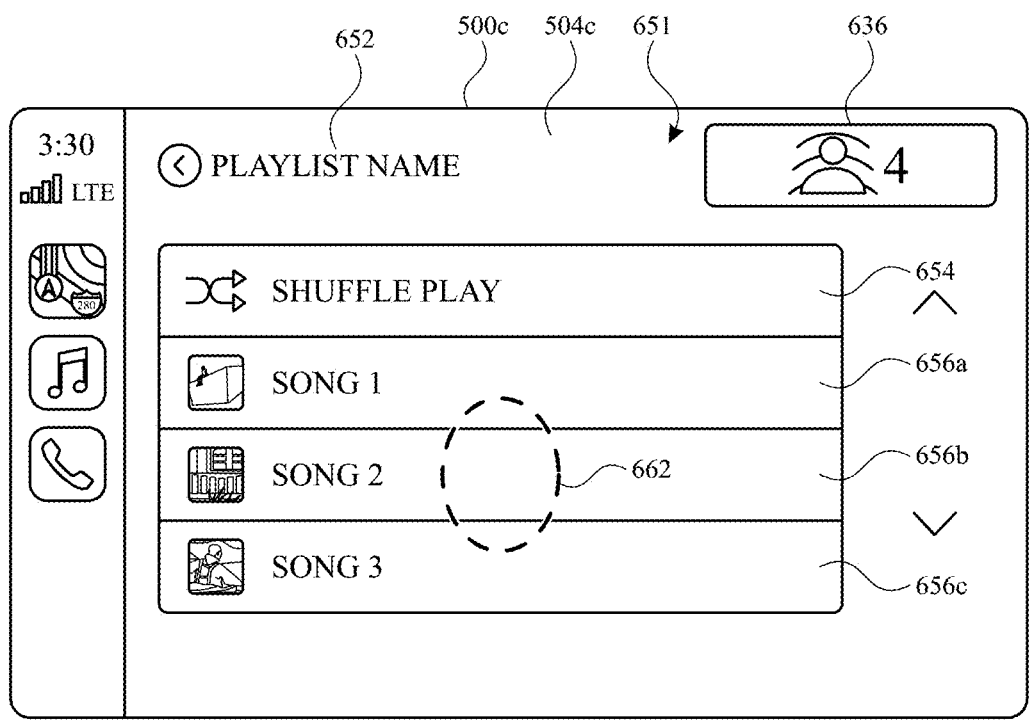
Figure 6M:
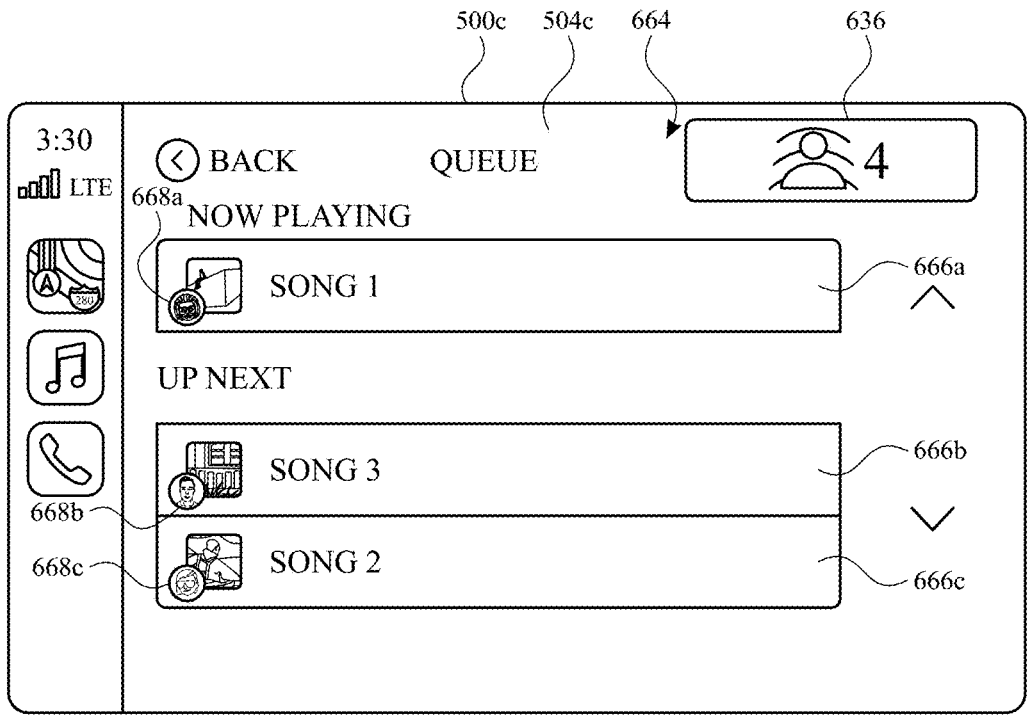
Figure 6N:
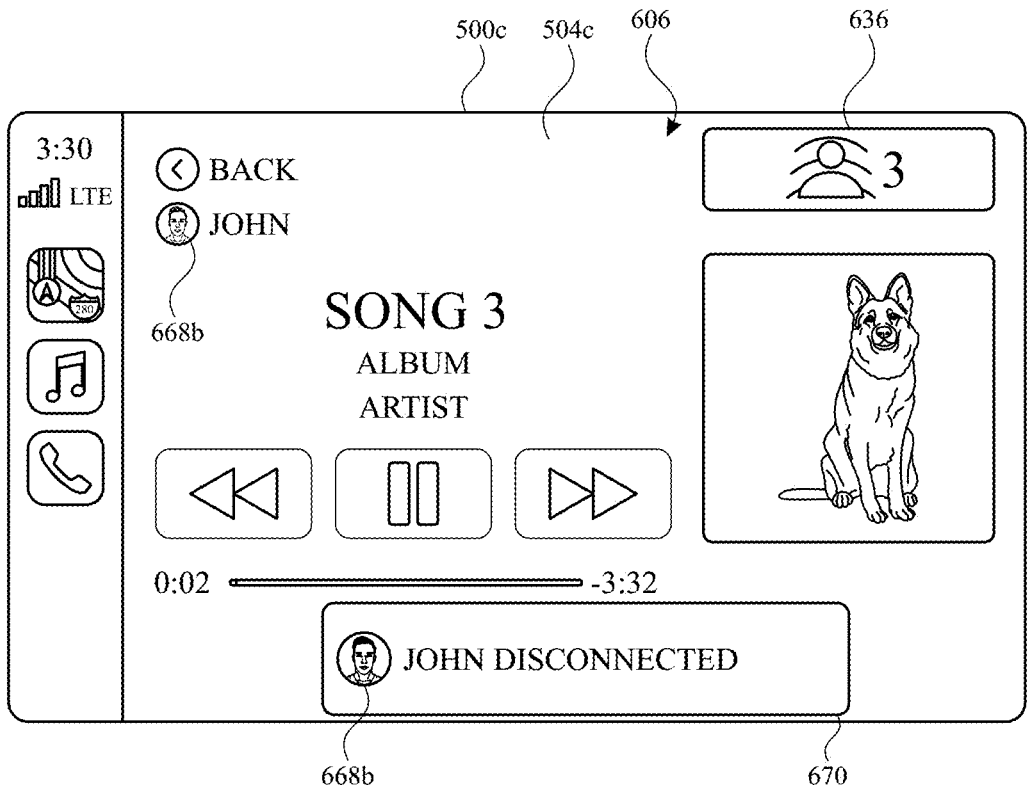

FIGS. 6A-6N illustrate exemplary ways in which an electronic device 500a can act as a hub and initiates a communication session with other electronic devices. Often, Bluetooth speakers, a smart TV, other home or vehicle devices and infotainment systems allow only one device to be connected at a given time to control and output of content. In an implementation, the electronic device 500a can act as a hub for multiple devices to access and control content on these other platform and devices. Instead of having to disconnect and reconnect multiple devices, users can connect to these other devices through a communication session established on one electronic device that is in connection with the other devices. The embodiments in these figures are used to illustrate the processes described below, including the processes described with reference to FIG. 7. Although FIGS. 6A-6N illustrate various examples of ways an electronic device is able to perform the processes described below with respect to FIG. 7, it should be understood that these examples are not meant to be limiting, and the electronic device is able to perform one or more processes described below with reference to FIG. 7 in ways not expressly described with reference to FIGS. 6A-6N.

FIG. 6A illustrates the electronic device 500a with a display generation component 504a in communication 602 with another electronic device 500c with a display generation component 504c. In some embodiments, the electronic device 500a is connected to the electronic device 500c wirelessly or with wires. For example, and as described in method 700, the electronic device 500a is connected to another electronic device 500c using Bluetooth, USB-C, USB-A, Airplay (e.g., a wireless protocol), or other forms of wireless or wired connections. In some embodiments, the electronic device 500a is a mobile device, such as a smartphone, tablet, or wearable device. In some embodiments, the electronic device 500c is a vehicle infotainment device. In some embodiments, the electronic device 500c is a headset, TV, speaker, or other communal device. In some embodiments, the display generation component 504a and the display generation component 504b component are hardware components (e.g., including electrical components) capable of receiving display data and displaying a user interface. In some embodiments, examples of the display generation component 504a and the display generation component 504c include a touch screen display, a monitor, a television, a projector, an integrated, discrete, or external display device, or any other suitable display device that is in communication with an electronic device 500a. In some embodiments, the display generation component 504a and the display generation component 504c component include one or more of the features described with reference to method 700.

Examples described herein illustrate the electronic device 500a controlling playback of content by electronic device 500c, which is associated with display generation component 504b. However, it should be understood that, in some embodiments, electronic device 500a controls playback of content by another electronic device that is not associated with a dedicated display generation component. For example, the electronic device 500a controls playback of content using speakers that do not include a display generation component without departing from the scope of the disclosure.

In some embodiments, an electronic device 500a includes a content (e.g., playback, browsing, streaming, and/or sharing) application. In some embodiments, the content application is a music, podcast, video, or other content application, as described with reference to method 700. In some embodiments, the content application includes user interface 600, which includes an image 603 (e.g., album artwork) associated with a content item that is currently playing via the content application. In some embodiments, the user interface includes an indication 604a of the title and artist of the content item (e.g., a song) and user interface elements 604b through 604i for modifying playback of the content item. In some embodiments, in response to detecting an input (e.g., a gaze of the user, a contact on a touch-sensitive surface, actuation of a physical input device of the vehicle, a predefined gesture (e.g., pinch gesture or air tap gesture) and/or a voice input from the user) directed to one of the user interface elements 604b through 604i, the electronic device 500a modifies playback of the content item currently playing via the content application. In some embodiments, in response to detecting the selection of user interface element 604b, which includes a scrubber bar that indicates the playback position of the content item currently being played, and in response to detecting an input directed to the user interface element 604b, the electronic device 500a updates the playback position of the content item in accordance with the input. In some embodiments, in response to detecting selection of user interface element 604c, the electronic device 500a restarts the content item that is currently playing or play a previous item in the content item playback queue. In some embodiments, in response to detecting selection of user interface element 604d, the electronic device 500a plays the content item and updates the user interface element 604d to be a user interface element that, when selected, causes the electronic device 500a to pause playback of the content item. In some embodiments, in response to detecting selection of user interface element 604c, the electronic device 500a ceases playback of the currently-playing content item and initiates playback of the next content item in the content playback queue. In some embodiments, in response receiving an input directed to user interface element 604f, the electronic device 500a adjusts the playback volume of audio content of the content item. In some embodiments, in response to receiving an input selecting user interface element 604g, the electronic device 500a displays time-synchronized lyrics of the content item on the user interface 600. In some embodiments, in response to the selection of user interface element 604h, the electronic device 500a displays one or more audio output settings to configure the output of the audio portion of the content item (e.g., selecting an output device). In some embodiments, in response to the selection of user interface element 604i, the electronic device 500a displays a content playback queue, as described in greater detail in method 700.

In some embodiments, the electronic device 500a is in communication 602 with the electronic device 500c, such as a vehicle information and entertainment system (e.g., infotainment system) with the display generation component 504c and a speaker. In some embodiments, the electronic device 500a can be a computing device, or multiple computing devices, configured to store, generate, and/or provide data to various user devices and/or the vehicle systems, as described herein. For example, the functionality described herein with reference to the electronic device 500a can be performed by a single computing device or can be distributed amongst multiple computing devices.

As shown in FIG. 6A, the electronic device 500c presents a content user interface 606 (e.g., of a content application installed on electronic device 500a) via the display generation component 504c. In some embodiments, the electronic device 500c displays user interface 606 while the electronic device 500a has user interface 600 displayed and the two devices are in communication 602. In some embodiments, the electronic device 500c can display user interface 606 while the electronic device 500a does not have user interface 600 displayed and the two devices are in communication 602. In some embodiments, the electronic device 500a provides data relating to the content application to the electronic device 500c with or without the content application running on the electronic device 500a. In some embodiments, user interface 606 has one or more characteristics of user interface 600 on electronic device 500a. For example, user interface 606 includes an image 608 and user interface elements 610a through 610e which corresponds to image 603 and user interface elements 604a through 604e of user interface 600. User interface 606 also include user interface elements 610f through 610h, which differ from user interface elements 604f through 604i. In some embodiments, in response to detecting selection of user interface element 610f, the electronic device 500c either shuffles playback or transmits instructions to the electronic device 500a to shuffle the playback order of content items in a list with a predetermined order, such as a playlist or album. In some embodiments, in response to detecting selection of user interface element 610g, the electronic device 500c repeats playback or transmits instructions to the electronic device 500a to repeat the playback of the currently-playing content item or a currently-playing collection of content items (e.g., an album or playlist). In some embodiments, in response to detecting selection of user interface element 610h, the electronic device 500c recommended content items or transmits instructions to the electronic device 500a to play content items recommended based on a currently-playing collection of content items at the conclusion of playback of the collection of content items. In some embodiments, the electronic device 500c detects user input (e.g., a gaze of the user, a contact on a touch-sensitive surface, actuation of a physical input device of the vehicle, a predefined gesture (e.g., pinch gesture or air tap gesture) and/or a voice input from the user) corresponding to selection of one of the user interface elements 610b through 610h, and in response, the electronic device 500c modifies playback of a content item as described above. In some embodiments, electronic device 500c also includes user interface elements 613a and 613b, shown in FIG. 6A. In some embodiments, in response to detecting selection of user interface element 613a, the electronic device 500c returns to a previously-displayed user interface (e.g., a playlist user interface, a home page user interface, or other user interface). In some embodiments, in response to detecting selection of user interface element 613b, the electronic device 500c initiates playback of the next content item in the content playback queue.

As shown in FIG. 6A, electronic device 500c also includes user interface 611, which includes user interface elements 612a through 612d to navigate to other user interfaces. In some embodiments, in response to detecting selection of user interface element 612a, the electronic device 500c displays a maps user interface of a maps application installed on electronic device 500a. In some embodiments, in response to detecting selection of user interface element 612b, the electronic device 500c displays a different user interface of a different content (e.g., music) application installed on electronic device 500a. In some embodiments, in response to detecting selection of user interface element 612*c*, the electronic device 500*c* displays a user interface of a telephone application installed on electronic device 500*a*. In some embodiments, the electronic device 500*c* detects user input (e.g., a gaze of the user, a contact on a touch-sensitive surface, actuation of a physical input device of the vehicle, a predefined gesture (e.g., pinch gesture or air tap gesture) and/or a voice input from the user) corresponding to selection of one of the user interface elements 612*a* through 612*c*, and in response, the electronic device displays a corresponding user interface described above.

In some embodiments, the electronic device 500*a* detects an electronic device 500*b* (shown in FIG. 6D) within a threshold distance of the electronic device 500*a* and while the electronic device 500*a* is in communication 602 with the electronic device 500*c*, described in greater detail in method 700. As shown in FIG. 6B, the electronic device 500*c* displays a user interface element 614 which includes the text "allow nearby contacts to connect automatically?", which asks the user associated with electronic device 500*c* (e.g., the same user associated with electronic device 500*a*) to allow other users of other electronic devices (e.g., electronic device 500*b*) to join a communication session that includes controlling playback of content items outputted by electronic device 500*c*. As shown in FIG. 6B, user interface element 614 also includes selectable option 616*a* and selectable option 616*b*. In some embodiments, in response to receiving an input directed to selectable option 616*a*, contacts of the electronic device 500*a* and/or the user account associated with electronic device 500*a*, described in greater detail in method 700, can join the communication session without additional input from the electronic device 500*a* and/or electronic device 500*c*. In some embodiments, in response to receiving an input directed to selectable option 616*b*, contacts of the electronic device 500*a* and/or the user account associated with the electronic device 500*a* cannot join the communication session without approval from the electronic device 500*a* and/or the electronic device 500*c*. In some embodiments, in response to receiving an input selecting either option 616*a* or option 616*b*, all electronic devices within the threshold distance of the electronic device 500*a* can join the communication session upon approval from the electronic device 500*a* or the electronic device 500*c*, by proxy.

In some embodiments, while the electronic device 500*a* detects an electronic device 500*b* within a threshold distance of the electronic device 500*a*, and while the electronic device 500*a* is in communication 602 with the electronic device 500*c*, the electronic device 500*a* displays a user interface element 618, shown in FIG. 6C. In some embodiments, the electronic device 500*c* displays user interface element 614, shown in FIG. 6B, while the electronic device 500*a* displays user interface element 618, shown in FIG. 6C. In some embodiments, user interface element 618 has one or more characteristics of user interface element 614. For example, user interface element 618 includes selectable option 620*a* and selectable option 620*b*, shown in FIG. 6C, which corresponds to selectable option 616*a* and selectable option 616*b*, respectively.

In some embodiments, the electronic device 500*a* can add an electronic device (e.g., 500*b*) to the communication session (creating a session between the electronic device 500*b* and the electronic device 500*a* to provide access to smart speakers or other output devices that are connected to electronic device 500*a* and not electronic device 500*b*) started by electronic device 500*a* using a near-field communication tag (NFC tag) located on each device. In some embodiments, the electronic device 500*b* "taps" the electronic device 500*a* for a threshold amount of time at a threshold distance from the electronic device 500*a*, as described in greater detail in method 700, to initiate the communication session. In some embodiments, the electronic device 500*b* taps the corner (as shown in FIG. 6D), side, back, front, or bottom of the electronic device 500*a* to wirelessly connect to the electronic device 500*a* using NFC. In some embodiments, devices that are already in the communication session are able to add an additional electronic device to the communication session, even if those devices are not the "hub" device as previously described. For example, a third electronic device (e.g., having one or more characteristics of electronic device 500*a* and/or 500*b*) is not in the communication session with electronic device 500*a* (and electronic device 500*b*). The third electronic device 500 receives a tap from electronic device 500*b* (which was optionally previously invited to the session via the "hub" device 500*a*) for a threshold amount of time at a threshold distance from the third electronic device, as described in greater detail in method 700, to join the communication session with the electronic device 500*a*. In some embodiments, even though the electronic device 500*b* (and not electronic device 500*a*) taps the third electronic device (or vise vera), the third electronic device is able to join the communication session, and the electronic device 500*a* remains the "owner" or "hub" device of the communication session (e.g., the electronic device 500*a* provides access to smart speakers or other output devices such as electronic device 500*c* that are connected to electronic device 500*a* and not the third electronic device or electronic device 500*b*).

In some embodiments, and as shown in FIG. 6D, once a tap between the two devices has been detected, the electronic device 500*b* displays a user interface element 624 overlaid on a user interface 622. In some embodiments, user interface 622 has one or more characteristics of user interface 600. In some embodiments, user interface 622 is a user interface of an application other than the content application. For example, user interface 622 is optionally a home screen user interface, lock screen user interface, web browsing user interface, or other user interfaces. In some embodiments, user interface element 624 includes the text "Join session with Bonnie". In some embodiments, electronic device 500*a* is associated with a user account (e.g., Bonnie's user account). In some embodiments, electronic device 500*b* is associated with a different user account (e.g., John's user account). In some embodiments, user interface element 624 includes text representing the user account of the electronic device 500*a*, described in greater detail in method 700. In some embodiments, user interface element 624 includes a selectable option 626*a*, which is selectable to not join the communication session with the electronic device 500*a*. In some embodiments, user interface element 624 includes a selectable option 626*b*, which is selectable to join the communication session with the electronic device 500*a*.

In some embodiments, electronic device 500*b* has one or more characteristics of electronic device 500*a*. In some embodiments, the electronic device 500*b* includes a display generation component 504*b*, which has one or more characteristics of display generation component 504*a*.

In some embodiments, in response to an input on the electronic device 500*b* requesting to join the communication session, as described in greater detail below and in method 700, electronic device 500*c* (or the electronic device 500*a* or the third electronic device) displays a user interface element 628 with selectable options 630a-b to authorize an electronic device (e.g., electronic device 500b) to join the communication session, as shown in FIG. 6E. In some embodiments, the electronic device that receives the tap from electronic device 500b displays the user interface element 628 to authorize electronic device 500b to join the communication session. In some embodiments, electronic device 500c displays the user interface element 628 if the user account associated with the electronic device requesting to join the communication session is not a contact (e.g., the electronic device 500c receives an input directed towards selectable option 616b shown in FIG. 6B and/or the electronic device 500a receives an input directed towards selectable option 620b shown in FIG. 6C) or the user account associated with the electronic device requesting to join the communication session is a contact but the electronic device 500c received an input directed towards 616a shown in FIG. 6B and/or the electronic device 500a receives an input directed towards 620a shown in FIG. 6C to request authorization before any device nearby joins the communication session. In some embodiments, in response to initiating the communication session using NFC or some other short-range communication technology, the electronic device 500a and/or the electronic device 500c allow the electronic device 500b to join the communication session without additional authorization from the electronic device 500a and/or the electronic device 500c.

In some embodiments, and as shown in FIG. 6E and FIG. 6F, the user interface element 628 includes a selectable option 630a and a selectable option 630b. In some embodiments, in response to detecting selection of the selectable option 630a, the electronic device 500a prevents the electronic device 500b from joining the communication session with the electronic device 500a. In some embodiments, and as described in method 700, if the electronic device 500a denies the electronic device and/or user account associated with John Smith, then the electronic device 500b cannot join future communication sessions with the electronic device 500a (or other devices associated with Bonnie's user account) without the electronic device 500a or another of Bonnie's devices approving the request. In some embodiments, in response to receiving an input selecting the selectable option 630b, the electronic device 500a allows the electronic device 500b to join the communication session. In some embodiments, and as described in method 700, if the electronic device 500a allows an electronic device (e.g., the electronic device 500b and/or user account associated with John Smith) to join the communication session, then the electronic device (e.g., electronic device 500b) can join future communication sessions with the electronic device 500a without the electronic device 500a approving the request. In some implementations, if the electronic device 500a allows an electronic device to join the communication session, then the electronic device can join future communication sessions with the any electronic device associated with the user account (e.g., Bonnie's user account) of the electronic device 500a.

In some embodiments, the electronic device 500a receives the indication of a request to initiate the communication session while the electronic device 500c is displaying user interface 606. As a result, in some embodiments, the electronic device 500c displays the user interface element 628 over user interface 606, as shown in FIG. 6E. Although electronic device 500c which outputs content has a display user interface, some electronic devices connected to a main device (e.g., electronic device 500a) may not have a display (e.g., smart speakers). In these implementations, a request to initiate a communication session by an electronic device (e.g., electronic device 500b) would only appear on a user interface of the primary electronic device (e.g., electronic device 500a) in communication with the output electronic device 500c. In some embodiments, the electronic device 500a receives the indication of the request to initiate the communication session while the electronic device 500c is displaying a user interface of an application different than the content application (e.g., user interface 634), shown in FIG. 6F. In some embodiments, as a result, the electronic device 500c displays user interface element 628 over user interface 630. In some embodiments, and as described in method 700, the electronic device 500a can receive the indication of a request to initiate the communication session and display the user interface element 628 while displaying any user interface of any application.

In some embodiments, the electronic device 500c detects a user input (e.g., with contact 632 directed to selectable option 630b in both FIG. 6E and FIG. 6F) corresponding to a request to initiate the communication session with the electronic device 500b. In response to receiving the user input directed to select selectable option 630b in FIG. 6E, the electronic device 500c displays user interface element 637 and user interface element 636 in the same user interface 606, as shown in FIG. 6G. In some embodiments, the user interface element 613b is replaced with user interface element 636. In some embodiments, in response to receiving the user input directed to selecting selectable option 630b in FIG. 6F while in user interface 634, the electronic device 500c ceases to display user interface 634 and displays user interface 606, as shown in FIG. 6G. In some embodiments, and as shown in FIG. 6G, while displaying user interface 606, the electronic device displays user interface element 637 and user interface element 636. In some embodiments, in response to receiving the user input illustrated in FIG. 6F, the electronic device 500a initiates the communication session and the electronic device 500c ceases display of user interface element 628, maintains display of user interface 634, and displays user interface element 637 from FIG. 6G overlaid on the user interface 634 in FIG. 6F. In some embodiments, the electronic device 500c displays the user interface element 637 overlaid on user interface 634 for a predetermined amount of time (e.g., 0.5, 1, 2, 3, or 5 seconds) before ceasing display of user interface element 637.

As shown in FIG. 6G, user interface element 634 includes a visual indication of the user account associated with the electronic device (e.g., avatar 635a of John) and a textual description 635b that the electronic device 500b has joined the communication session, including a description of the user account ("John connected to the session"). In some embodiments user interface element 634 includes information about the user account (e.g., avatar 635a and text "John"), which can be different from the information stored about the user account on the electronic device 500b, described in greater detail in method 900. In some embodiments, the electronic device 500c displays user interface 606 with user interface element 636, which is displayed in place of user interface element 613b. Alternatively, in some embodiments, the electronic device 500c displays user interface element 636 at the location in user interface 606 at which user interface element 613b was previously displayed in FIGS. 6B and 6E. In some embodiments, user interface element 636 includes text and/or images indicating the number of electronic devices in the communication session and/or the number of electronic devices waiting to join the communication session, as described in greater detail in method 700. As shown in FIG. 6G, user interface element 636 includes the number "4" indicating that there are 4 electronic devices in and/or waiting to join the communication session.

In some embodiments, the electronic device 500c detects a user input (e.g., contact 638 directed to user interface element 636 in FIG. 6H) corresponding to a request to display a settings user interface 640 of the communication session, shown in FIG. 6I. In response to the user input directed to select user interface element 636 in FIG. 6H, the electronic device 500c displays the settings user interface 640, shown in FIG. 6I.

FIG. 6I illustrates an example of the settings user interface 640 for the communication session, displayed in response to receiving the input illustrated in FIG. 6H, for example. In some embodiments, the settings user interface includes a scannable code 642, shown in FIG. 6I. Although displayed on electronic device 500c, in some implementations, the scannable code 642 is displayed on electronic device 500a. In some implementations, the output device (e.g., electronic device 500c) may not have a display or a touch screen for input. In these implementations, the primary device (e.g., electronic device 500a) connected to the output device receives input to transmit to the output device. In some embodiments, an electronic device (e.g., the electronic device 500b) scans the scannable code 642 to join the communication session, as described in further detail in method 700. In some embodiments, the settings user interface includes visual indications 644a through 644c of the user accounts associated with the devices in the communication session. For example, visual indication 644a includes the text "John" indicating that the electronic device (e.g., electronic device 500b) associated with the user account in the communication session is associated with the name "John". Visual indication 644b includes the text "Luka" indicating that another electronic device associated with another user account in the communication session is associated with the name "Luka". Visual indication 644c includes the text "Amy" indicating that the electronic device associated with another user account in the communication session is associated with the name "Amy". In some embodiments, the settings user interface 640 also includes user interface elements 646a through 646c. In some embodiments, user interface element 646a is displayed next to visual indication 644a and associated with the electronic device 500b and user account associated with "John". In some embodiments, user interface element 646b is displayed next to visual indication 644b and associated with the and the electronic device associated with Luka's user account. In some embodiments, user interface element 646c is displayed next to visual indication 644c and associated with the electronic device associated with Amy's user account. In some embodiments, in response to detecting selection of one of the user interface elements 646a through 646c, the electronic device 500a removes the associated electronic device and/or user account from the communication session if the associated electronic device and/or user account is already in the communication session. In some embodiments, in response to detecting selection of one of the user interface elements 646a through 646c, the electronic device 500a adds the associated electronic device and/or user account to the communication session if the associated electronic device and/or user account is not already in the communication session. For example, electronic device 500b associated with John and the electronic device associated with Luka are in the communication session, so user interface elements 646a and 646b are selectable to disconnect the associated electronic device from the communication session, as shown in FIG. 6I. The electronic device associated with Amy is not currently in the communication session, so user interface element 646c is selectable to allow the Amy's electronic device to join the communication session. In some embodiments, the settings user interface 640 also includes user interface element 648a which is selectable to remove all devices from the communication session, as shown in FIG. 6I and described in greater detail in method 700. In some embodiments, the settings user interface 640 also includes user interface element 648b which, when selected, causes the electronic device 500a to accept all requests from devices to join the communication session, as shown in FIG. 6I and described in greater detail in method 700.

FIG. 6J illustrates a queue user interface 650 of the content application while not in a communication session that includes controlling playback of content items. In some embodiments, user interface element 636 is not shown in FIG. 6J because the electronic device 500a is not in a communication session that includes controlling playback of content items from the electronic device 500a to electronic device 500c. In some implementations, when electronic device 500a and electronic device 500c are in direct communication with each other (e.g., via BlueTooth, NFC, wired connection or other wireless connection), electronic device 500a may request that electronic device 500c output content items from a queue. In some embodiments, user interface 650 is a user interface indicating a playlist of content. FIG. 6J illustrates a playlist of music content items, for example. In some embodiments, user interface 650 includes a user interface element 652 that indicates the playlist name. In some embodiments, in response to receiving an input selecting the user interface element 652, the electronic device 500c displays a previous user interface of the content application. For example, the previous user interface is optionally user interface 606, user interface 634, a home page user interface of the content application, or another user interface displayed prior to displaying user interface 650. In some embodiments, user interface 650 includes user interface element 654 which, when selected, causes the electronic device 500a and/or electronic device 500c to play the content in the playlist in a randomized order other than a predetermined order of the playlist. In some embodiments, in response to receiving a user input directed to user interface element 654, the electronic device 500a and/or the electronic device 500c places all the content in the playlist (represented by user interface elements 656a-c) in the content playback queue in a randomized order other than the predetermined order of the playlist. In some embodiments, user interface 650 also includes a plurality of user interface elements 656a through 656c that represents content items (e.g., songs) in the content playlist. In some embodiments, in response to detecting selection of user interface element 656a, the electronic device 500a and/or electronic device 500c plays the first song. In some embodiments, in response to receiving an input selecting user interface element 656b, the t electronic device 500c plays the second song. In some embodiments, in response to receiving an input selecting user interface element 656c, the electronic device 500c plays the third song.

In some embodiments, the electronic device 500c detects a user input (e.g., contact 658 directed to user interface element 656b in FIG. 6J) corresponding to a request to play the second song. In response to the user input directed to user interface element 565b in FIG. 6J, the electronic device

500*c* displays user interface 606 and begins playing the second song, shown in FIG. 6K, and described in further detail in method 700.

In some embodiments, while not in a communication session that includes controlling playback of content by the electronic device 500*a*, in response to a user input directed to playing a content item (e.g., song), the electronic device 500*a* and/or the electronic device 500*c* plays the selected content item (e.g., song 2 in FIG. 6K) before any other content items in the content playback queue are played. In some embodiments, while playing the second song and while not in the communication session, the electronic device 500*c* displays user interface element 613*b* in user interface 606, as described in FIG. 6A. In some embodiments, in response to detecting selection of user interface element 660, the electronic device 500*c* displays a user interface showing the content playback queue of the content application.

FIG. 6L illustrates user interface 651, which is a user interface of a playlist, while in a communication session (e.g., with the electronic device 500*b*) that includes controlling content playback through electronic device 500*a*. In some embodiments, as described above, electronic device 500*a* facilitates control of content playback on an output device (e.g., electronic device 500*c*) by creating the communication session and allowing other electronic devices to access the output device. The user interface 651 has one or more characteristics of the user interface 650 described in FIG. 6J. However, while in a communication session, the electronic device 500*c* displays user interface element 636, which indicates the number of devices in or waiting to join the communication session, as described above at least with reference to FIG. 6G, in user interface 651. During the communication session, the electronic device 500*c* detects a user input (e.g., contact 662 directed to user interface element 656*b* in FIG. 6L) corresponding to a request to play the second song. In response to receiving the user input directed to select user interface element 565*b* in FIG. 6L, the electronic device 500*c* adds the second song to the content playback queue, shown in FIG. 6M, and described in further detail in method 700 and optionally displays user interface 664, a user interface of the content playback queue. In some embodiments, in response to receiving the input in FIG. 6L, the electronic device 500*c* adds the song to the content playback queue and maintains display of the user interface in FIG. 6L. As described above, although electronic device 500*c* which outputs content has a display user interface, some electronic devices connected to a main device (e.g., electronic device 500*a*) may not have a display and/or a touch screen. As such, electronic device 500*a* optionally displays the user interfaces and user interface elements described herein instead of electronic device 500*c* and the one or more inputs directed towards electronic device 500*c* is optionally directed towards the user interfaces and user interface elements displayed on electronic device 500*a* instead.

During the communication session, the content playback queue shown in user interface 664 includes indications 668*a* through 668*c* of the user account and/or electronic device that added the content (e.g., song), which is represented by user interface elements 666*a* through 666*c*, to the content playback queue. For example, and as shown in FIG. 6M, a respective electronic device and/or respective user account, represented by an avatar shown in indication 668*a*, added song 1 to the content playback queue, which is represented by user interface element 666*a*. As shown in FIG. 6M, an electronic device (e.g., the electronic device 500*b*), represented by an avatar (representing "John) shown in indication 668*b*, added song 3 to the content playback queue, which is represented by user interface element 666*b*. Indication 668*b* optionally has one or more characteristics of avatar 635 as shown in FIG. 6G, such as including the same image, optionally at a different size. As shown in FIG. 6M, an electronic device (e.g., the electronic device 500*a* and/or electronic device 500*c*), represented by an avatar (representing "Bonnie" of the user account associated with electronic device 500*a* and electronic device 500*c*) shown in indication 668*b*, added song 2 to the content playback queue, which is represented by user interface element 666*c*. In some embodiments, the content playback queue includes an order of content items that are arranged by when they were transmitted to the electronic device 500*a* and/or electronic device 500*c*, as described in greater detail in method 700.

FIG. 6N illustrates user interface 606 while in the communication session. In some embodiments, while playing a content item (e.g., song 3 shown in FIG. 6N), the electronic device 500*c* displays the indication 668*b* of the electronic device (e.g., electronic device 500*b*) that added the content item to the communication session. In some embodiments, when the electronic device 500*b* leaves the communication session, the electronic device 500*c* displays a user interface element 670 on the user interface 606 indicating that the electronic device has left the communication session. In some embodiments, the user interface element 670 includes the indication 668*b* of the electronic device 500*b* (which has one or more characteristics of avatar 635*a* shown in FIG. 6G) and text ("John disconnected") describing that the electronic device 500*b* has left the communication session. In response to the electronic device 500*b* leaving the communication session, the electronic device 500*c* updates user interface element 636 to indicate that one device has left the session (e.g., the number was 4 in FIG. 6M and is now 3). Additionally, in some embodiments and described in greater detail in method 700, in response to the electronic device 500*b* leaving the communication session, the content added by the electronic device 500*b* remains in the content playback queue. For example, and shown in FIG. 6N, song 3, added by the electronic device 500*b*, continues to play despite the electronic device 500*b* leaving the session. In some embodiments, the electronic device 500*c* maintains songs added by the electronic device 500*b* in the playback queue that are not currently playing in response to the electronic device 500*b* disconnecting from the communication session.

Figure 7:
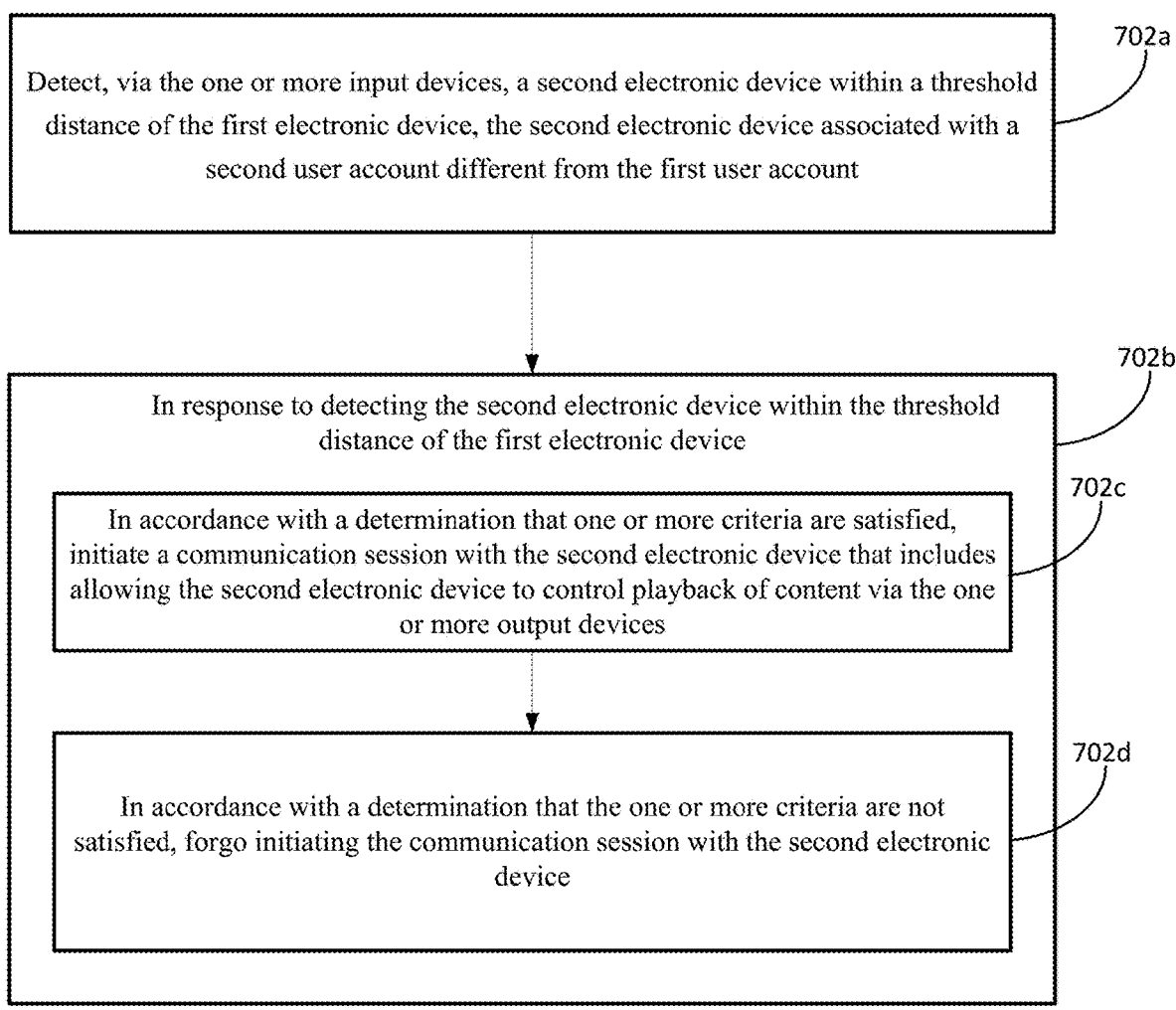
FIG. 7 is a flow diagram illustrating a method in which an electronic device initiates a communication session with another electronic device in accordance with some embodiments of the disclosure.

FIG. 7 illustrates a flow diagram of a method in which an electronic device initiates a communication session with another electronic device in accordance with some embodiments of the disclosure. The method 700 is optionally performed at first and/or electronic devices such as device 100, device 300, or device 500 as described above with reference to FIGS. 1A-1B, 2-3, 4A-4B and 5A-5C. Some operations in method 700 are, optionally combined and/or order of some operations is, optionally, changed.

As described below, the method 700 provides ways an electronic device initiates a communication session with another electronic device in accordance with some embodiments of the disclosure. Allowing other electronic devices to join a communication session with the electronic device to control the playback of the content item enables users of the electronic devices to easily share and play content, thereby reducing the need for additional inputs to share and play content which enables the users of the electronic devices to use the electronic devices more efficiently.

In some embodiments, method 700 is performed at a first electronic device in communication with a display generation component, one or more output devices (e.g., a speaker or a second display generation component), and one or more input devices, wherein the first electronic device (e.g., first electronic device 500*a*) is associated with a first user account, as described in FIG. 6A. In some embodiments, the electronic device is a mobile device (e.g., a tablet, a smartphone, a media player, or a wearable device), a vehicle information and entertainment system (e.g., infotainment system), a computer (e.g., a desktop computer, a laptop computer), and/or other electronic device. In some embodiments, the display generation component and/or second display generation component is a display integrated with the electronic device (optionally a touch screen display), external display (e.g., vehicle infotainment displays, monitors, projectors, televisions, or hardware components (optionally integrated or external) for projecting user interfaces or causing a user interfaces to be visible to one or more users. In some embodiments, the second display generation component corresponds to a vehicle infotainment display. In some embodiments, the display generation component is different from the second display generation component. For example, the display generation component is optionally larger or smaller than the second display generation component. In some embodiments, the display generation component is optionally a touch screen and the second display generation component is optionally a non-touch screen. In some embodiments, the second display generation component is located in the center of the vehicle (e.g., center display) between the driver seat and the front passenger seat. In some embodiments, the second display generation component is displayed behind the wheel (e.g., dashboard/instrument cluster or driver display) of the driver seat. In some embodiments, the electronic device is in communication with the display generation component and the second display generation component using wired or wireless communication. In some embodiments, and as will be described herein, the electronic device provides content to the display generation component and/or second display generation component. For example, the electronic device optionally provides the content and/or information to the second display generation component that defines a representation or visual appearance of a vehicle dashboard/instrument cluster system for display, via the second display generation component, as a respective user interface of the vehicle dashboard/instrument cluster system. In some embodiments, the one or more input devices include a computer system or component capable of receiving a user input (e.g., capturing a user input and/or detecting a user input) and transmitting information associated with the user input to the electronic device and/or vehicle infotainment system. Examples of input devices include physical buttons, knobs, handles, and/or switches of a vehicle, a touch screen, mouse (e.g., external), trackpad (optionally integrated or external), touchpad (optionally integrated or external), microphone for capturing voice commands or other audio input, remote control device (e.g., external), another electronic device (e.g., mobile device that is separate from the electronic device), a handheld device (e.g., external), a controller (e.g., external), a camera, a depth sensor, an eye tracking device, and/or a motion sensor (e.g., a hand tracking device, a hand motion sensor). In some embodiments, method 700 is performed at or by a vehicle (e.g., at an infotainment system of an automobile having or in communication with one or more display generation components and/or input devices). In some embodiments, the first user account is associated with a first user. In some embodiments, the first electronic device is associated with the first user account (e.g., that is established with a secure and/or trusted entity such as one or more servers configured to verify cryptographic information associated with the first user account) that has designated the first user as the owner of the first electronic device, thereby defining an association between the first user and the first user account.

In some embodiments, the first electronic device detects (702*a*), via the one or more input devices, a second electronic device (e.g., second electronic device 500*b*) within a threshold distance of the first electronic device (e.g., 0.1 m, 1 m, 5 m, or 10 m), the second electronic device associated with a second user account different from the first user account, such as if the first electronic device 500*a* in FIG. 6A were a threshold distance away from the second electronic device 500*b* in FIG. 6D. In some embodiments, detecting the second electronic device occurs while the first electronic device is playing a content item (e.g., a song, video, podcast, or audiobook) via the one or more output devices. In some embodiments, detecting the second electronic device occurs while the first electronic device is not playing content and/or playing content different than the content item described above. In some embodiments, the second electronic device has one or more characteristics of the first electronic device. In some embodiments, the second user account is related to the first user account. For example, the second user associated with the second user account is saved as a contact on the first electronic device. In some embodiments, the second electronic device and/or the second user account is associated with a second user, different than the first user.

In some embodiments, in response to detecting the second electronic device within the threshold distance of the first electronic device, in accordance with a determination that one or more criteria are satisfied (e.g., the second user account is a contact of the first user account, the second electronic device transmits a request to join the communication session, the first electronic device accepts a request from the second electronic device to join the communication session and/or one or more of the criteria described in more detail below), the first electronic device initiates (702*b*) a communication session with the second electronic device that includes allowing the second electronic device to control playback of content via the one or more output devices (e.g., electronic device 500*c*, as shown in FIG. 6A). In some embodiments, one or more electronic devices are able to join the communication session, such as a third and/or fourth electronic device. In some embodiments, one or more electronic devices in the communication session are allowed to control the playback content by the first electronic device. In some embodiments, the communication session allows the second electronic device to transmit data (e.g., song information, podcast information, video information, playlist information, second user account information) to the first electronic device and vice versa. In some embodiments, the playback of content includes playback of audio (e.g., music), one or more videos, one or more podcasts, and/or one or more audiobooks. In some embodiments, the first electronic device and/or the second electronic device detects inputs from a user to control playback of content (e.g., a content item), such as to initiate, pause, and/or skip playback of the content item. In some embodiments, the second electronic device controls playback of the content item playing on the first electronic device or on an output device communicatively connected to the first electronic device. In some embodiments, the second electronic device initiates playback of a second content item, different than the first content item, via the one or more output devices. In some embodiments, the second electronic device displays a user interface associated with the playback of the content item as described below with reference to method 900. In some embodiments, the user interface includes one or more selectable controls that, when selected, cause the first electronic device and/or the one or more output devices to play or pause the content item, skip forward or backward through the content item, or display lyrics concurrently with the user interface object for the content item.

In some embodiments, in accordance with a determination that the one or more criteria are not satisfied, the first electronic device forgoes initiating (702c) the communication session with the second electronic device, such as if the second electronic device (e.g., "John") did not connect to the communication session in FIG. 6G. In some embodiments, forgoing initiating the communication session with the second electronic device includes not allowing the second electronic device to transmit data, as described above, to the first electronic device and vice versa. For example, the second electronic device does not control playback of the content item playing on the first electronic device or an output device communicatively connected to the first electronic device. In some embodiments, the one or more criteria include a criterion that is satisfied when the first electronic device is within a pre-defined area. In some embodiments, the pre-defined area is associated with a respective output device, such as an interior of a vehicle associated with a vehicle infotainment system, and/or a building or a room associated with a speaker system (e.g., a smart home speaker). Optionally, the first electronic device forgoes searching for devices (e.g., a second electronic device) within a threshold distance if one or more criteria are not satisfied. For example, the electronic device evaluates whether the one or more criteria are satisfied and, in accordance with a determination that the one or more criteria are satisfied, the electronic device determines whether the second electronic device is within the threshold distance. In this example, in accordance with the determination that the one or more criteria are satisfied, in response to detecting the electronic device within the threshold distance, the electronic device initiates the communication session with the second electronic device. Allowing a second electronic device to join a communication session with the first electronic device to control the playback of the content item enables users of the first and the second electronic device to easily share and play content, thereby reducing the need for additional inputs to share and play content which enables the users of both electronic devices to use the electronic devices more efficiently.

In some embodiments, the first electronic device (e.g., electronic device 500a) is a hub to multiple devices. In some embodiments, when the second electronic device (e.g., electronic device 500b) connects to the first electronic device, such as by being in a communication session with the first electronic device, the second electronic device is able to access one or more devices connected to the first electronic device. For example, the first electronic device is connected to output devices such as a speaker, a smart home device, a TV, a vehicle infotainment system, or other output devices. During a communication session, the second electronic device is optionally able to access the one or more output devices connected to the first electronic device. As such, the second electronic device is optionally able to play content on any of the output devices connected to the first electronic device during the communication session. In some embodiments, a user of the first electronic device and/or first user account (as described in FIG. 6A) chooses which output devices the second electronic device can access during the communication session.

In some embodiments, the first electronic device receives, from the second electronic device, an indication of a first request to initiate the communication session, such as an indication that results in the first electronic device displaying user interface element 628 shown in FIG. 6E and FIG. 6F. In some embodiments, the indication of the first request is transmitted after a subset of the one or more criteria are satisfied, such as one or more of the criteria described herein. In some embodiments, the indication of the first request is transmitted before the communication session between the first electronic device and the second electronic device is initiated.

In some embodiments, the one or more criteria includes a first criterion that is satisfied in response to receiving the indication of the first request to initiate the communication session, such as an indication that results in the first electronic device displaying user interface element 628 shown in FIG. 6E and FIG. 6F. In some embodiments, the first request to initiate the communication session is a request from the second electronic device to initiate a communication session with the first electronic device. In some embodiments, the first request is transmitted from the second electronic device to the first electronic device when the second electronic device does not fit the one or more criteria determined by the first electronic device to allow a device to automatically join the communication session, as described below.

In some embodiments, the one or more criteria includes a second criterion that is satisfied in response to receiving a user input corresponding to a second request to initiate the communication session, such as with contact 632 on second selectable option 630b as shown in FIG. 6E and FIG. 6F. In some embodiments, in response to receiving the indication of the first request, the first electronic device requires a user input to respond to the first request, to initiate the communication session (e.g., by accepting and/or confirming the first request). In some embodiments, in response to receiving the user input, the first electronic device initiates the communication session with the second electronic device. In some embodiments, the second request further includes the first electronic device accepting the request to join the communication session from the second electronic device. Allowing the first electronic device to verify the second electronic device before initiating the communication session improves privacy and/or security of the first electronic device.

In some embodiments, in response to receiving the indication of the first request to initiate the communication session, the first electronic device displays, via the display generation component, a visual indication of the first request to initiate the communication session, such as user interface element 628 shown in FIG. 6E and FIG. 6F. For example, the visual indication of the first request is a notification presented using one or more display generation components connected to the electronic device. In some embodiments, the visual indication includes a textual description of the first request to initiate the communication session. For example, the visual indication includes a description of the second user account and the request. In some embodiments, the visual indication includes a visual representation of the second user account. Allowing the first electronic device to verify the second electronic device before initiating the communication session improves privacy and/or security of the first electronic device.

In some embodiments, the first electronic device displays, via the display generation component, a communication session settings user interface (e.g., settings user interface 640 shown in FIG. 6I), wherein the communication session settings user interface includes a plurality of selectable options for changing one or more settings of the communication session, such as user interface elements 646a through 646c and user interface elements 648a and 648b as shown in FIG. 6I. For example, the selectable options include an option to remove a user account and/or electronic device from the communication session, an option to accept a request to join the communication session, an option to remove all devices and/or user accounts from the communication session, and an option to accept all requests to join the communication session. In some embodiments, the communication session settings user interface further includes one or more selectable options as described below. In some embodiments, the communication session settings user interface includes graphics such as a scannable code, as described below. Presenting a variety of settings in one user interface for the communication session simplifies the interaction between the user and the first electronic device by reducing the number of inputs needed to change the settings of the communication session and avoids erroneous inputs related to changing one or more settings of the communication session, which reduces power usage and improves battery life of the first electronic device.

In some embodiments, initiating the communication session with the second electronic device includes initiating a process to transmit an invitation to join the communication session to the second electronic device, and the one or more criteria include, in accordance with a determination that a first setting in the settings user interface is active (e.g., a setting to allow user accounts associated with users that are contacts of the user of the first electronic device to join the communication session), a first criterion that is satisfied when the first user account has a first relationship with the second user account, such as if selectable option 616a on user interface element 614 was selected in FIG. 6B or if selectable option 620a on user interface element 618 was selected in FIG. 6C. For example, the first user account is a known contact of the second user account and vice versa.

In some embodiments, in accordance with a determination that a second setting different from the first setting in the settings user interface is active (e.g., a setting to allow user accounts associated with users that are contacts with the user of the first electronic device to join the communication session), the one or more criteria includes a second criterion that is satisfied when the first user account has a second relationship different from the first relationship with the second user account, such as if settings user interface 640 in FIG. 6I had a selectable option that is selectable to activate a setting to allow user accounts with a second relationship to the first user account to join the communication session. For example, the second user account is contacts with a third user account, which is a mutual contact of the first user account. In some embodiments, in response to satisfying the first criterion or the second criterion, the first electronic device transmits the invitation to join the communication session to the second electronic device. In some embodiments, transmitting the invitation to join the communication session includes requiring receiving the indication of the first request to initiate the communication session, as described above, before initiating the communication session. In some embodiments, in response to satisfying the first criterion or the second criterion, the first electronic device initiates the communication session with the second electronic device. Allowing the first electronic device to determine the criterion to transmit an invitation to join a communication session improves privacy and/or security of the first electronic device.

In some embodiments, in accordance with a determination that a first setting in the settings user interface is active, a first criterion that is satisfied when the second user account has a first relationship to the first user account without requiring receiving a user input, at the first electronic device, the first electronic device authorizes initiation of the communication session with the second electronic device, such as if selectable option 616a on user interface element 614 was selected in FIG. 6B or if selectable option 620a on user interface element 618 was selected in FIG. 6C to allow devices to join automatically. In some embodiments, selectable options 616a or selectable option 620a are also shown in the settings user interface 640. In some embodiments, the first setting is a setting to allow user accounts associated with a user that is a known contact of the first user account (e.g., the second user account) to automatically enter the communication session with the first electronic device without approval from the first electronic device. For example, the first relationship includes a relationship where the first electronic device and/or the first user account stores information about the second user account and/or the second electronic device. In some embodiments, the second electronic device with the first relationship receives an invitation to join the communication session, as described above and transmits a first request to initiate the communication session back to the first electronic device. in response to transmitting the first request, the first electronic device initiates the communication session without requiring an additional input, from the first electronic device, to initiate the communication session.

In some embodiments, in accordance with a determination that a second setting different from the first setting in the settings user interface is active, a second criterion that is satisfied when the second user account has a second relationship different from the first relationship to the first user account without requiring receiving the user input, the first electronic device authorizes initiation of the communication session with the second electronic device, such as if settings user interface 640 in FIG. 6I had a selectable option that is selectable to activate a setting to allow user accounts with a second relationship to the first user account to join the communication session automatically. In some embodiments, the second relationship is a relationship where the first electronic device and/or the first user account stores information about a third user account and/or third electronic device, which is also stored on the second user account and/or the second electronic device. In other words, the first user account and the second user account have mutual contacts. In some embodiments, while the second setting is active, the second user account and/or the second electronic device is automatically connected to the communication session (upon transmitting a request to initiate the communication session) with the first electronic device and/or the first user account without approval from the first electronic device. In some embodiments, the first electronic device and/or the first user account determines the criteria that other electronic device and/or user accounts can join the communication session. In some embodiments, the second electronic device with the second relationship receives an invitation to join the communication session, as described above and transmits a first request to initiate the communication session back to the first electronic device. in response to transmitting the first request, the first electronic device initiates the communication session without requiring an additional input, from the first electronic device, to initiate the communication session. In some embodiments, if either or both of the first setting and the second setting are not active, then the first electronic device requires a user input to authorize the initiation of the communication session before initiating the communication session. Allowing the first electronic device to determine the criterion initiate a communication session improves privacy and/or security of the first electronic device.

Figure 8B:
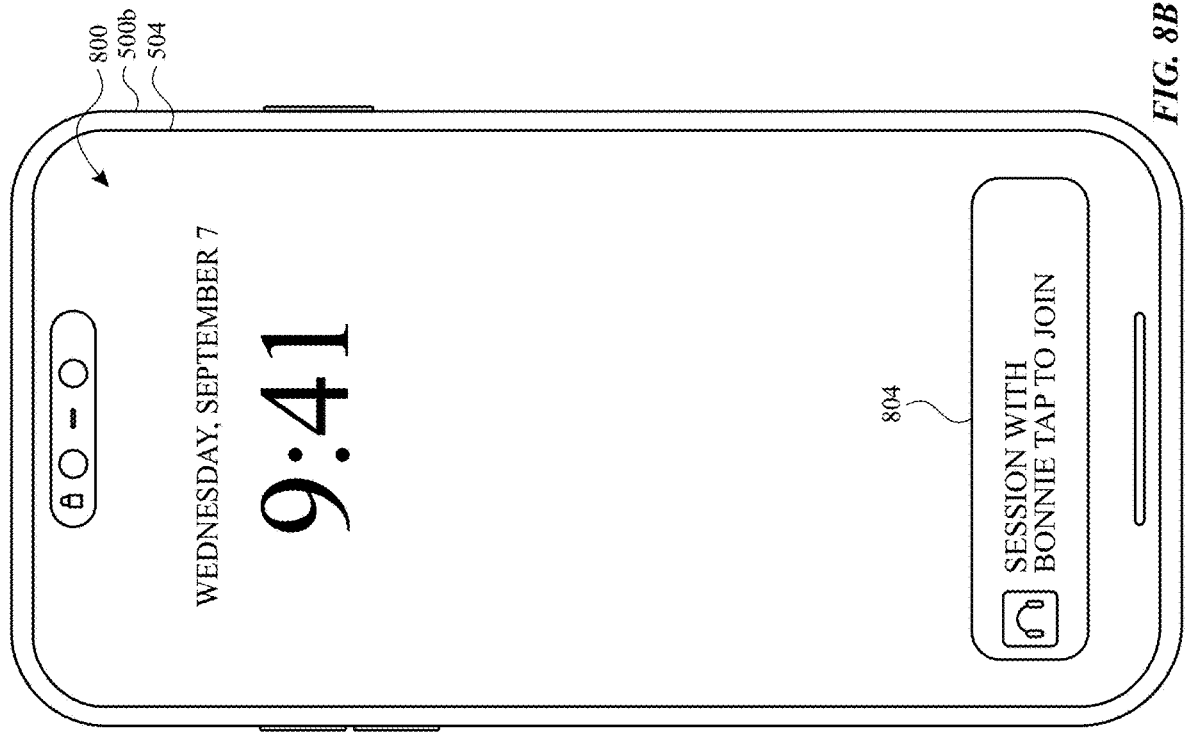
FIGS. 8A-8N illustrate examples in which an electronic device receives a request to join a communication session that includes controlling playback of content through another electronic device (which acts like a hub) and joins the communication session with other electronic devices in accordance with some embodiments of the disclosure.

For example, the first relationship is optionally a relationship where John's device, as described in FIG. 6D (e.g., electronic device 500b) is saved as a contact in Bonnie's device (e.g., electronic device 500a shown in FIG. 6A). The second relationship is optionally a relationship where John is a contact once removed from Bonnie. For example, Annie is a contact of Bonnie and Annie is a contact of John. In some embodiments, while the second electronic device has a first relationship or a second relationship to the first electronic device, John no longer has to ask Bonnie to change the content or add content. In some embodiments, while the second electronic device has a first relationship or a second relationship to the first electronic device, the second electronic device receives an indication that a communication session can be initiated and displays a visual indication as a result, such as user interface element 804 as shown in FIG. 8B.

In some embodiments, the first electronic device displays a user interface of a content playback application used to play content (e.g., music, audiobooks, podcasts, videos, or other content) selected by the second electronic device in the communication session, such as user interface 606 shown in FIG. 6G. For example, the content application is a music playback application, podcast playback application, audiobook playback application, or any other content playback application. In some embodiments, the user interface is a user interface that allows the first electronic device to control playback of the content.

In some embodiments, during the communication session with the second electronic device, the user interface of the content application includes a visual indication initiating a number of devices participating in the communication session, such as user interface element 636 shown in FIG. 6G. In some embodiments, the visual indication includes text indicating the number of devices and/or a visual representation indicating the number of devices (e.g., four avatars representing four devices in the communication session). In some embodiments, the visual indication is a selectable option selectable to indicate the number of user accounts and/or devices waiting to join the communication session and/or the number of user accounts and/or devices in the communication session, as described below.

In some embodiments, while not in the communication session with the second electronic device, the user interface of the content application does not include the visual indication, such as shown in FIG. 6A. In some embodiments, when the communication session has ended, the visual indication is no longer displayed. In some embodiments, before the initiation of the communication session, the visual indication is not displayed. Displaying a visual indication of the number of devices participating in the communication session without user input reduces the need for manual inputs reduces the likelihood of erroneous inputs to the user interface, which reduces power usage and improves battery life of the first electronic device.

In some embodiments, during the communication session with the second electronic device, the visual indication further indicates the number of devices waiting to join the communication session, such as shown by user interface element 636 in FIG. 6H, which is selectable to show the devices waiting to join. In some embodiments, the visual indication indicates the number of devices within the threshold distance of the first electronic device. In some embodiments, and as described above, the devices waiting to join the communication session are associated with user accounts that are contacts and/or mutual contacts of the first user account and/or the first electronic device. In some embodiments, the visual indication includes text describing a number which is a combination of the number of devices waiting to join the communication session and the number of devices that are currently in the communication session. In some embodiments, the number of devices waiting to join the communication session are the devices that have received the invitation to join the communication session, as described above, and have transmitted a request to initiate the communication session with the first electronic device but are waiting for the confirming input at the first electronic device to join the communication session. In some embodiments, the number of devices waiting to join the communication session is also displayed in the communication session settings user interface, described above. Displaying a visual indication of the number of devices waiting to join the communication session without user input reduces the need for manual inputs reduces the likelihood of erroneous inputs to the user interface, which reduces power usage and improves battery life of the electronic device.

In some embodiments, the one or more criteria include a criterion that is satisfied when the second electronic device was previously in the communication session with the first electronic device within a threshold amount of time, such as if the second electronic device 500b left the communication session within a threshold amount of time (and not in the communication session while in the threshold distance of the first electronic device) (e.g., 1 min, 10 min, 15 min, 30 min, 45 min, 1 hour, 2 hours, 4 hours, 12 hours, or 18 hours or 1 or 2 days). In some embodiments, in response to detecting the second electronic device leaving the communication session, the first electronic device displays a visual indication that the second electronic device has left the communication session (e.g., the second electronic device is greater than the threshold distance away from the first electronic device and/or the second electronic device receives an input to leave the communication session). In some embodiments, the second electronic device automatically re-joins the communication session within a threshold amount of time of leaving the communication session. For example, the second electronic device optionally re-joins the communication session when it is within the threshold distance of the first electronic device without requiring authorization by the first electronic device for the second electronic device to re-join the communication session. In some embodiments, the second electronic device still needs to request to initiate the communication session. The second electronic device optionally automatically joins a new communication session initiated by the first electronic device. Allowing a second electronic device to re-join a communication session with the first electronic device to control the playback of the content item enables users of the first and the second electronic device to easily share and play content, thereby reducing the need for additional inputs to share and play content which enables the users of both electronic devices to use the electronic devices more efficiently.

In some embodiments, the one or more criteria include a criterion that is satisfied when the second electronic device was previously in the communication session with the first electronic device within a threshold amount of time (e.g., the threshold amount of time as described above) and left the communication session in response to the second electronic device receiving a user input corresponding to a request to leave the communication session, such as if a user of the second electronic device 500*b* requested to leave the communication session using selectable option 848, as shown in FIG. 8I. In some embodiments, the first electronic device and the second electronic device display a visual indication of the second electronic device leaving the communication session in response to the second electronic device leaving the communication session. For example, the visual indication includes text describing the second user account and/or the second electronic device leaving the communication session.

In some embodiments, the criterion is not satisfied when the second electronic device was previously in the communication session and left the communication session in response to the first electronic device receiving an input corresponding to a request to remove the second electronic device from the communication session (and not in the communication session while in the threshold distance of the first electronic device) without the second electronic device requesting to leave the communication session, such as if an input was detected on user interface element 646*a* or 646*b* shown in FIG. 6I. In some embodiments, the second electronic device and/or other electronic devices associated with the second user account does not automatically re-join the communication session when the device is within the threshold distance of the first electronic device if the second electronic device was removed from a previous communication session by the first electronic device. In some embodiments, if the first electronic device creates a new communication session, the first electronic device does not initiate the communication session with the second electronic device and/or other electronic devices associated with the second user account. In some embodiments, the second electronic device and/or the other electronic devices associated with the second user account are able to join the communication session if the second electronic device and/or other electronic devices associated with the second user account transmits an indication of a request to initiate the communication session with the first electronic device, as described above, and the first electronic device receives a user input corresponding to a second request to accept the first request and initiate the communication session. In some embodiments, if the first electronic device receives an input to remove the second electronic device, the second electronic device and/or the second user account has to request to be in future communication sessions with the first electronic device. Allowing the first electronic device to prevent electronic devices to join the communication session automatically improves privacy and/or security of the first electronic device.

In some embodiments, the one or more criteria include a criterion that is satisfied when a third electronic device associated with the second user account was previously in the communication session with the first electronic device within a threshold amount of time, such as if a fourth electronic device was associated with the second user account (e.g., the threshold time as described above) (and not in the communication session while in the threshold distance of the first electronic device). In some embodiments, the third electronic device associated with the second user account can join the communication session with the first electronic device automatically (e.g., without verification from the first electronic device) if a different electronic device (e.g., the second electronic device) associated with the same user account was previously in a communication session with the first electronic device. In some embodiments, the first electronic device, second electronic device, and/or third electronic device displays a visual indication of the third electronic device joining the communication session in response to the third electronic device joining the communication session. Alternatively, in some embodiments, the one or more criteria are not satisfied if a different electronic device (e.g., the third electronic device) associated with the second user account was previously in the communication session, and the third electronic device is not able to join the communication session unless and until the first electronic device authorizes the third electronic device joining the communication session. Allowing a third electronic device associated with the second user account to re-join a communication session with the first electronic device to control the playback of the content item enables users of the first and the third electronic device to easily share and play content, thereby reducing the need for additional inputs to share and play content which enables the users of both electronic devices to use the electronic devices more efficiently.

In some embodiments, the first electronic device allowing the second electronic device to control playback of content further includes allowing the second electronic device to transmit an indication of a content item (e.g., such as in response to selecting a song, podcast, video, or other content to play) to the first electronic device to be added to a content playback queue, such as "song 3" being transmitted by the second electronic device 500*b* and shown in user interface 664 in FIG. 6M. In some embodiments, the content playback queue is a list of content to be played by the first electronic device using an output device in communication with the first electronic device. For example, the content playback queue is a list of content for the first electronic device and/or output device to play.

In some embodiments, after the communication session between the first electronic device and the second electronic device has ended, the first electronic device maintains the content playback queue with the content item corresponding to the indication transmitted from the second electronic device, such as shown by the electronic device 500*b* leaving the communication session in FIG. 6N but the content item transmitted by the electronic device 500*b* continues playing. In some embodiments, in response to the second electronic device leaving the communication session, the content playback queue includes the content items added to the content playback queue by the second electronic device until the first electronic device plays the content items added to the content playback queue by the second electronic device. Alternatively, in some embodiments, in response to the second electronic device leaving the communication session, the indication of content items transmitted from the second electronic device are removed from the content playback queue. Retaining the content playback queue even if the communication session has ended reduces the need for manual inputs to remake the content playback queue, which reduces power usage and improves battery life of the first electronic device.

In some embodiments, during the communication session with the second electronic device, while displaying a user interface of a content playback application (e.g., such as a content playback application as described above) used to play content selected by the second electronic device in the communication session, the first electronic device receives, via the one or more input devices, a first input directed towards a first selectable option corresponding to a request to display a communication settings user interface, such as with contact 638 on user interface element 636 shown in FIG. 6H. For example, the electronic device detects a tap (e.g., with an index finger of a hand), or a click (e.g., with a mouse or trackpad) at a location on a touch sensitive display. In some embodiments, the first selectable option includes the visual indication initiating a number of devices participating in the communication session and/or the number of devices waiting to join the communication session, which is described above. In some embodiments, the communication settings user interface also includes a plurality of selectable options for changing one or more settings of the communication session, as described above.

In some embodiments, in response to receiving the first input, the first electronic device displays the communication settings user interface including a scannable code (e.g., scannable code 642) (e.g., a QR code, barcode, or other image) to join the communication session, such as shown by displaying settings user interface 640 in FIG. 6I in response to the selection of user interface element 636 in FIG. 6H. In some embodiments, an electronic device, such as second electronic device and/or third electronic device, scans the scannable code to join the communication session without additional verification (e.g., an indication of a request to initiate the communication session as described above). For example, the second electronic device and/or third electronic device captures an image of the scannable code using a camera. Alternatively, in some embodiments, scanning the scannable code includes transmitting the indication of the request to initiate the communication session from the electronic device that scanned the code to the first electronic device. In some embodiments, in response to scanning the scannable code, the first electronic device receives a visual indication (e.g., a notification) that an electronic device has joined the communication session. In some embodiments, the scannable code is displayed using an output device. In some embodiments, the scannable code is displayed on the first electronic device. In some embodiments, scanning the scannable code allows devices that have not received the request/invitation to join the communication session to receive a request/invitation to join the communication session. Allowing electronic devices to join the communication session with a scannable code reduces the need for manual inputs to allow electronic devices to join the communication session, which reduces power usage and improves battery life of the first electronic device.

Figure 8A:
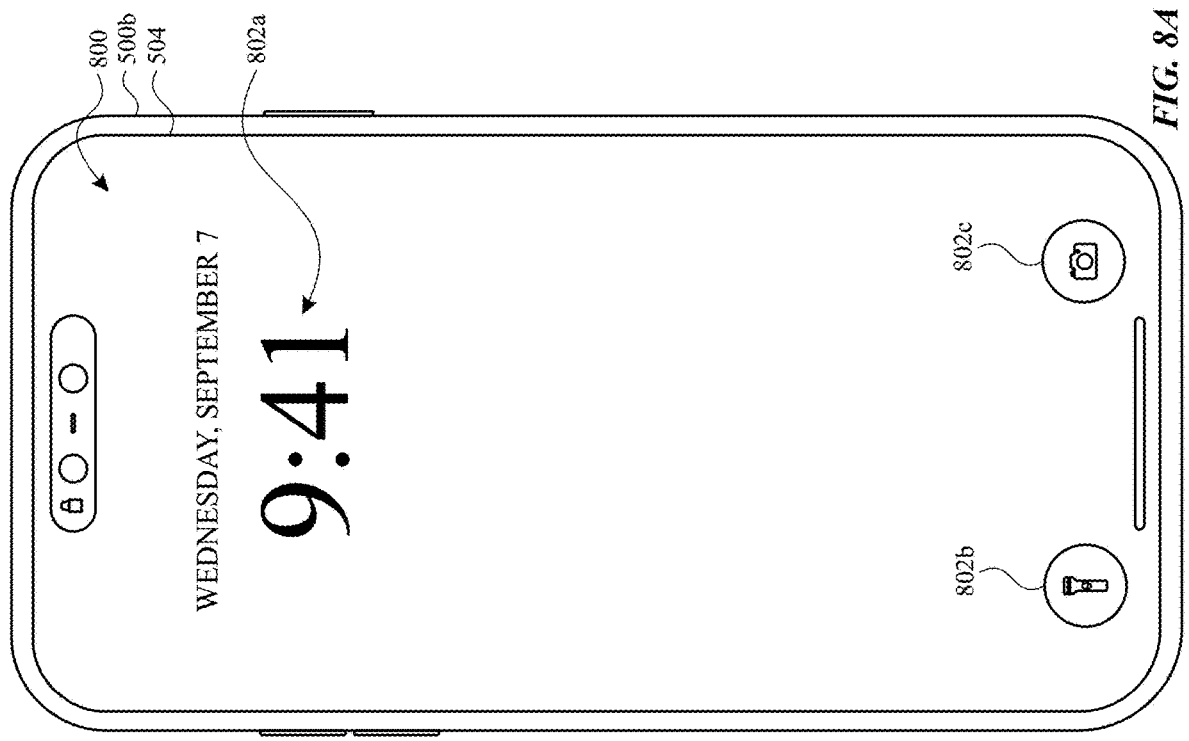
Figure 8G:
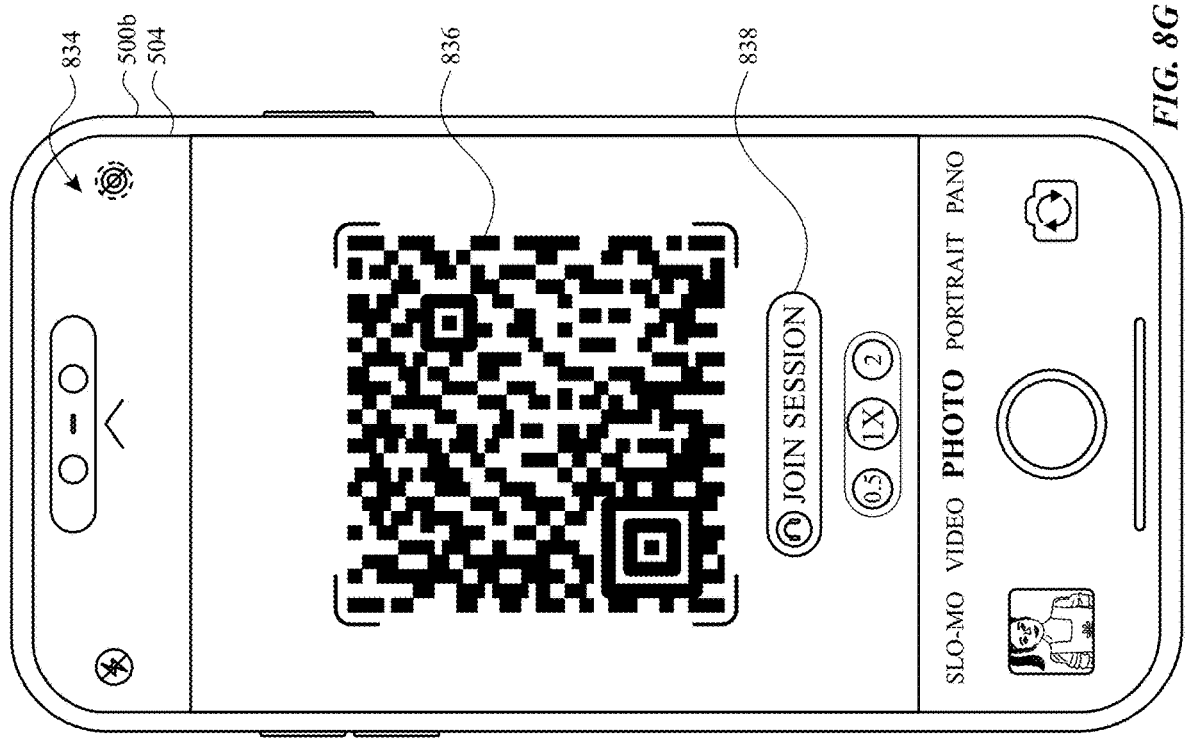

In some embodiments, the one or more criteria that are satisfied to initiate the communication session with the second electronic device includes a criterion that is satisfied in response to receiving an indication of a scan of the scannable code from the second electronic device without requiring receiving a user input (e.g., at the first electronic device) authorizing initiation of the communication session with the second electronic device, such as if the second electronic device has scanned the scannable code 642 as shown in FIG. 8G. In some embodiments, the second electronic device scans the scannable code using a camera application. In some embodiments, scanning the scannable code initiates the communication session with the second electronic device without the second electronic device transmitting the indication of the request to initiate the communication session to the first electronic device, as described above. In some embodiments, the user input authorizing initiation of the communication session is an input, such as described above, on a selectable option to allow the second electronic device to join the communication session. In some embodiments, the first electronic device and/or the second electronic device receives a visual indication (e.g., notification) of the scan of the scannable code. Allowing the second electronic device to join the communication session without requiring a user input to authorize the initiation of the communication session simplifies the user interaction thereby reducing the likelihood of erroneous inputs to initiate the communication session.

In some embodiments, the communication session settings user interface includes a second selectable option selectable to remove the second electronic device from the communication session, such as user interface element 648a in FIG. 6I and a third selectable option selectable to remove all electronic devices from the communication session, such as user interface element 648b in FIG. 6I. In some embodiments, the second selectable option includes a visual description (e.g., text or image) of the user account and/or electronic device that the first electronic device can remove from the communication session. In some embodiments, the communication session settings user interface includes a number of selectable options to remove specific electronic devices corresponding to the number of electronic devices in the communication session. In some embodiments, removing the second electronic device from the communication session prevents the second electronic device from connecting to the communication session and future communication sessions with the first electronic device automatically and/or without additional authorization. In some embodiments, removing the second electronic device from the communication session does not prevent the second electron device from connecting to the communication session and future communication sessions with the first electronic device automatically and/or without additional authorization. In some embodiments, removing all electronic devices from the communication session ends the communication session. In some embodiments, removing all electronic devices from the communication session prevents all electronic devices and/or all user accounts from connecting to the communication session and future communication sessions with the first electronic device automatically and/or without additional authorization. In some embodiments, removing all electronic devices from the communication session does not prevent all electronic devices from connecting to the communication session and future communication sessions with the first electronic device automatically and/or without additional authorization. Presenting settings to remove all electronic devices or to remove specific electronic devices simplifies the interaction between the user and the first electronic device by reducing the number of inputs needed to remove electronic devices and avoids erroneous inputs related to changing one or more settings of the communication session, which reduces power usage and improves battery life of the first electronic device.

In some embodiments, initiating the communication session with the second electronic device includes initiating a process to transmit an invitation to join the communication session to the second electronic device, and the one or more criteria are satisfied or not satisfied irrespective of the first electronic device displaying a user interface of an application (e.g., a home screen user interface, a user interface of a maps application, a user interface of a weather application, or other user interfaces) other than a content playback application used to play content (e.g., the content playback application described above) selected by the second electronic device in the communication session, such as user interface element 628 being displayed in user interface 634 in FIG. 6F, which is a user interface of an application other than the content playback application. In some embodiments, the invitation to join the communication session is described in greater detail above. In some embodiments, the first electronic device displays a user interface of the content playback application in response to the initiation of the communication session. In some embodiments, the first electronic device displays a visual indication of the first request to initiate the communication session, as described above, while displaying the user interface of the application other than the content playback application. In some embodiments, the first electronic device receives a user input directed to accepting the first request to initiate the communication session while displaying the user interface of the application other than the content playback application and as a result, initiates the communication session. Alternatively, in some embodiments, the one or more criteria are satisfied or not satisfied while the first electronic device is displaying a user interface of the content playback application. Initiating an invitation to join the communication session to other electronic devices, such as the second electronic device, while in other user interfaces of other applications reduces the need for manual inputs to transmit an invitation to join the communication session and/or to initiate the communication session which reduces the likelihood of erroneous inputs to the user interface, which reduces power usage and improves battery life of the first electronic device.

In some embodiments, while playing a first content item with a first content application different from a second content application used to play content selected by the second electronic device in the communication session, via the one or more output devices (e.g., the second display generation component as described above), the first electronic device detects the initiation of the communication session with the second electronic device, such as if the communication session was initiated (e.g., by selecting selectable option 630b shown in FIG. 6E) on a user interface of a content application other than a music application. For example, the first electronic device is optionally playing a podcast with a podcast application different than a music application. In some embodiments, the first electronic device is displaying a user interface of the first content application while playing the first content item.

In some embodiments, in response to detecting the initiation of the communication session with the second electronic device, the first electronic device ceases playing the first content item with the first content application and plays a second content item with the second content application, such as if content from the first content application ceases to play and content (e.g., song 2) from the content application shown in FIG. 6E begins to play. For example, in response to initiating the communication session, such as the second electronic device joining the communication session, the podcast stops playing and music begins playing. In some embodiments, the communication session is associated with a content item (e.g., music, podcast, video, or other content). For example, if the communication session is associated with podcasts and music is currently playing, in response to the initiation of the communication session, music stops playing, and a podcast begins playing. In some embodiments, in response to the initiation of the communication session, the first electronic device resumes playing the second content item that was previously playing in the second content application or plays content added to the content playback queue by the second electronic device. Playing the second content item in response to the initiation of the communication session while playing the first content item reduces the need for manual inputs to switch content items in response to the initiation of the communication session reduces the likelihood of erroneous inputs to the first electronic device, which reduces power usage and improves battery life of the first electronic device.

In some embodiments, the first electronic device initiates the communication session with the second electronic device while the first electronic device is not playing any content (e.g., music, podcasts, videos, or other content as described above), such as if song 2 were not playing in FIG. 6E. In some embodiments, the one or more criteria does not include a criterion that is satisfied when the first electronic device plays content. In some embodiments, the first electronic device initiates the playback of content (e.g., a content item) in response to the initiation of the communication session, such as described above. In some embodiments, the second electronic device and/or second user account determines the content item to be played in response to the initiation of the communication session. In some embodiments, the first electronic device determines the content item to be played in response to the initiation of the communication session. Initiating the communication session without playing any content reduces the need for manual inputs to begin playing content to initiate the communication session reducing the likelihood of erroneous inputs to the first electronic device, which reduces power usage and improves battery life of the first electronic device.

In some embodiments, during the communication session, the first electronic device displays, via the display generation component, a user interface of a content playback application used to play content (e.g., a content item) selected by a respective electronic device in the communication session (e.g., user interface 606 shown in FIG. 6N) that includes, in accordance with a determination that a content item that is currently playing was played in response to a request made by the second electronic device in the communication session, the first electronic device displays a visual indication of the second user account, such as shown by indication 668b on user interface 606 in FIG. 6N. In some embodiments, the user interface of the content playback application is a user interface at which the first electronic device and/or an output device detects inputs from a user to control playback of the content item, such as to initiate, pause and/or skip playback of the content item. In some embodiments, the user interface includes one or more selectable controls that are selectable to play or pause the content item or skip forward or backward through the content item. In some embodiments, the user interface includes information about the content item, such as indications of the name of the content item, the name of an artist associated with the content item, a name of a collection (e.g., playlist, album, or series) of content items to which the content item belongs, and/or an image (e.g., album artwork, series artwork, or audiobook cover) associated with the content item. In some embodiments, the second electronic device transmits data about the content item to the first electronic device. In some embodiments, the visual indication of the second user account includes a textual description of the second user account and/or an avatar representing the second user account.

In some embodiments, during the communication session, the first electronic device displays, via the display generation component, a user interface of a content playback application used to play content (e.g., a content item) selected by a respective electronic device in the communication session (e.g., user interface 606 shown in FIG. 6N)

that includes, in accordance with a determination that the content item that is currently playing was played in response to a request made by a third electronic device in the communication session different from the second electronic device, the first electronic device displays a visual indication of a third user account associated with the third electronic device and different from the second user account, such as if an indication representing the third user account were displayed on user interface 606. In some embodiments, the third electronic device transmits data about the content item to the first electronic device. In some embodiments, the visual indication of the third user account includes a textual description of the third user account and/or an avatar representing the third user account. In some embodiments, the first electronic device begins playing the content item transmitted from the second electronic device to the first electronic device. As a result, a visual indication of the second user account is displayed in the user interface. In some embodiments, the second electronic device does not transmit the file of the content item, rather a representation of the content item which is retrieved from a server by the first electronic device, as described above. Displaying a visual indication of the user account that requested the content item while playing the content item without user input reduces the need for manual inputs which reduces the likelihood of erroneous inputs to the user interface, which reduces power usage and improves battery life of the first electronic device.

In some embodiments, the first electronic device receives, via the one or more input devices, a first input selecting a content item for playback in a user interface of a content playback application used to play content selected by the second electronic device in the communication session, such as shown by contact 662 selecting user interface element 656*b* representing song 2 in FIG. 6L. In some embodiments, the first input has one or more characteristics of the first input as described above. In some embodiments, a user of the second electronic device selects the content item on a user interface of the content playback application on the second electronic device, which is transmitted to the first electronic device.

In some embodiments, in response to receiving the first input selecting the content item, in accordance with a determination that the first input is received while the first electronic device is in the communication session with the second electronic device, the first electronic device adds the content item to a content playback queue, such as shown by song 2 being added to the content playback queue in user interface 664 in FIG. 6M. In some embodiments, the content playback queue has one or more characteristics of the content playback queue as described above. In some embodiments the content item is added to the end of the content playback queue. In some embodiments, playing the content item added to the content playback queue includes waiting for the content items ahead of the content item to be played before playing the content item. In some embodiments, adding the content item to the content playback queue does not interrupt the playback of the presently playing content item. The second electronic device and/or the first electronic device optionally modifies the content playback queue. For example, the second electronic device (or the first electronic device, or any device in the communication session) can rearrange the order of the content playback queue. Alternatively, in some embodiments, while the communication session is active, the content item is played in response to the first input.

In some embodiments, in accordance with a determination that the first input is received while the first electronic device is not in the communication session with the second electronic device, the first electronic device plays the content item, such as shown by song 2 playing in FIG. 6K in response to a contact 658 selecting user interface element 656*b* representing song 2 in FIG. 6J. Alternatively, in some embodiments, the content item is placed in a content playback queue while the first electronic device is not in the communication session. In some embodiments, playing the content item includes playing with one or more input devices and/or one or more output devices. In some embodiments, playing the content item includes stopping the playback of the presently playing content item to play the content item. In some embodiments, playing the content item includes playing the content item before content items in a content playback queue are played. In some embodiments, in response to the first input to play the content item, the content playback queue is erased. In some embodiments, while not in the communication session, the first electronic device can place the content item in a content playback queue or play the content item. Placing the content item in a content playback queue reduces the need for manual inputs to create the content playback queue which reduces the likelihood of erroneous inputs to the user interface, which reduces power usage and improves battery life of the first electronic device.

In some embodiments, the electronic devices (e.g., electronic device 500*a* and/or electronic device 500*b*) uses the first electronic device's subscription to play a content item during the communication session independent of which electronic device (e.g., first electronic device or second electronic device) added the content item to the communication session, such as if the electronic device 500*b* does not have a subscription and adds a content item to the content playback queue during the communication session. In some embodiments, while in the communication session, all devices in the communication session use the same subscription to the content delivery service associated with the content playback application. For example, all the devices in the communication session (e.g., the second electronic device) use the first electronic device's and/or the first user account's subscription to the content delivery service (e.g., music streaming service or video streaming service). Alternatively, in some embodiments, each device in the communication session has their own subscription to the content delivery service. In some embodiments, the second electronic device uses the first electronic device's subscription to the content delivery service when the second electronic device and/or the second user account does not have their own subscription. In some embodiments, the second electronic device and/or the second user account is able to control the playback of the content with the content application by the first electronic device without a subscription to the content delivery service. Sharing the subscription to the content delivery system simplifies the sharing and playing of content, thereby reducing the need for additional inputs to share and play content which enables the users of both electronic devices to use the electronic devices more efficiently.

In some embodiments, while in the communication session with the second electronic device, the first electronic device detects disconnecting from the one or more output devices, such as disconnecting from an output device associated with electronic device 500*c* shown in FIG. 6A (e.g., the output device being used to play content items in the communication session).

Figure 8H:
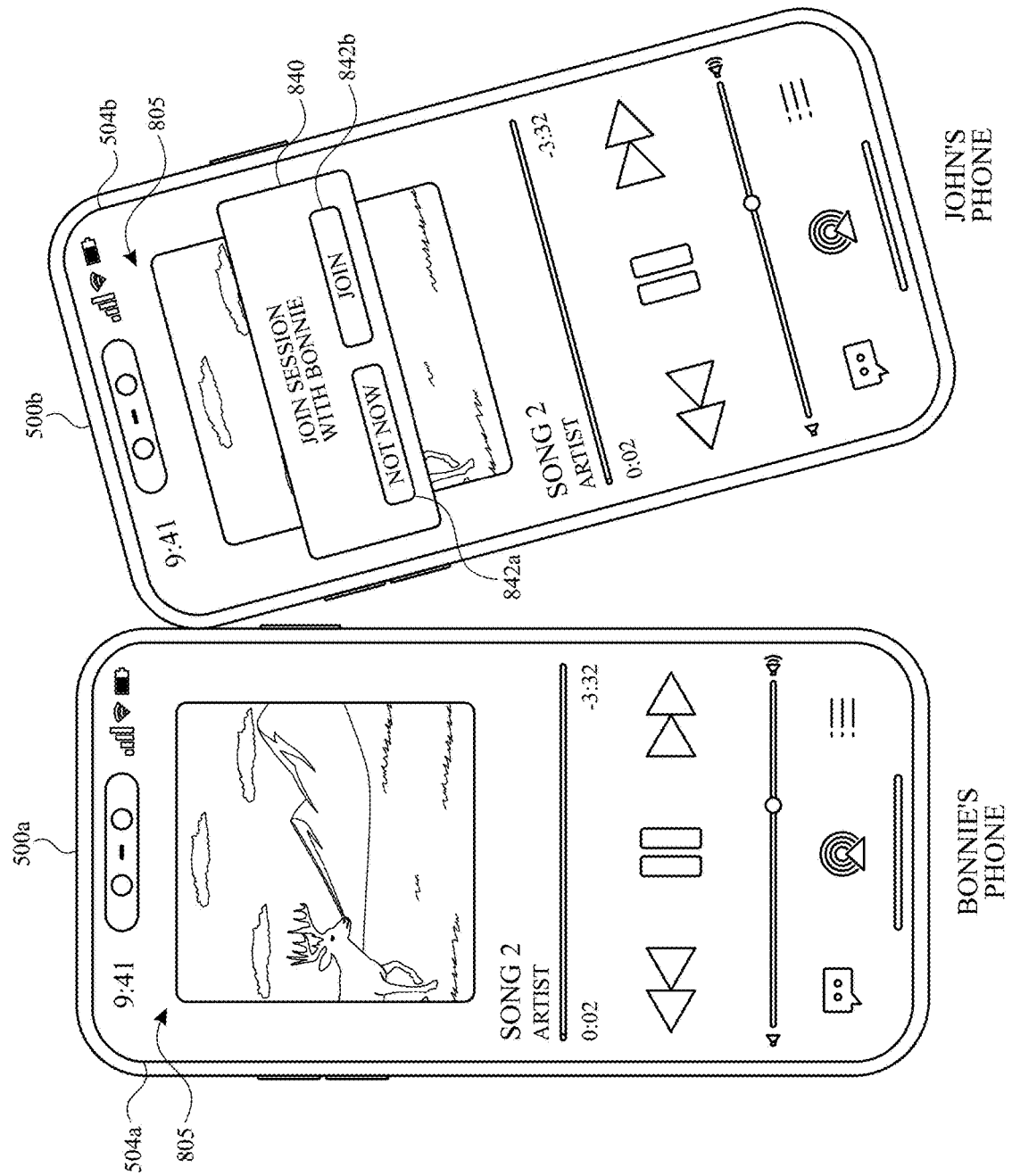
Figure 8M:
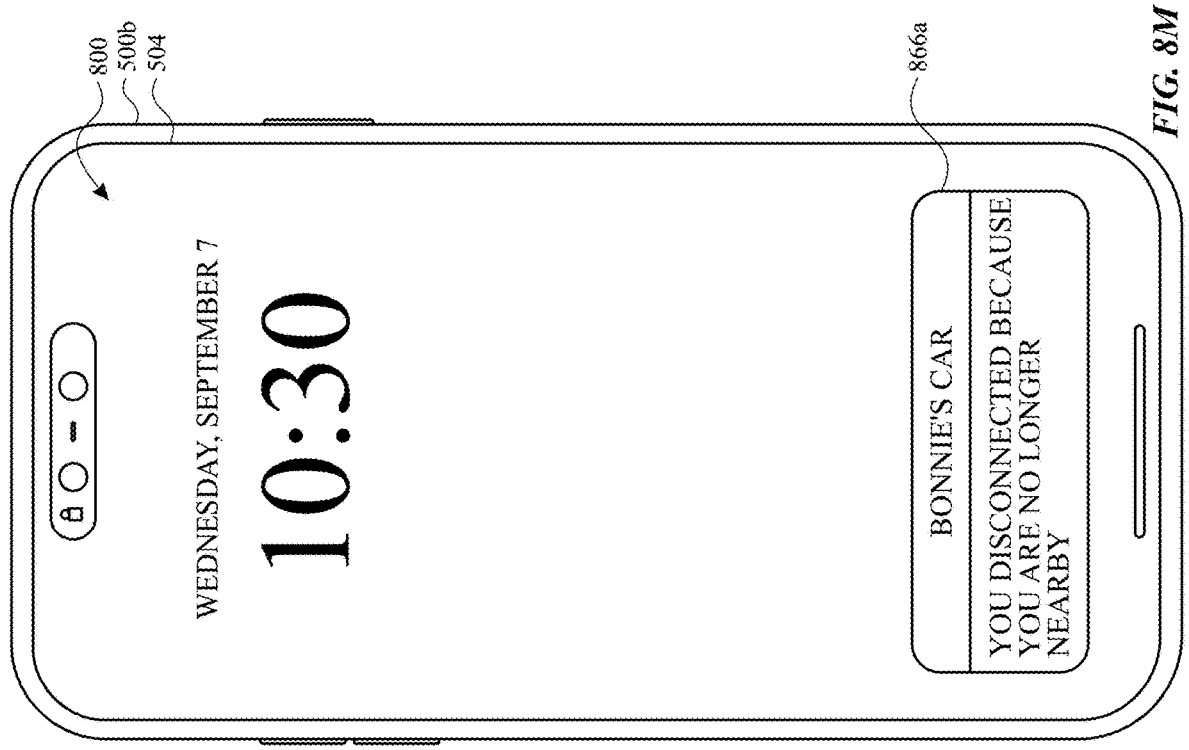
Figure 8L:
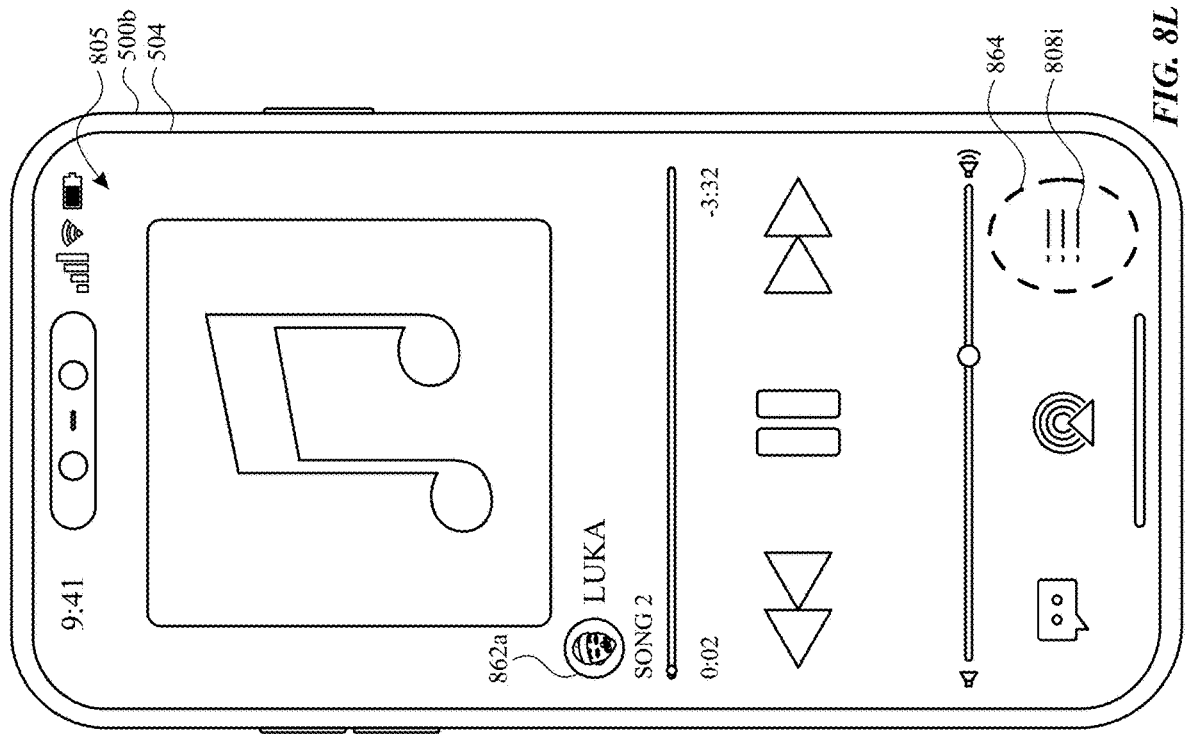
Figure 8N:
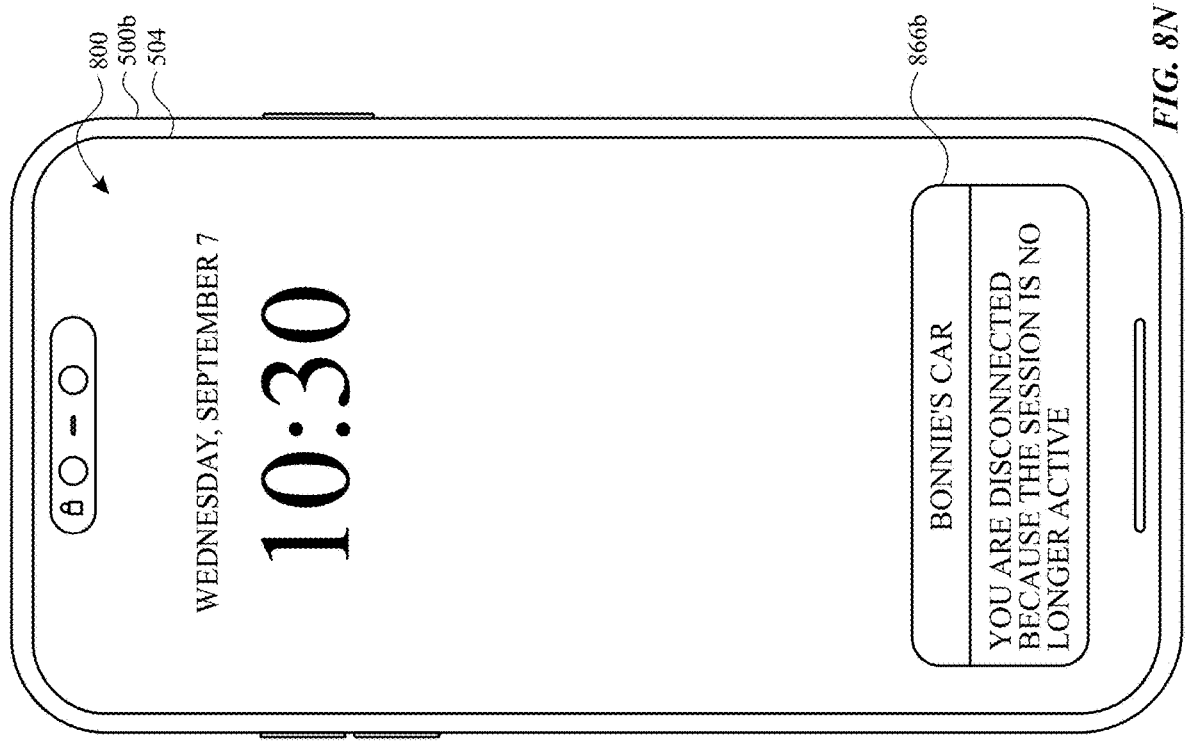

In some embodiments, in response to detecting the disconnecting from the one or more output devices, the first electronic device concludes the communication session, such as shown by the user interface element 688*b* in FIG. 8N on the electronic device 500*b* describing that the communication session has concluded because the first electronic device has disconnected from the one or more output devices. (e.g., disconnecting the second electronic device from the first electronic device). In some embodiments, once the first electronic device disconnects from one or more output devices, the communication session ends. For example, if the first electronic device disconnects from the second display generation component, as described above, such as by way of turning off a vehicle and therefore disconnecting from the vehicle sound system, then the communication session ends. In some embodiments, vehicles include automobiles (cars/trucks), EVs, aircraft, watercraft, and trains. Alternatively, in some embodiments, in response to detecting the first electronic device disconnecting from the communication session, the "ownership" of the communication session transfers to the second electronic device (or other electronic devices in the communication session) and the communication session does not end. Ending the communication session by disconnecting all devices in the communication session in response to the first electronic device disconnecting from the one or more output devices simplifies the interaction between the user and the first electronic device by reducing the number of inputs needed end the communication session, which reduces power usage and improves battery life of the first electronic device.

In some embodiments, the one or more criteria include a criterion that is satisfied in response to a near-field communication with the second electronic device, such as shown by the electronic device 500*b* tapping the first electronic device 500*a* in FIG. 6D.

In some embodiments, the first electronic device can initiate the communication session with the second electronic device using near-field communication (NFC). For example, the second electronic device optionally "taps" or "bumps" the first electronic device to initiate the communication session. In some embodiments, the second electronic device is within a threshold distance (e.g., 0.001 m, 0.01 m, 0.1 m, 1 m, or 10 m) from the first electronic device. In some embodiments, the second electronic device receives an indication to join the communication session when it is at the threshold distance from the first electronic device for a threshold amount of time (0.1 seconds, 1 second, 5 seconds, 30 seconds, or 1 minute). In some embodiments, joining the communication session using NFC does not require additional authorization/verification from the first electronic device to initiate the communication session. Alternatively, in some embodiments, joining the communication session using NFC does require additional authorization/verification from the first electronic device to initiate the communication session. Allowing the second electronic device to join the communication session using NFC simplifies the interaction between the user and the first electronic device by reducing the number of inputs needed to allow the second electronic device to join the communication session, which reduces power usage and improves battery life of the first electronic device.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the operation of the electronic device initiates a communication session described above with reference to method 700 optionally has one or more of the characteristics of the transmission of content during the communication session with reference to other methods described herein (e.g., method 900). Additionally, the communication session described with reference to method 700 optionally has one or more characteristics of the communication session described with reference to method 900. For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIG. 7 are, optionally, implemented by components depicted in FIGS. 1A-1B. For example, detecting operation 702*a*, initiating operation 702*b*, and foregoing initiating operation 702*c* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Receiving a Request to Join a Communication Session and Controlling Playback of Content Users interact with electronic devices in many different manners. In some embodiments, an electronic device, associated with a user account, is connected a display generation component and one or more input devices. In some embodiments, the electronic device can control playback of content through another electronic device (e.g., electronic device 500*a*) while in a communication session with the other electronic device. In some embodiments, the electronic device receives an indication that a communication session can be initiated with the other electronic device. In some embodiments, the second electronic device receives an input to join the communication session. Once in the communication session, the electronic device can transmit indications of content items to be played at the other electronic device. The embodiments described below provide ways in which the electronic device joins a communication session with the other electronic device and controls playback of content through the other electronic device. Allowing a electronic device to join a communication session with the other electronic device to control the playback of the content item enables users of the electronic devices to easily share and play content, thereby reducing the need for additional inputs to share and play content which enables the users of both electronic devices to use the electronic devices more efficiently. It is understood that people use devices. When a person uses a device, that person is optionally referred to as a user of the device.

FIGS. 8A-8N illustrate exemplary ways in which an electronic device 500*b* receives a request to join a communication session that includes controlling playback of content through a different electronic device (which acts like a hub) and joins the communication session with other electronic devices according to some embodiments. The embodiments in these figures are used to illustrate the processes described below, including the processes described with reference to FIG. 9. Although FIGS. 8A-8N illustrate various examples of ways an electronic device is able to perform the processes described below with respect to FIG. 9, it should be understood that these examples are not meant to be limiting, and the electronic device is able to perform one or more processes described below with reference to FIG. 9 in ways not expressly described with reference to FIGS. 8A-8N.

FIG. 8A illustrates electronic device 500*b*, which is associated with a user account with a display generation component 504*b*. In FIG. 8A, the electronic device 500*b* displays a lock screen user interface 800 that includes a user interface element 802*a* that indicates the current date and time. The lock screen user interface 800 also includes user interface element 802*b* which, when selected causes the electronic device 500*b* to activate a flashlight in communication with the electronic device 500*b*, and user interface element 802*c*, which, when selected causes the electronic device 500*b* to open a camera user interface of camera application on the electronic device 500*b*. In some embodiments, the lock screen user interface 800 shown in FIG. 8A represents a lock screen user interface 800 when the electronic device 500*b* is not within a threshold distance, described in greater detail in methods 700 and 900, of a electronic device 500*a*.

FIG. 8B illustrates the electronic device 500*b* with the lock screen user interface 800 while the electronic device 500*b* is within a threshold distance of the electronic device 500*a* and/or electronic device 500*c* described in more detail above with reference to method 700. In some embodiments, electronic device 500*b* displays a user interface element 804 on the lock screen user interface 800 when the electronic device 500*b* receives an indication that a communication session between the electronic device 500*a* and the electronic device 500*b* can be initiated, as described in greater detail in method 900. In some embodiments, and as described above, while in the communication session with the electronic device 500*a*, electronic device 500*b* is able to access other electronic devices connected to electronic device 500*a*. In some embodiments, user interface element 804 includes a textual description that the electronic device 500*b* can join a communication session with the user of the electronic device 500*a* (e.g., user of user account, "Bonnie"), and an icon representing a communication session. In some embodiments, the user interface element 804, which, when selected causes the electronic device 500*b* to initiate the communication session with the electronic device 500*a*. In some embodiments, the user interface element 804 remains on the lock screen user interface 800 while the electronic device 500*b* is within the threshold distance of the electronic device 500*a*, as described in method 900. In some embodiments, in response to receiving an input selecting the user interface element 804, the electronic device 500*b* navigates to a user interface of the content application (e.g., the content application including content that is shared during the communication session), such as user interface 814 as shown in FIG. 8D. In some embodiments, the electronic device 500*b* updates the user interface element 804 to a different user interface element, such as shown in FIG. 8I, when the communication session is initiated between the two devices.

For example, John's device (500*b*) is in a vehicle with Bonnie's device (500*a*), which is connected to a vehicle infotainment system as described above. While in the vehicle, which is within the threshold distance, John's device (500*b*) receives an indication from Bonnie's device to join the communication session, which is displayed on the lock screen user interface 800 as user interface element 804.

In some embodiments, the electronic device 500*b* can join the communication session while displaying a user interface of the content application associated with the communication session. FIG. 8C illustrates a user interface 805 of a content application (e.g., music application). In some embodiments, the content application is associated with the communication session and enables the electronic device 500*b* to control playback of content items by the electronic device 500*a* during the communication session. In some embodiments, user interface 805 has one or more characteristics of the user interface 600 described in FIG. 6A. For example, image 806 corresponds to image 603 of FIG. 6A, indication 808*a* corresponds to indication 604*a* of FIG. 6A, and the plurality of user interface elements 808*b* through 808*i* corresponds to the plurality of user interface elements 604*b* through 604*i* of FIG. 6A. In some embodiments, in response to receiving an input on user interface element 808*h*, the electronic device 500*b* displays an audio output menu 810 on user interface 805. In some embodiments, the audio output menu 810 includes a plurality of selectable options 812*a* through 812*b* that, when selected, cause the electronic device 500*b* to select an output device to play the content with the content application. In some embodiments, in response to receiving an input selecting selectable option 812*a*, the electronic device 500*b* connects wirelessly to "speaker" such that the audio is now being played through "speaker". In some embodiments, in response to receiving an input selecting selectable option 812*b*, the electronic device 500*b* plays the audio associated with the content item currently being played through the electronic device 500*b* (e.g., a speaker on the electronic device 500*b*). In some embodiments, in response to receiving an input selecting selectable option 812*c*, the electronic device 500*b* plays the audio associated with the content item currently being played through the electronic device 500*c* (e.g., "Bonnie's car") described in more detail in FIG. 6A-6I and method 700. In some embodiments, as described above, electronic device 500*b* is able to control electronic device 500*c* through the communication session. In some embodiments, selecting the selectable option 812*c* corresponding to a different electronic device begins the communication session with the associated user account (e.g., user account associated with electronic device 500*a*) and/or electronic device (e.g., electronic device 500*a* and/or electronic device 500*c*), which is described in greater detail in method 900.

In some embodiments, the electronic device 500*b* can join the communication session while displaying a different user interface in the content application. FIG. 8D illustrates home page user interface 814 of the content application. In some embodiments, the home page user interface 814 includes a plurality of user interface elements 816*a* through 816*d* that are selectable to open different playlists of content (e.g., playlists of songs). For example, in response to receiving an input selecting user interface element 816*c*, the electronic device 500*b* opens a playlist user interface shown in FIG. 8J. In some embodiments, home page user interface 814 also includes a playback control element 818, which includes selectable options to control the playback of the currently playing content item (e.g., song 2 in FIG. 8D). In some embodiments, home page user interface 814 also includes a navigation bar 820 that includes selectable options that, when selected, cause the electronic device 500*b* to display various user interfaces of the content application. In some embodiments, while a communication session with the electronic device 500*a* can be initiated, the electronic device 500*b* displays a user interface element 822 indicating that a communication session with the electronic device 500*a* can be initiated ("Join session with Bonnie") on the home page user interface 814 of the content application. In some embodiments, in response to detecting an input selecting user interface element 822, the electronic device 500*b* initiates (or requests to initiate) the communication session with the electronic device 500*a*. In some embodiments, during the communication session, the electronic device 500*b* updates the user interface element 822 to indicate that the electronic device is in the communication session (e.g., "Communication session with Bonnie active"). In some embodiments, the electronic device 500*b* displays user interface element 822 in one or more other user interfaces of the content application, such as one or more of the user interfaces displayed in response to receiving an input selecting one of the options included in navigation bar 820, as shown in FIG. 8D.

In some embodiments, while content is currently playing on the content application, the electronic device 500*b* displays a companion user interface element 826 concurrently with other user interfaces of the content application and/or other applications. As shown in FIG. 8E, the electronic device 500*b* displays the companion user interface element 826 of the content application in a home screen user interface 824. In some embodiments, the home screen user interface 824 includes a plurality of selectable elements (e.g., shown as icons in FIG. 8E) that, when selected, causes the electronic device 500*b* to navigate to user interfaces of different applications. In some embodiments, each selectable element represents a different application and is selectable to open a user interface of the respective application. In some embodiments, in response to selecting the companion user interface element 826, the electronic device 500*b* displays an expanded user interface element (shown in FIG. 8F) which includes selectable options to control playback of the presently playing content item and/or join a communication session.

In some embodiments, the electronic device 500*b* detects a user input (e.g., contact 828 directed to companion user interface element 826 in FIG. 8E) corresponding to a request to display the expanded user interface element 830 with the electronic device 500*b*. In response to receiving the user input directed to the companion user interface element 826 in FIG. 8E, the electronic device 500*b* displays the expanded user interface element 830, as shown in FIG. 8F. In some embodiments, the electronic device 500*b* detects user input (e.g., a gaze of the user, a contact on a touch-sensitive surface, actuation of a physical input device of the vehicle, a predefined gesture (e.g., pinch gesture or air tap gesture) and/or a voice input from the user) corresponding to the selection of the companion user interface element 826 and in response displays the expanded user interface element 830.

In some embodiments, the expanded user interface element 830, shown in FIG. 8F, includes a plurality of selectable options that, when selected, causes the electronic device 500*b* to control playback of the presently playing content item. The plurality of selectable options optionally has one or more characteristics of user interface elements 808*a* through 808*e* shown in FIG. 8C. In some embodiments, while a communication session with the electronic device 500*a* can be initiated (as described in method 900), the electronic device 500*b* displays a user interface element 832, shown in FIG. 8F, indicating that a communication session with the electronic device 500*a* can be initiated ("Join session with Bonnie") while displaying the expanded user interface element 830. In some embodiments, in response to receiving an input selecting the user interface element 832, the electronic device 500*b* joins or requests to join the communication session with the electronic device 500*a*. In some embodiments, during the communication session, the electronic device 500*b* updates user interface element 832 to indicate that there is a communication session active with the electronic device (e.g., "Session with Bonnie active").

In some embodiments, the electronic device 500*b* can join a communication session with the electronic device 500*a* by scanning a scannable code shown in FIG. 8G, which has one or more characteristics of the scannable code 642 described in FIG. 6I. In some embodiments, the electronic device 500*c* displays the scannable code in the settings user interface described in FIG. 6I. In some embodiments, the electronic device 500*b* scans the scannable code using a camera application. FIG. 8G illustrates a user interface 834 of a camera application. In some embodiments, the user interface 834 includes a visual representation 836 of the scannable code displayed in the physical environment (e.g., the scannable code displayed on the electronic device 500*c*, shown in FIG. 6I). In some embodiments, in response to scanning the scannable code (e.g., using a camera of the electronic device 500*b*), the electronic device 500*b* displays a user interface element 838 on the user interface 834. In some embodiments, in response to receiving an input selecting the user interface element 838, the electronic device 500*b* joins the communication session with the electronic device 500*a* and described in further detail in method 900. In some embodiments, further approval by the electronic device 500*a* is not needed to join the communication session using the scannable code.

In some embodiments, the electronic device 500*b* can join the communication session with the electronic device 500*a* by detecting a NFC tag of the electronic device 500*a*, which is described in greater detail with reference to FIG. 6D, method 700 and method 900. In some embodiments, the electronic device 500*b* "taps" the electronic device 500*a* for a threshold amount of time at a threshold distance from the electronic device 500*a*, as described in greater detail in method 700 and 900, to initiate the communication session. In some embodiments, and as shown in FIG. 8H, once a tap between the two devices has been detected, the electronic device 500*b* displays a user interface element 840 overlaid on a user interface (e.g., user interface 805). In some embodiments, the user interface element 840 has one or more characteristics of the user interface element 624 shown in FIG. 6D. In some embodiments, the user interface element 840 includes a first selectable option 842*a*, which has one or more characteristics of first selectable option 626*a*, shown in FIG. 6D, and a second selectable option 842*b*, which has one or more characteristics of the second selectable option 626*b* shown in FIG. 6D. In some embodiments, in response to an input directed to the second selectable option 842*b*, the electronic device 500*b* joins the communication session with the electronic device 500*a*. In some embodiments, further approval by the electronic device 500*a* is not needed to join the communication session using the NFC tag. In some embodiments, the electronic device 500*a* displays a user interface element, such as user interface element 628 shown in FIG. 6E, in response to receiving a request to join the communication session from electronic device 500*b*. In some embodiments, the electronic device 500b is able to tap any electronic device already in the communication session with electronic device 500a to request to join the communication session owned/hosted by electronic device 500a. For example, the electronic device 500b is able to tap the electronic devices corresponding to plurality of visual representations 846a through 846d, shown in FIG. 8I, to join the communication session with electronic device 500a.

In some embodiments, in response to receiving the input selecting the second selectable option 842b in FIG. 8H, the input selecting the user interface element 838 in FIG. 8G, the input selecting the user interface element 832 in FIG. 8F, the user interface element 822 in FIG. 8D, and/or the user interface element 804 in FIG. 8B, the electronic device 500b joins the communication session with the electronic device 500a. In some embodiments, some of the methods of joining require certain criteria to be met, discussed in further detail in method 900. For example, some of the methods for joining require further approval by the electronic device 500a, such as if the electronic device 500b is not a contact of the electronic device 500a and/or if the electronic device 500b has not previously joined a communication session with the electronic device 500a, as described in method 900. In some embodiments, FIG. 8I illustrates the lock screen user interface 800 with a user interface element 844 indicating that the electronic device 500b is in the communication session with the electronic device 500a. In some embodiments, user interface element 844 includes a plurality of visual representations 846a through 846d representing the electronic device and/or user accounts in the communication session with the electronic device 500a. In some embodiments, the plurality of visual representations 846a through 846b corresponds to the contacts in the communication session as shown by visual indications 644a through 644c in FIG. 6I, along with a visual representation 846b representing Bonnie, the user of the electronic device 500a. For example, visual representation 846a represents John (user of the electronic device 500b), visual representation 846b represents Bonnie (user of the electronic device 500a and the electronic device 500c), visual representation 846c represents Luka, and visual representation 846d represents Amy. For example, Luka and Amy are users of other electronic devices in the communication session with the electronic device 500a and the electronic device 500b that can control playback of content by the electronic device 500a in the communication session. In some embodiments, user interface element 844 includes a selectable option 848, shown in FIG. 8I, which is selectable to leave the communication session. As described in method 700 and 900, content added to the content playback queue by the electronic device 500b remain in the content playback queue even if the electronic device 500b leaves the communication session. In some embodiments, in response to receiving an input directed towards selectable option 848, shown in FIG. 8I, the electronic device 500b leaves the communication session and replaces the user interface element 844 with a user interface element indicating that the electronic device 500b has disconnected form the communication session, such as shown in FIGS. 8M and 8N.

FIG. 8J illustrates a playlist user interface 850 of the content application, which has one or more characteristics of the user interface 651 discussed above with reference to FIG. 6L. While in a communication session, the electronic device 500b displays a user interface element 852, which has one or more characteristics of user interface element 636 described in FIG. 6G. In some embodiments, the user interface element 852 indicates the number of devices (and/or users) in the communication session and/or waiting to join the communication session (e.g., 4 people as shown in FIG. 8J). In some embodiments, in response to receiving an input directed to the user interface element 852, the electronic device 500b displays a settings user interface similar to the settings user interface 640 described in FIG. 6I. However, since the electronic device 500b is not the electronic device playing content in the communication session, the settings user interface displayed by the electronic device 500b lacks the ability to add and/or remove users and/or devices from the communication session. In some embodiments, the setting user interface displayed by the electronic device 500b does not include the scannable code shown in settings user interface in FIG. 6I.

In some embodiments, while in the communication session with the electronic device 500a, the electronic device 500b can select content from the content application to be added to the content playback queue for playback by the electronic device 500a, which is discussed in greater detail in method 900. As shown in FIG. 8H, playlist user interface 850 includes a plurality of user interface elements 856a through 856d representing the respective content item. In some embodiments, the plurality of user interface elements 856a-856d include an image representing content artwork (e.g., artwork associated with each content item). For example, the content artwork is optionally a song artwork or an album artwork. In some embodiments, the plurality of user interface elements 856a-856d include text representing the content item. For example, as shown in FIG. 8J, user interface element 856a includes the text "Song 1" indicating the song title and artwork representing the album that the song is part of. As shown in FIG. 8J, user interface element 856b includes the text "Song 2" indicating the song title and artwork representing the album that the song is part of. As shown in FIG. 8J, user interface element 856c includes the text "Song 3" indicating the song title and artwork representing the album that the song is part of. As shown in FIG. 8J, user interface element 856d includes the text "Song 4" indicating the song title and artwork representing the album that the song is part of.

In some embodiments, the electronic device 500b detects a user input (e.g., finger of contact 857 directed to user interface element 856c in FIG. 8J) corresponding to a request to play song 3 while in the communication session. In response to receiving the user input directed to user interface element 856c in FIG. 8J, the electronic device 500b adds song 3 to the content playback queue, shown in FIG. 8K, and described in further detail in method 700 and 900. In some embodiments, in response to the input directed user interface element 856c, the electronic device 500b does not display the content playback queue. Alternatively, in some embodiments, in response to the input directed user interface element 856c, the electronic device 500b does not display the content playback queue. In some embodiments, if the electronic device 500b was not in the communication session with the electronic device 500a, the selection of song 3 would not add song 3 to the content playback queue. In some embodiments, if the electronic device 500b was not in the communication session with the electronic device 500a, in response to the input directed towards the selection of song 3, the electronic device 500b would begin playing song 3, as described in method 900 and described in the context of the electronic device 500a and electronic device 500c in FIGS. 6J-6K.

While in the communication session, the electronic device 500b displays the content playback queue shown in user interface 858 with indications 862a through 862d, as shown in FIG. 8K. In some embodiments, the content playback queue is stored on the electronic device 500a and played from the electronic device 500a and/or the electronic device 500c, as described in methods 700 and 900. In some embodiments, user interface 858 has one or more characteristics of user interface 664, described in FIG. 6M. In some embodiments, the content playback queue includes user interface elements 860a through 860d which are indications of the content currently playing and upcoming. In some embodiments, user interface element 860a, which indicates the content item that is currently playing, includes the text "Song 2" indicating the song title and artwork representing the album that the song is part of. In some embodiments, user interface element 860b, which indicates the first upcoming content item, includes the text "Song 5" indicating the song title and artwork representing the album that the song is part of. In some embodiments, user interface element 860c, which indicates the second upcoming content item, includes the text "Song 4" indicating the song title and artwork representing the album that the song is part of. In some embodiments, user interface element 860d, which indicates the third upcoming content item, includes the text "Song 3" indicating the song title and artwork representing the album that the song is part of. In some embodiments, user interface 858 also includes indications 862a through 862d, which indicate the user account that added the content item to the queue, which is described in further detail in method 700 and method 900. In some embodiments, indications 862a through 862d have one or more characteristics of indications 668a through 668c described above with reference to FIG. 6M. In some embodiments, indications 862a through 862d include avatars of the respective electronic device and/or user account. For example, indication 862a, shown in FIG. 8K, represents the sender of "Song 2". Indication 862b, shown in FIG. 8K, represents the sender of "Song 5". Indication 862c, shown in FIG. 8K, represents the sender of "Song 4". Indication 862b, shown in FIG. 8K, represents the sender of "Song 3". As shown in FIG. 8J, the user of the electronic device 500b ("John") selected "Song 3" so indication 862b, shown in FIG. 8K, represents John (e.g., the electronic device 500b and/or the user account associated with John).

FIG. 8L illustrates a user interface that indicates the presently playing content item ("Song 2"), which is playing on electronic device 500a and/or electronic device 500c, shown in FIG. 6A, in user interface 805 while in the communication session with the electronic device 500a. In some embodiments, while the electronic device 500b is in the communication session, user interface 805 includes an indication (e.g., indication 862a shown in FIG. 8L) of the user account that requested playback of the content item ("Luka"). In some embodiments, the indication (e.g., indication 862a shown in FIG. 8L) includes an avatar and/or name representing the sender of the content item (e.g., of the electronic device and/or user account). In some embodiments, while in the communication session, the electronic device 500b can control the playback of the content item using the user interface elements on the user interface 805, which are described in greater detail in FIG. 8C.

In some embodiments, the electronic device 500b detects a user input (e.g., finger of contact 864 directed to user interface element 808i in FIG. 8L) corresponding to a request to display the content playback queue while in the communication session. In response to the user input directed to select user interface element 808i in FIG. 8J, the electronic device 500b displays user interface 858, a user interface of the content playback queue, shown in FIG. 8K, and described in further detail in method 700 and 900.

In some embodiments, the electronic device 500b leaves the communication session in one or more ways, described in method 900. In some embodiments, in response to the electronic device 500b being more than the threshold distance away from the electronic device 500a, described in greater detail in method 700 and method 900, the electronic device 500b disconnects from the communication session. As shown in FIG. 8M, in response to disconnecting from the communication session, the electronic device 500b displays user interface element 866a. For example, the electronic device 500a displays user interface element 866a on the lock screen user interface 800. In some embodiments, the electronic device 500b displays user interface element 866a overlaid on a different user interface, such as a user interface the electronic device 500b was displaying when the electronic device 500b disconnected from the communication session. In some embodiments, user interface element 866a, shown in FIG. 8M, includes text indicating that the communication session has ended and a reason for the communication session ending ("You are disconnected because you are no longer nearby"). In some embodiments, user interface element 866a also includes text indicating from which communication session the electronic device 500b is leaving from ("Bonnie", e.g., the electronic device 500a and/or the user account).

FIG. 8N illustrates a different embodiment of a user interface element (e.g., user interface element 866b) that is displayed when the electronic device 500b leaves the communication session with the electronic device 500a. In some embodiments, the electronic device 500b leaves the communication session when the electronic device 500a disconnects from the electronic device 500c, described in further detail in method 900. In some embodiments, user interface element 866b, shown in FIG. 8N includes text indicating that the communication session has ended and a reason for the communication session ending ("You are disconnected because the session is no longer active"). In some embodiments, user interface element 866b also includes text indicating from which communication session the electronic device 500b is leaving from ("Bonnie", e.g., the electronic device 500a and/or the user account).

In some embodiments, the electronic device 500b leaves the communication session by receiving an input on selectable option 848, shown in FIG. 8I. As a result, the user interface element (e.g., user interface element 886a or user interface element 886b) displayed on the lock screen user interface indicates that the reason for the communication session ending is because the electronic device 500b ended the session (e.g., "You are disconnected because you have left the session").

Figure 9:
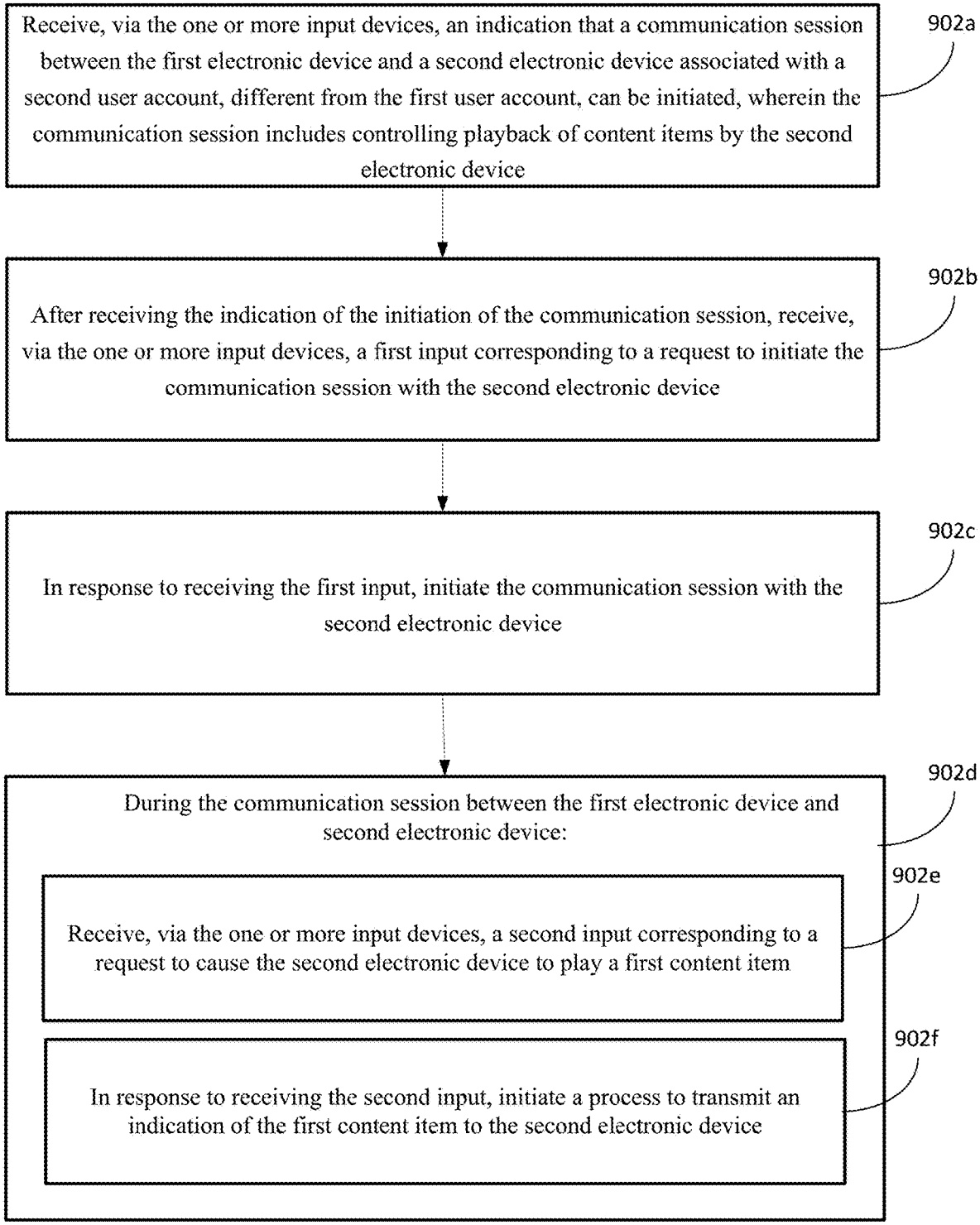
FIG. 9 is a flow diagram illustrating a method in which an electronic device receives a request to join a communication session that includes controlling playback of content by another electronic device and joins the communication session in accordance with some embodiments of the disclosure.

FIG. 9 is a flow diagram illustrating a method in which an electronic device receives a request to join a communication session that includes controlling playback of content by another electronic device and joins the communication session according to some embodiments. The method 900 is optionally performed at first and/or electronic devices such as device 100, device 300, or device 500 as described above with reference to FIGS. 1A-1B, 2-3, 4A-4B and 5A-5C. Some operations in method 900 are, optionally combined and/or order of some operations is, optionally, changed.

As described below, the method 900 provides ways in which an electronic device receives a request to join a communication session, joins the communication session, and transmits content during the communication session. Transmitting an indication of a content item in a communication session with a first electronic device allows the second electronic device to control the playback of the first content item, which enables the user of the second electronic device to easily share and play content, thereby reducing the need for additional inputs to share and play content which enables the users of both electronic devices to use the electronic devices more efficiently In some embodiments, method 900 is performed at a first electronic device (e.g., electronic device 500*b* described in FIGS. 6A-6N and FIGS. 8A-8N) in communication with a display generation component and one or more input devices, wherein the first electronic device is associated with a first user account (e.g., the user account associated with electronic device 500*a* (e.g., Bonnie) described in FIGS. 6A-6N and FIGS. 8A-8N). In some embodiments, the first electronic device has one or more characteristics of the second electronic device described in method 700. In some embodiments, the first user account has one or more characteristics of the second user account described in further detail in method 700. In some embodiments, the display generation component has one or more characteristics of the display generation component described in method 700. In some embodiments, the first user account has one or more characteristics of the first and/or second user account described in method 700. In some embodiments, the first user account is associated with a first user. In some embodiments, the first electronic device is associated with the first user account (e.g., that is established with a secure and/or trusted entity such as one or more servers configured to verify cryptographic information associated with the first user account) that has designated the first user as the owner of the first electronic device, thereby defining an association between the first user and the first user account In some embodiments, the first electronic device receives (902*a*), via the one or more input devices, an indication that a communication session between the first electronic device and a second electronic device associated with a second user account (e.g., the electronic device 500*a* and the user account associated with electronic device 500*a* described in FIGS. 6A-6N and FIGS. 8A-8N), different from the first user account, can be initiated (e.g., such as shown with user interface element 804 in FIG. 8B, selectable option 812*c* in FIG. 8C, user interface element 822 in FIG. 8D, and user interface element 832 in FIG. 8F), wherein the communication session includes controlling playback of content items by the second electronic device. In some embodiments, the second electronic device has one or more characteristics of the first electronic device as described in method 700. In some embodiments, the second user account has one or more characteristics of the first user account described in further detail in method 700. In some embodiments, the indication is transmitted from the second electronic device to the first electronic device after one or more criteria are satisfied. In some embodiments, the one or more criteria includes a criterion that is satisfied when the first electronic device is at a threshold distance from the second electronic device associated with the second user account. In some embodiments, the threshold distance is described in further detail in method 700. In some embodiments, the communication session is described in further detail in method 700. In some embodiments, in response to receiving the indication that the communication session can be initiated, the first electronic device displays a visual indication of the communication session. In some embodiments, the visual indication of the communication session is a notification on a lock screen user interface of the first electronic device, a notification on a content player user interface, or other user interfaces of the first electronic device, as described in more detail below. In some embodiments, the notification is a persistent notification. Alternatively, in some embodiments, the notification is not a persistent notification (e.g., a one-time notification). Alternatively, in some embodiments, the communication session is between the first user account and the second user account. In some embodiments, while the first electronic device and second electronic device are in the communication session, a third electronic device, associated with the first user account, controls playback of content items by the second electronic device. In some embodiments, the third electronic device is not in the communication session with the first electronic device and the second electronic device.

In some embodiments, after receiving the indication of the initiation of the communication session, the first electronic device receives (902*b*), via the one or more input devices, a first input corresponding to a request to initiate the communication session with the second electronic device, such as an input directed towards any user interface element 804 in FIG. 8B, selectable option 812*c* in FIG. 8C, user interface element 822 in FIG. 8D, and user interface element 832 in FIG. 8F. In some embodiments, receiving the first input includes receiving an interaction with one or more user interface elements of the visual indication of the initiation of the communication session (e.g., buttons). For example, the electronic device detects a tap (e.g., with an index finger of a hand) at a location on a touch sensitive display. In other embodiments, the first input includes a user interaction of the above user interactions with a mouse or trackpad, such as clicking with a mouse or a trackpad.

In some embodiments, in response to receiving the first input, the first electronic device initiates (902*c*) the communication session with the second electronic device, such as shown by user interface element 844 in FIG. 8I. In some embodiments, initiating the communication session allows the first electronic device to transmit data to the second electronic device, or vice versa. In some embodiments, data includes information about initiating the playback of a content item (e.g., music, podcast, video, or other content) using the second electronic device.

In some embodiments, during the communication session between the first electronic device and second electronic device (902*d*) (e.g., while the communication session is active), the first electronic device receives (902*e*), via the one or more input devices, a second input corresponding to a request to cause the second electronic device to play a first content item, such as with contact 857 on user interface element 856*c* in FIG. 8J. In some embodiments, the second input has one or more characteristics of the first input. In some embodiments, the request includes a request to add the first content item to a queue or a request to instantly playback the first content item.

In some embodiments, in response to receiving the second input, the first electronic device initiates (902*f*) a process to transmit an indication of the first content item (e.g., a song, podcast, and/or video) to the second electronic device. Once the second electronic device (e.g., electronic device 500*a*) receives the indication of the first content item, the content item (e.g., "song 3" selected by contact 857 in FIG. 8J) is shown on the content playback queue in user interface 858 in FIG. 8K represented by user interface element 860*d*. In some embodiments, transmitting the indication of the first content item does not include transmitting a file of the first content item. In some embodiments, transmitting the indication of the first content item includes transmitting instructions to the second electronic device to retrieve the first content item from a content service server. In some embodiments, a content service server is a server in communication with the first and/or second electronic device wherein the first content item and/or other content items are stored. In some embodiments, in response to transmitting an indication of the first content item, the first electronic device and/or the second electronic device displays a visual indication of the first content item. In some embodiments, the visual indication of the first content item includes album art, a description of the title of the first content item, and/or a description of the author of the first content item. Transmitting an indication of the first content item in a communication session with a second electronic device allows the first electronic device to control the playback of the first content item, which enables the user of the first electronic device to easily share and play content, thereby reducing the need for additional inputs to share and play content which enables the users of both electronic devices to use the electronic devices more efficiently.

In some embodiments, transmitting the indication of the first content item to the second electronic device causes the second electronic device to add the first content item to a content playback queue on the second electronic device, as shown by the selection of song 3 in FIG. 8J by contact 857 and the addition of song 3 to the content playback queue shown user interface 858 as indication 860*d* in FIG. 8K. In some embodiments, the content playback queue has one or more characteristics of the content playback queue described in method 700. In some embodiments, the first content item is added to the end of the content playback queue for playback after the other content items in the playback queue. In some embodiments, the first electronic device and/or the second electronic device determines the position of the first content item in the content playback queue. Adding the first content item to the content playback queue optionally includes adding the indication of the first content item to the content playback queue instead of a file of the first content item. For example, the first electronic device transmits the indication of the content item to the second electronic device. Alternatively, in some embodiments, transmitting the indication of the first content item to the second electronic device causes the second electronic device to begin playing the first content item. Placing the first content item in a content playback queue reduces the need for manual inputs to create the content playback queue which reduces the likelihood of erroneous inputs to the user interface, which reduces power usage and improves battery life of the first electronic device.

In some embodiments, the indication of the first content item includes an indication of the first electronic device or the first user account, such as shown by indication 862*d* in FIG. 8K, which represents the user of the first electronic device (e.g., electronic device 500*b*). In some embodiments, while the second electronic device is playing the first content item, the second electronic device displays a visual indication of the first electronic device and/or the first user account in a content playback user interface that includes options for modifying playback of the content item and information about the content item. As another example, as described in more detail below, while displaying the content playback queue, the second electronic device displays the indication of the first electronic device or first user account in association with a visual indication of the first content item. In some embodiments, the visual indication includes a textual description and/or an avatar of the first electronic device and/or the first user account transmitted in the indication of the first content item. In some embodiments, the content (e.g., the first content item) transmitted to the second electronic device is associated with the first electronic device and/or the first user account. In some embodiments, the visual indication that is displayed with associated information about the first electronic device and/or the first user account is based on information about the first electronic device and/or the first user account stored on the second electronic device. For example, a name and/or avatar of the first electronic device and/or the first user account in the visual indication is the name and/or avatar stored on the second electronic device. Transmitting an indication of the first electronic device or the first user account with the indication of the first content item allows the first electronic device and the second electronic device to track the origin of the first content item which improves privacy and/or security of the first electronic device and the second electronic device.

In some embodiments, the first electronic device receives, via the one or more input devices, the indication that the communication session can be initiated while displaying a lock screen user interface. In some embodiments, the indication that the communication session can be initiated can be received while displaying a user interface other than the lock screen user interface (e.g., user interface of the content playback application, home screen user interface, or other user interfaces). In some embodiments, the lock screen user interface is a user interface that is displayed while the first electronic device is locked (e.g., user access to the first electronic device is being restricted), and requires user authentication (e.g., facial authentication, fingerprint authentication, other biometric authentication, password authentication, etc.) before moving away from the lock screen user interface. In some embodiments, the second electronic device also includes a lock screen user interface. In some embodiments, the lock screen user interface includes a plurality of user interface elements such as a user interface element selectable to open a camera application, a user interface element that displays the current time, and other user interface elements.

In some embodiments, in response to receiving the indication that the communication session can be initiated, the first electronic device displays, via the display generation component, a respective visual indication of the indication that the communication session can be initiated on the lock screen user interface, such as shown by user interface object 804 on user interface 800 in FIG. 8B. In some embodiments, the respective visual indication includes a textual description describing the communication session and a sender of the communication session (e.g., second user account and/or second electronic device). In some embodiments, the visual indication is displayed when the second electronic device is within a threshold distance of the first electronic device, described in further detail in method 700. In some embodiments, the visual indication includes a selectable option that is selectable to initiate the communication session with the second electronic device. Presenting a visual indication on the lock screen user interface of the indication that the communication session can be initiation simplifies the interaction between the user and the first electronic device by reducing the number of inputs needed initiate the communication session, which reduces power usage and improves battery life of the first electronic device.

In some embodiments, in accordance with a determination that the first user account associated with the first electronic device is a contact of the second user account associated with the second user device, displaying the respective visual indication includes continuing to display the respective visual indication on the lock screen user interface while the first electronic device is within the threshold distance of the second electronic device (e.g., 0.1 m, 1 m, 5 m, or 10 m), such as if user interface object 804 continues to be displayed while the first electronic device (e.g., electronic device 500*b*) is within the threshold distance of the second electronic device (e.g., electronic device 500*a*). In some embodiments, the first user account associated with first electronic device is a contact of the second user account and/or second electronic device when the second user account and/or second electronic device includes stored information about the first user account and/or the first electronic device. For example, the second user account and/or second electronic device stores a name, phone number, email address, physical address, or other information related to the first user account and/or first electronic device. In some embodiments, when the first electronic device is no longer within the threshold distance of the second electronic device, the respective visual indication is no longer displayed. In some embodiments, the respective visual indication is displayed on a notification user interface and/or a lock screen user interface and is continued to be displayed on the notification user interface until the first electronic device is no longer within the threshold distance away of the second electronic device. In some embodiments, the first electronic device navigates away from the lock screen user interface and the respective visual indication. In response to navigating back to the lock screen user interface, the respective visual indication is still displayed while the first electronic device is within the threshold distance of the second electronic device. Displaying the visual indication on the lock screen user interface while the first electronic device is within the threshold distance of the second electronic device provides feedback about the communication session, thereby reducing the number of inputs needed to retrieve information relating to initiating the communication session.

In some embodiments, in accordance with a determination that the first electronic device was previously in the communication session with the second electronic device (and the first electronic device or first user account is not a contact of the second electronic device or second user account), displaying the respective visual indication includes continuing to display the respective visual indication on the lock screen user interface while the first electronic device is within the threshold distance of the second electronic device, such as if user interface object 804 continues to be displayed while the first electronic device (e.g., electronic device 500*b*) is within the threshold distance of the second electronic device (e.g., electronic device 500*a*). In some embodiments, the first electronic device and/or the second electronic device stores information (e.g., who joined) about previous communication sessions. In some embodiments, if the first electronic device was previously allowed in a communication session with the second electronic device (whether the first electronic device is a contact of the second electronic device), the electronic device displays the respective visual indication on the lock screen user interface and continues to display the respective visual indication while the first electronic device is within the threshold distance of the second electronic device. In some embodiments, when the first electronic device is no longer within the threshold distance of the second electronic device, the first electronic device ceases display of the respective visual indication. In some embodiments, in accordance with a determination that the first electronic device was not previously in the communication session with the second electronic device and optionally is not a contact of the second electronic device or second user account, the first electronic device does not continuously display the respective visual indication while the first electronic device is within the threshold distance of the second electronic device. In some embodiments, the respective visual indication is displayed for a set amount of time (e.g., 1 second, 5 seconds, 10 seconds, 1 minute, 30 minutes, 1 hour, or 5 hours) in accordance with a determination that the first electronic device was not previously in the communication session with the second electronic device and optionally is not a contact of the second electronic device or second user account. Displaying the visual indication on the lock screen user interface while the first electronic device is within the threshold distance of the second electronic device and if the first electronic device was previously in a communication session with the second electronic device provides feedback about the communication session, thereby reducing the number of inputs needed to retrieve information relating to initiating the communication session.

In some embodiments, the first electronic device receives, via the one or more input devices, the indication that the communication session can be initiated while displaying a user interface of a content playback application, such as user interface 814 in FIG. 8D. The user interface of the content playback application has one or more characteristics of the user interface of the content playback application described with reference to method 700. In some embodiments, the first electronic device receives the indication that the communication session can be initiated while displaying a user interface of a content application used to play content items in accordance with the communication session.

In some embodiments, in response to receiving the indication that the communication session can be initiated, the first electronic device displays, via the display generation component, a respective visual indication of the indication that the communication session can be initiated on the user interface of a content playback application used to play content items in accordance with the communication session, such as shown by user interface object 822 on user interface 814 in FIG. 8D. In some embodiments, the respective visual indication has one or more characteristics of the respective visual indication as described above. In some embodiments, the respective visual indication is displayed in the user interface of the content playback application. For example, the respective visual indication is displayed in a portion of the user interface that displays visual indications. In some embodiments, the first electronic device is playing a content item with the content playback application when the first electronic device receives the indication that the communication session can be initiated. In some embodiments, in response to receiving an input selecting the respective visual indication, the first electronic device connects to the communication session and transmits the indication of the content item to the second electronic device to be placed in the content playback queue. Displaying the visual indication on the user interface of the content playback application while the first electronic device is within the threshold distance of the second electronic device provides feedback about the communication session, thereby reducing the number of inputs needed to retrieve information relating to initiating the communication session.

In some embodiments, in response to receiving the indication that the communication session can be initiated, the first electronic device displays, via the display generation component, a respective visual indication of the indication that the communication session can be initiated that includes an indication of the second user account based on information about the second user account stored on the first electronic device, such as shown by the text "Bonnie" (which is the name of the second user account (e.g., user account associated with electronic device 500a) stored on the first electronic device (e.g., electronic device 500b) on user interface object 822 in FIG. 8D and user interface object 804 in FIG. 8B. In some embodiments, the indication of the second user account includes a name, avatar, image, or other identifying information. In some embodiments, the information about the second user account differs between the information stored on the first electronic device and the information stored on the second electronic device, for example, if the first electronic device associates a first name with the second user account and the second electronic device associates a second name, different from the first name, with the second user account, the first electronic device displays the first name. For example, the first electronic device optionally stores the name "Mom" for the second user account where the owner of the second user account has a name of "Maria". In some embodiments, the first electronic device displays the respective visual indication about the initiation of the communication session after receiving the indication that the communication session can be initiated and the request to initiate the communication session is received by the second electronic device, as described above. Displaying the visual indication that a communication session can be initiated while the first electronic device is within the threshold distance of the second electronic device with an indication of the second user account based on information about the second user account stored on the first electronic device improves privacy and/or security of the second electronic device and second user account.

In some embodiments, receiving the indication of the initiation of the communication session further includes receiving the indication by scanning a scannable code via one or more input devices, such as shown by scanning the representation 836 of the scannable code using the camera application in FIG. 8G. In some embodiments, the second electronic device displays the scannable code as described above with reference to method 700. For example, the first electronic device scans the scannable code using a camera. In some embodiments, the scannable code is a QR code, barcode, or other image-based code. In some embodiments, in response to scanning the scannable code, the first electronic device receives a visual indication of the initiation of the communication session. In some embodiments, the visual indication has one or more characteristics of the visual indication as described above. In some embodiments, the indication of the initiation includes receiving an indication of a link (e.g., a link to the content playback application or a link to the web application of the content playback application if the first electronic device does not have the content playback application downloaded). In some embodiments, the first input, as described above, is directed towards the link, which when selected, initiated the communication session with the second electronic device. Joining thing communication session with a scannable code reduces the need for manual inputs to join the communication session, which reduces power usage and improves battery life of the first electronic device.

In some embodiments, in response to scanning the scannable code, the first electronic device initiates the communication session with the second electronic device without requiring receiving an indication of confirmation of the communication session from the second electronic device. For example, in response to the electronic device 500b receiving an input on user interface element 838 in FIG. 8G, the communication session is initiated without the electronic device 500a receiving a request to verify the electronic device 500b before initiating the communication session. In some embodiments, the indication of confirmation is an indication of authorization from the second electronic device for the first electronic device to join the communication session, as described above with reference to method 700. Alternatively, in response to scanning the scannable code, the first electronic device transmits a request for authorization to the second electronic device. Allowing the first electronic device to join the communication session without requiring authorization of the initiation of the communication session simplifies the user interaction thereby reducing the likelihood of erroneous inputs to initiate the communication session.

In some embodiments, the first electronic device displays a user interface of a content application used to cause the second electronic device to play the first content item that includes a menu including a plurality of selectable options for selecting an output device to play content using the content application, such as audio output menu 810 in FIG. 8C, wherein the first input corresponding to the request to initiate the communication session is directed towards a respective selectable option included in the menu, such as if a contact were directed towards selectable option 812c in FIG. 8C. In some embodiments, the user interface of the content playback application has one or more characteristics of the user interface of the content playback application as described in method 700. In some embodiments, the number of selectable options in the menu changes depending on the number of available output devices. In some embodiments, the output devices includes wired or wireless headphones, an external speaker, a vehicle, or other output devices. For example, selecting a selectable option representing a vehicle of a user account initiates the communication session with the user account. Displaying the visual indication on a menu on a user interface of the content playback application while the first electronic device is within the threshold distance of the second electronic device provides feedback about the communication session, thereby reducing the number of inputs needed to initiate the communication session.

In some embodiments, in response to selecting a selectable option on a companion user interface, the first electronic device initiates the communication session with the second electronic device, such as if a contact were directed towards user interface element 832 in FIG. 8F. In some embodiments, the companion user interface is a user interface of the content playback application (or any application that is running in the background of the first electronic device) that is displayed while in user interfaces of other applications (e.g., home screen user interface, maps user interface, web browsing user interface, or other user interfaces). For example, while content is playing in the content playback application, the companion user interface of the content playback application is displayed in other user interfaces. In some embodiments, content does not need to be playing in the content playback application for the companion user interface to be displayed in other user interfaces of other applications. In some embodiments, the companion user interface is selectable to display an expanded companion user interface of the content playback application. In some embodiments, the expanded companion user interface includes selectable options to control playback of content (e.g., pause, play, track, or seek). Additionally, In some embodiments, the expanded companion user interface includes a selectable option to initiate the communication session with the second electronic device while within a threshold distance from the second electronic device, as discussed above and with reference to method 700. Displaying a selectable option on a companion user interface that is selectable to initiate the communication session simplifies the user interaction with the first electronic device, thereby reducing the number of inputs needed to initiate the communication session.

In some embodiments, initiating the communication session with the second electronic device in response to receiving the first input includes, in accordance with a determination that the first electronic device previously disconnected from the communication session within a threshold amount of time ago (e.g., 1 min, 10 min, 15 min, 30 min, 45 min, 1 hour, 2 hours, 4 hours, 12 hours, or 18 hours or 1 or 2 days), the first electronic device initiates the communication session without requiring confirmation from the second electronic device (e.g., without the second electronic device authorizing the communication session with the first electronic device, which is described in further detail in method 700), such as if an input on selectable option 848 in FIG. 8I were detected within a threshold amount of time.

In some embodiments, initiating the communication session with the second electronic device in response to receiving the first input includes, in accordance with a determination that the first electronic device did not disconnect from the communication session within the threshold amount of time ago (e.g., 1 min, 10 min, 15 min, 30 min, 45 min, 1 hour, 2 hours, 4 hours, 12 hours, or 18 hours or 1 or 2 days), such as if an input on selectable option 848 in FIG. 8I were detected greater than the threshold amount of time, in accordance with a determination that the second electronic device confirms initiating the communication session, initiating the communication session without requiring confirmation from the second electronic device. In some embodiments, the first electronic device did not disconnect from the communication session within the threshold amount of time because the first electronic device disconnected more than the threshold time ago or was not previously in a communication session with the second electronic device. In some embodiments, if the first electronic device did not disconnect from the communication session within the threshold amount of time, the first electronic device is able to join the communication session with approval from the second electronic device. In some embodiments, the second electronic device approves the communication session with the first electronic device as described above with reference to method 700. In some embodiments, in response to the first electronic device confirming initiating the communication session (e.g., with the first input as described above), the first electronic device is automatically connected to the communication session without requiring confirmation from the second electronic device if the first electronic device disconnected from the communication session within a threshold amount of time.

In some embodiments, initiating the communication session with the second electronic device in response to receiving the first input includes, in accordance with a determination that the second electronic device did not confirm initiating the communication session, forgoing initiating the communication session without requiring confirmation from the second electronic device, such as if an input were not detected on any of user interface element 804 in FIG. 8B, selectable option 812c in FIG. 8C, user interface element 822 in FIG. 8D, and user interface element 832 in FIG. 8F. In some embodiments, if the first electronic device did not disconnect from the communication session within the threshold amount of time, the first electronic device is not able to join the communication session without approval from the second electronic device. Allowing the first electronic device to re-join a communication session with the second electronic device to control the playback of the content item enables users of the first and the second electronic device to easily share and play content, thereby reducing the need for additional inputs to share and play content which enables the users of both electronic devices to use the electronic devices more efficiently.

Initiating the communication session with the second electronic device in response to receiving the first input includes in accordance with a determination that the first electronic device was previously in the communication session (or a previous communication session including control of content playback) with the second electronic device, initiating the communication session without requiring confirmation from the second electronic device, such as if electronic device 500b had already been in a communication session with electronic device 500a. In some embodiments, initiating the communication session includes the first electronic device confirming the initiation of the communication session with the first input, as described above. In some embodiments, the first electronic device automatically connects to the communication session with the second electronic device (e.g., a new communication session) in response to the first input. In some embodiments, a third electronic device associated with the first user account can join the communication session with the second electronic device automatically if the first electronic device associated with the first user account was previously in a communication session with the second electronic device. In some embodiments, any electronic device that is associated with a user account that was previously in a communication session with the second electronic device can automatically join future communication sessions with the second electronic device.

In some embodiments, initiating the communication session with the second electronic device in response to receiving the first input includes, in accordance with a determination that the first electronic device was not previously in the communication session (or a previous communication session including control of content playback) with the second electronic device, and in accordance with a determination that the second electronic device confirms initiating the communication session (e.g., the second electronic device authorizes the first electronic device and/or the first user account to connect to the communication session), initiating the communication session with the second electronic device, such as the electronic device 500a accepting the request to initiate the communication session as shown in FIG. 6E. Initiating the communication session is described in further detail above. In some embodiments, if the first electronic device was not previously in the communication session with the second electronic device, the first electronic device is able to join the communication session with authorization from the second electronic device as described above.

In some embodiments, initiating the communication session with the second electronic device in response to receiving the first input includes, in accordance with a determination that the second electronic device did not confirm initiating the communication session (e.g., the second electronic device does not authorize the first electronic device and/or the first user account to connect to the communication session), forgoing initiating the communication session with the second electronic device, such as if the electronic device 500a did not the request to initiate the communication session by selecting selectable option 630a as shown in FIG. 6E. In some embodiments, forgoing initiating the communication session means that the first electronic device cannot control playback of content items by the second electronic device. In some embodiments, if the first electronic device was not previously in the communication session with the second electronic device, the first electronic device is not able to join the communication session without authorization from the second electronic device as described above. Allowing the first electronic device to join future communication sessions with the second electronic device to control the playback of the content item enables users of the first and the second electronic device to easily share and play content, thereby reducing the need for additional inputs to share and play content which enables the users of both electronic devices to use the electronic devices more efficiently.

In some embodiments, transmitting the indication of the first content item to the second electronic device causes the second electronic device to cease playing a second content item (e.g., podcasts) with a second content playback application and to play the first content item with a first content playback application (e.g., music) different from the second content application, such as described in method 700. In some embodiments, while the second electronic device is playing the second content item, the first electronic device initiates the communication session and transmits the indication of the first content item. As a result, the second electronic device optionally stops playing the second content item and plays the first content item. In some embodiments, the second electronic device is not playing any content when the communication session is initiated. As a result of the transmission of the indication of the first content item, the second electronic device plays the first content item, for example. In some embodiments, if the second electronic device is not playing any content when the communication session is initiated, and the first electronic device does not transmit any indications of content items, the second electronic device begins playing content items from the application associated with the communications session (e.g., first content playback application). Playing the first content item in response to the initiation of the communication session while playing the second content item reduces the need for manual inputs to switch content items in response to the initiation of the communication session reduces the likelihood of erroneous inputs to the first electronic device and the second electronic device, which reduces power usage and improves battery life of the first electronic device.

In some embodiments, during the communication session between the first electronic device and the second electronic device, the first electronic device detects, via the one or more input devices, that the second electronic device is more than a threshold distance away from the first electronic device, such as described in method 700. The threshold distance has one or more characteristics of the threshold distance as described in method 700. For example, the first electronic device optionally moves locations.

In some embodiments, in response to detecting that the second electronic device is more than the threshold distance away from the first electronic device, the first electronic device disconnects from the communication session, as shown by user interface element 866a in FIG. 8M. In some embodiments, the first electronic device disconnects from the communication session in response to the first electronic device and/or the second electronic device leaving the threshold distance. In some embodiments, a visual indication of the disconnection is displayed on the first electronic device and/or the second electronic device in response to the first electronic device disconnecting from the communication session. Alternatively or additionally, in some embodiments, the first electronic device can disconnect from the communication session after receiving an input corresponding to a request to disconnect from the communication session. Disconnecting from the communication session when the first electronic device is a threshold distance from the second electronic device simplifies the interaction between the user and the first electronic device by reducing the number of inputs needed end the communication session, which reduces power usage and improves battery life of the first electronic device.

In some embodiments, during the communication session between the first electronic device and the second electronic device, the first electronic device receives, via the one or more input devices, a third input corresponding to a request to display a content playback queue for playback by the second electronic device in accordance with the communication session, such as shown by contact 864 selecting user interface element 808i in FIG. 8L. In some embodiments, the third input has one or more characteristics of the first input and/or the second input as described above. In some embodiments, the third input is directed towards a selectable option on a user interface of the content playback application. In some embodiments, the content playback queue for playback by the second electronic device in accordance with the communication session has one or more characteristics of the content playback queue as described above and with reference to method 700.

In some embodiments, during the communication session between the first electronic device and the second electronic device, in response to receiving the third input, the first electronic device displays, via the display generation component, the content playback queue. In response to the selection of user interface element 808i in FIG. 8L, the content playback queue shown in user interface 858 is displayed as shown in FIG. 8K. In some embodiments, displaying the content playback queue includes displaying visual indication of content items in the content playback queue for playback by the second electronic device in accordance with the communication session. In some embodiments, the content playback queue includes a first visual indication of a first content item and a second visual indication of a second content item. In some embodiments, the first visual indication and the second visual indication both include a textual description and/or visual description (e.g., an avatar) of the user account and/or electronic device that transmitted the first content item and the second content item, respectively, to the second electronic device. In some embodiments, the first visual indication of the first content item includes a textual description and/or visual description of the first content item. In some embodiments, the second visual indication of the second content item includes a textual description and/or visual description of the second content item. For example, an album cover, podcast cover, name of the song, name of the podcast, or other description of the content item. In some embodiments, the second electronic device plays content in an order that is listed in the content playback queue. Allowing the first electronic device to access the content playback queue enables users of the first and the second electronic device to easily view, share, and play content, thereby reducing the need for additional inputs to view, share, and play content which enables the users of both electronic devices to use the electronic devices more efficiently.

In some embodiments, during the communication session between the first electronic device and the second electronic device, the first electronic device displays, on a user interface of a content playback application (e.g., music, audiobooks, podcasts, videos, or other content) associated with a playback of the first content item by the second electronic device in accordance with the communication session, a visual indication of a number of electronic devices in the communication session, as shown by user interface object 852 in FIG. 8J. In some embodiments, the first electronic device has less functionality than the second electronic device (e.g., the host of the communication session) for changing settings of the communication session, described in further detail in method 700. In some embodiments, the visual indication includes text indicating the number of devices and/or a visual representation indicating the number of devices (e.g., four avatars representing four devices in the communication session). In some embodiments, the visual indication is a selectable option selectable to indicate the number of user accounts and/or devices waiting to join the communication session and/or the number of user accounts and/or devices in the communication session, as described with reference to method 700. Displaying a visual indication of the number of devices participating in the communication session without user input reduces the need for manual inputs reduces the likelihood of erroneous inputs to the user interface, which reduces power usage and improves battery life of the first electronic device.

In some embodiments, the first electronic device displays, via the display generation component, a user interface of a content application used to cause the second electronic device to play content items in accordance with the communication session, such as user interface 850 shown in FIG. 8J or user interface 805 shown in FIG. 8L. The content application has one or more characteristics of the content playback application as described above and with reference to method 700.

In some embodiments, while displaying the user interface of the content application (e.g., on the first electronic device), the first electronic device receives, via the one or more input devices, a third input for playing a respective content item included in the user interface of the content application, such as contact 857 directed towards user interface element 856c representing "song 3" in FIG. 8J. In some embodiments, the third input has one or more characteristics of the third input as described above. In some embodiments, the third input is directed at a representation of the respective content item. In some embodiments, the third input is directed at a representation of an action to play the respective content item (e.g., a play button).

In some embodiments, in response to receiving the third input, in accordance with a determination that the third input was received during the communication session, the first electronic device adds the content item to a content playback queue, as shown by user interface element 860d representing "song 3" in the content playback queue in user interface 858 in FIG. 8K. In some embodiments, the content playback queue has one or more characteristics of the content playback queue as described above and with reference to method 700. In some embodiments, the content playback queue is on the second electronic device. In some embodiments, the content playback queue can be viewed on the first electronic device and/or the second electronic device. In some embodiments, adding the content item to the content playback queue is described in further detail in method 700. In some embodiments, playing the content item added to the content playback queue includes waiting for the content items ahead of the content item to be played before playing the content item. In some embodiments, adding the content item to the content playback queue does not interrupt the playback of the presently playing content item.

In some embodiments, in response to receiving the third input in accordance with a determination that the third input was not received during the communication session, the first electronic device plays the content item, such as if the selection of user interface element 856c in FIG. 8J resulted in the playing of "song 3". Playing the content item in accordance with the determination that the input selecting the representation of the content item was not received during the communication session is described in greater detail in method 700. In some embodiments, playing the content item includes stopping the playback of the presently playing content item to play the content item. In some embodiments, playing the content item includes playing the content item before content items in a content playback queue are played. Placing the content item in a content playback queue reduces the need for manual inputs to create the content playback queue which reduces the likelihood of erroneous inputs to the user interface, which reduces power usage and improves battery life of the first electronic device.

In some embodiments, during the communication session, the first electronic device receives, via the one or more input devices, an indication that the second electronic device disconnected from an output device being used to play content items in accordance with the communication session. The output device has one or more characteristics of the one or more output devices described in method 700. In some embodiments, a visual indication of the indication that the second electronic device disconnect from the output device is displayed on the first electronic device. In some embodiments, the visual indication includes a textual and/or visual description of the disconnection.

In some embodiments, in response to receiving the input that the second electronic device disconnected from the output device, the first electronic device disconnects from the communication session, such as shown by user interface element 866b in FIG. 8N. In some embodiments, the first electronic device leaves the communication session when the second electronic device is disconnected from the output device (e.g., a speaker, a vehicle, or other output devices) being used to play the content item. In some embodiments, in response to the second electronic device disconnecting from the output device, the communication session is concluded. Ending the communication session by disconnecting all devices in the communication session in response to the first electronic device disconnecting from the one or more output devices simplifies the interaction between the user and the first electronic device by reducing the number of inputs needed end the communication session, which reduces power usage and improves battery life of the first electronic device.

In some embodiments, receiving the indication of the communication session further comprises receiving the indication of the communication session by scanning a near-field communication tag on the second electronic device, as shown by the electronic device 500b tapping the electronic device 500a in FIG. 8H. As a result of the tap, user interface element 840 is displayed on electronic device 500b. In some embodiments, the near-field communication (NFC) tag has one or more characteristics of the NFC tag as described in method 700. Allowing the first electronic device to join the communication session using an NFC tag simplifies the interaction between the user and the first electronic device by reducing the number of inputs needed to allow the first electronic device to join the communication session, which reduces power usage and improves battery life of the first electronic device.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the operation of the electronic device to transmit content while in a communication session described above with reference to method 900 optionally has one or more of the characteristics of initiation of the communication session described herein with reference to other methods described herein (e.g., method 700). Additionally, the communication session described with reference to method 900 has one or more characteristics of the communication session described with reference to method 700. For brevity, these details are not repeated here.

The operations in the information processing methods described above are, optionally, implemented by running one or more functional modules in an information processing apparatus such as general-purpose processors (e.g., a as described with respect to FIGS. 1A-1B, 3, 5A-5J) or application specific chips. Further, the operations described above with reference to FIGS. 9A-9F are, optionally, implemented by components depicted in FIGS. 1A-1B. For example, receiving operation 902a, 902b, and 902e and/or initiating operation 902c and 902f are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is transmitting and displaying information about user accounts. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, capturing and transmitting content can enable the user to view the content at a later time. Accordingly, use of such personal information data enables users to use electronic devices to view content. Further, other uses for personal information data that benefit the user are also contemplated by the present disclosure. For instance, location data may be used to enhance communications between devices.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location services, the present technology can be configured to allow users to select to "opt in" or "opt out" of participation in the collection of personal information data during registration for services or anytime thereafter. In another example, users can select not to enable location services in a specific application (e.g., first application and/or second application). In addition to providing "opt in" and "opt out" options, the present disclosure contemplates providing notifications relating to the access or use of personal information. For instance, a user may be notified upon initiating content collection that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an electronic device transmits content without associating the content with user account data.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by one or more processors of a first electronic device in communication with a display generation component, one or more input devices, and one or more output devices cause the first electronic device to perform a method comprising:
    detecting, via the one or more input devices, a second electronic device within a threshold distance of the first electronic device, the second electronic device associated with a second user account different from a first user account associated with the first electronic device;
    in response to detecting the second electronic device within the threshold distance of the first electronic device:
        in accordance with a determination that one or more criteria are satisfied, initiating a communication session with the second electronic device that includes allowing the second electronic device to control playback of content via the one or more output devices; and
        in accordance with a determination that the one or more criteria are not satisfied, forgoing initiating the communication session with the second electronic device.

2. The non-transitory computer readable storage medium of claim 1, the method further comprising:
    receiving, from the second electronic device, an indication of a first request to initiate the communication session, wherein the one or more criteria include: a first criterion that is satisfied in response to receiving the indication of the first request to initiate the communication session, and a second criterion that is satisfied in response to receiving a user input corresponding to a second request to initiate the communication session.

3. The non-transitory computer readable storage medium of claim 2, the method further comprising:
    in response to receiving the indication of the first request to initiate the communication session, displaying, via the display generation component, a visual indication of the first request to initiate the communication session.

4. The non-transitory computer readable storage medium of claim 1, the method further comprising, displaying, via the display generation component, a communication session settings user interface, wherein the communication session settings user interface includes a plurality of selectable options for changing one or more settings of the communication session.

5. The non-transitory computer readable storage medium of claim 4, wherein initiating the communication session with the second electronic device includes initiating a process to transmit an invitation to join the communication session to the second electronic device, and the one or more criteria includes:
    in accordance with a determination that a first setting in the communication session settings user interface is active, a first criterion that is satisfied when the first user account has a first relationship with the second user account; and
    in accordance with a determination that a second setting different from the first setting in the communication session settings user interface is active, a second criterion that is satisfied when the first user account has a second relationship different from the first relationship with the second user account.

6. The non-transitory computer readable storage medium of claim 4, wherein the one or more criteria include:
    in accordance with a determination that a first setting in the communication session settings user interface is active, a first criterion that is satisfied when the second user account has a first relationship to the first user account without requiring receiving a user input, at the first electronic device, authorizing the initiation of the communication session with the second electronic device; and
    in accordance with a determination that a second setting different from the first setting in the communication session settings user interface is active, a second criterion that is satisfied when the second user account has a second relationship different from the first relationship to the first user account without requiring receiving the user input authorizing the initiation of the communication session with the second electronic device.

7. The non-transitory computer readable storage medium of claim 1, the method further comprising:
    displaying a user interface of a content playback application used to play content selected by the second electronic device in the communication session wherein:
        during the communication session with the second electronic device, the user interface of the content playback application includes a visual indication initiating a number of devices participating in the communication session; and
        not during the communication session with the second electronic device, the user interface of the content playback application does not include the visual indication.

8. The non-transitory computer readable storage medium of claim 7, wherein:
during the communication session with the second electronic device, the visual indication further indicates the number of devices waiting to join the communication session.

9. The non-transitory computer readable storage medium of claim 1, wherein the one or more criteria include a criterion that is satisfied when the second electronic device was previously in the communication session with the first electronic device within a threshold amount of time.

10. The non-transitory computer readable storage medium of claim 9, wherein the one or more criteria include a criterion that is satisfied when a third electronic device associated with the second user account was previously in the communication session with the first electronic device within a threshold amount of time.

11. The non-transitory computer readable storage medium of claim 1, the method further comprising:
during the communication session with the second electronic device:
while displaying a user interface of a content playback application used to play content selected by the second electronic device in the communication session, receiving, via the one or more input devices, a first input directed towards a first selectable option corresponding to a request to display a communication session settings user interface; and
in response to receiving the first input, displaying the communication session settings user interface including a scannable code to join the communication session.

12. The non-transitory computer readable storage medium of claim 11, wherein the one or more criteria include a criterion that is satisfied in response to receiving an indication of a scan of the scannable code from the second electronic device without requiring receiving a user input authorizing initiation of the communication session with the second electronic device.

13. The non-transitory computer readable storage medium of claim 11, wherein the communication session settings user interface includes a second selectable option selectable to remove the second electronic device from the communication session and a third selectable option selectable to remove all electronic devices from the communication session.

14. The non-transitory computer readable storage medium of claim 1, wherein:
the one or more criteria include a criterion that is satisfied when the second electronic device was previously in the communication session with the first electronic device within a threshold amount of time and left the communication session in response to the second electronic device receiving a user input corresponding to a request to leave the communication session; and
the criterion is not satisfied when the second electronic device was previously in the communication session and left the communication session in response to the first electronic device receiving an input corresponding to a request to remove the second electronic device from the communication session.

15. The non-transitory computer readable storage medium of claim 1, wherein allowing the second electronic device to control playback of content further includes allowing the second electronic device to transmit an indication of a content item to the first electronic device to be added to a content playback queue, and wherein the method further comprises:
after the communication session between the first electronic device and the second electronic device has ended, maintaining the content playback queue with the content item corresponding to the indication transmitted from the second electronic device.

16. The non-transitory computer readable storage medium of claim 1, wherein initiating the communication session with the second electronic device includes initiating a process to transmit an invitation to join the communication session to the second electronic device, and the one or more criteria are satisfied or not satisfied irrespective of the first electronic device displaying a user interface of an application other than a content playback application used to play content selected by the second electronic device in the communication session.

17. The non-transitory computer readable storage medium of claim 1, the method further comprising:
while playing a first content item with a first content application different from a second content application used to play content selected by the second electronic device in the communication session, via the one or more output devices, detecting an initiation of the communication session with the second electronic device;
in response to detecting the initiation of the communication session with the second electronic device, ceasing playing the first content item with the first content application; and
playing a second content item with the second content application.

18. The non-transitory computer readable storage medium of claim 1, the method further comprising:
initiating the communication session with the second electronic device while the first electronic device is not playing any content.

19. The non-transitory computer readable storage medium of claim 1, the method further comprising:
during the communication session, displaying, via the display generation component, a user interface of a content playback application used to play content selected by a respective electronic device in the communication session that includes: in accordance with a determination that a content item that is currently playing was played in response to a request made by the second electronic device in the communication session, a visual indication of the second user account; and
in accordance with a determination that the content item that is currently playing was played in response to a request made by a third electronic device in the communication session different from the second electronic device, a visual indication of a third user account associated with the third electronic device and different from the second user account.

20. The non-transitory computer readable storage medium of claim 1, the method further comprising:
receiving, via the one or more input devices, a first input selecting a content item for playback in a user interface of a content playback application used to play content selected by the second electronic device in the communication session; and
in response to receiving the first input selecting the content item:
in accordance with a determination that the first input is received while the first electronic device is in the communication session with the second electronic device, adding the content item to a content playback queue; and in accordance with a determination that the first input is received while the first electronic device is not in the communication session with the second electronic device, playing the content item.

21. The non-transitory computer readable storage medium of claim 1, further comprising using a subscription of the first electronic device to play a content item during the communication session independent of which electronic device added the content item to the communication session.

22. The non-transitory computer readable storage medium of claim 1, the method further comprising:

while in the communication session with the second electronic device, detecting disconnecting from the one or more output devices; and in response to detecting the disconnecting from the one or more output devices, concluding the communication session.

23. The non-transitory computer readable storage medium of claim 1, wherein the one or more criteria include a criterion that is satisfied in response to scanning a near-field communication tag with the second electronic device.

24. A method comprising:

at a first electronic device in communication with a display generation component, one or more output devices, and one or more input devices, wherein the first electronic device is associated with a first user account:

detecting, via the one or more input devices, a second electronic device within a threshold distance of the first electronic device, the second electronic device associated with a second user account different from the first user account;

in response to detecting the second electronic device within the threshold distance of the first electronic device:

in accordance with a determination that one or more criteria are satisfied, initiating a communication session with the second electronic device that includes allowing the second electronic device to control playback of content via the one or more output devices; and in accordance with a determination that the one or more criteria are not satisfied, forgoing initiating the communication session with the second electronic device.

25. The method of claim 24, further comprising:

receiving, from the second electronic device, an indication of a first request to initiate the communication session, wherein the one or more criteria include: a first criterion that is satisfied in response to receiving the indication of the first request to initiate the communication session, and a second criterion that is satisfied in response to receiving a user input corresponding to a second request to initiate the communication session.

26. The method of claim 24, further comprising:

displaying a user interface of a content playback application used to play content selected by the second electronic device in the communication session wherein:

during the communication session with the second electronic device, the user interface of the content playback application includes a visual indication initiating a number of devices participating in the communication session; and not during the communication session with the second electronic device, the user interface of the content playback application does not include the visual indication.

27. The method of claim 1, wherein:

the one or more criteria include a criterion that is satisfied when the second electronic device was previously in the communication session with the first electronic device within a threshold amount of time and left the communication session in response to the second electronic device receiving a user input corresponding to a request to leave the communication session; and the criterion is not satisfied when the second electronic device was previously in the communication session and left the communication session in response to the first electronic device receiving an input corresponding to a request to remove the second electronic device from the communication session.

28. The method of claim 24, wherein allowing the second electronic device to control playback of content further includes allowing the second electronic device to transmit an indication of a content item to the first electronic device to be added to a content playback queue, and wherein the method further comprise:

after the communication session between the first electronic device and the second electronic device has ended, maintaining the content playback queue with the content item corresponding to the indication transmitted from the second electronic device.

29. The method of claim 24, further comprising:

during the communication session with the second electronic device:

while displaying a user interface of a content playback application used to play content selected by the second electronic device in the communication session, receiving, via the one or more input devices, a first input directed towards a first selectable option corresponding to a request to display a communication session settings user interface; and in response to receiving the first input, displaying the communication session settings user interface including a scannable code to join the communication session.

30. The method of claim 24, wherein initiating the communication session with the second electronic device includes initiating a process to transmit an invitation to join the communication session to the second electronic device, and the one or more criteria are satisfied or not satisfied irrespective of the first electronic device displaying a user interface of an application other than a content playback application used to play content selected by the second electronic device in the communication session.

31. The method of claim 24, further comprising:

while playing a first content item with a first content application different from a second content application used to play content selected by the second electronic device in the communication session, via the one or more output devices, detecting the initiation of the communication session with the second electronic device; in response to detecting the initiation of the communication session with the second electronic device, ceasing playing the first content item with the first content application; and playing a second content item with the second content application.

32. The method of claim 24, further comprising:
initiating the communication session with the second electronic device while the first electronic device is not playing any content.

33. The method of claim 24, further comprising:
during the communication session, displaying, via the display generation component, a user interface of a content playback application used to play content selected by a respective electronic device in the communication session that includes: in accordance with a determination that a content item that is currently playing was played in response to a request made by the second electronic device in the communication session, a visual indication of the second user account; and
in accordance with a determination that the content item that is currently playing was played in response to a request made by a third electronic device in the communication session different from the second electronic device, a visual indication of a third user account associated with the third electronic device and different from the second user account.

34. The method of claim 24, further comprising:
receiving, via the one or more input devices, a first input selecting a content item for playback in a user interface of a content playback application used to play content selected by the second electronic device in the communication session; and
in response to receiving the first input selecting the content item:
in accordance with a determination that the first input is received while the first electronic device is in the communication session with the second electronic device, adding the content item to a content playback queue; and
in accordance with a determination that the first input is received while the first electronic device is not in the communication session with the second electronic device, playing the content item.

35. The method of claim 24, further comprising using a subscription of the first electronic device to play a content item during the communication session independent of which electronic device added the content item to the communication session.

36. The method of claim 24, further comprising:
while in the communication session with the second electronic device, detecting disconnecting from the one or more output devices; and
in response to detecting the disconnecting from the one or more output devices, concluding the communication session.

37. A first electronic device in communication with a display generation component, one or more output devices, and one or more input devices, the first electronic device comprising:
one or more processors;
memory; and
one or more programs, wherein the one or more programs are stored in the memory and configured to be executed by the one or more processors, the one or more programs including instructions for:
detecting, via the one or more input devices, a second electronic device within a threshold distance of the first electronic device, the second electronic device associated with a second user account different from a first user account associated with the first electronic device;
in response to detecting the second electronic device within the threshold distance of the first electronic device:
in accordance with a determination that one or more criteria are satisfied, initiating a communication session with the second electronic device that includes allowing the second electronic device to control playback of content via the one or more output devices; and
in accordance with a determination that the one or more criteria are not satisfied, forgoing initiating the communication session with the second electronic device.

38. The first electronic device of claim 37, the one or more programs further including instructions for:
receiving, from the second electronic device, an indication of a first request to initiate the communication session, wherein the one or more criteria include: a first criterion that is satisfied in response to receiving the indication of the first request to initiate the communication session, and a second criterion that is satisfied in response to receiving a user input corresponding to a second request to initiate the communication session.

39. The first electronic device of claim 37, the one or more programs including instructions for:
displaying a user interface of a content playback application used to play content selected by the second electronic device in the communication session wherein:
during the communication session with the second electronic device, the user interface of the content playback application includes a visual indication initiating a number of devices participating in the communication session; and
not during the communication session with the second electronic device, the user interface of the content playback application does not include the visual indication.

40. The first electronic device of claim 37, wherein:
the one or more criteria include a criterion that is satisfied when the second electronic device was previously in the communication session with the first electronic device within a threshold amount of time and left the communication session in response to the second electronic device receiving a user input corresponding to a request to leave the communication session; and
the criterion is not satisfied when the second electronic device was previously in the communication session and left the communication session in response to the first electronic device receiving an input corresponding to a request to remove the second electronic device from the communication session.

41. The first electronic device of claim 37, wherein allowing the second electronic device to control playback of content further includes allowing the second electronic device to transmit an indication of a content item to the first electronic device to be added to a content playback queue, and wherein the one or more programs further include instructions for:
after the communication session between the first electronic device and the second electronic device has ended, maintaining the content playback queue with the content item corresponding to the indication transmitted from the second electronic device.

42. The first electronic device of claim 37, the one or more programs further including instructions for:

during the communication session with the second electronic device:
  while displaying a user interface of a content playback application used to play content selected by the second electronic device in the communication session, receiving, via the one or more input devices, a first input directed towards a first selectable option corresponding to a request to display a communication session settings user interface; and
  in response to receiving the first input, displaying the communication session settings user interface including a scannable code to join the communication session.

43. The first electronic device of claim 37, wherein initiating the communication session with the second electronic device includes initiating a process to transmit an invitation to join the communication session to the second electronic device, and the one or more criteria are satisfied or not satisfied irrespective of the first electronic device displaying a user interface of an application other than a content playback application used to play content selected by the second electronic device in the communication session.

44. The first electronic device of claim 37, the one or more programs including instructions for:
  while playing a first content item with a first content application different from a second content application used to play content selected by the second electronic device in the communication session, via the one or more output devices, detecting an initiation of the communication session with the second electronic device;
  in response to detecting the initiation of the communication session with the second electronic device, ceasing playing the first content item with the first content application; and
  playing a second content item with the second content application.

45. The first electronic device of claim 37, the one or more programs including instructions for:
  initiating the communication session with the second electronic device while the first electronic device is not playing any content.

46. The first electronic device of claim 37, the one or more programs including instructions for:
  during the communication session, displaying, via the display generation component, a user interface of a content playback application used to play content selected by a respective electronic device in the communication session that includes: in accordance with a determination that a content item that is currently playing was played in response to a request made by the second electronic device in the communication session, a visual indication of the second user account; and
  in accordance with a determination that the content item that is currently playing was played in response to a request made by a third electronic device in the communication session different from the second electronic device, a visual indication of a third user account associated with the third electronic device and different from the second user account.

47. The first electronic device of claim 37, the one or more programs including instructions for:
  receiving, via the one or more input devices, a first input selecting a content item for playback in a user interface of a content playback application used to play content selected by the second electronic device in the communication session; and
  in response to receiving the first input selecting the content item:
    in accordance with a determination that the first input is received while the first electronic device is in the communication session with the second electronic device, adding the content item to a content playback queue; and
    in accordance with a determination that the first input is received while the first electronic device is not in the communication session with the second electronic device, playing the content item.

48. The first electronic device of claim 37, the one or more programs further including instructions for using a subscription of the first electronic device to play a content item during the communication session independent of which electronic device added the content item to the communication session.

49. The first electronic device of claim 37, the one or more programs further including instructions for:
  while in the communication session with the second electronic device, detecting disconnecting from the one or more output devices; and
  in response to detecting the disconnecting from the one or more output devices, concluding the communication session.

* * * * *